US012632831B2

(12) United States Patent
Merg et al.

(10) Patent No.: US 12,632,831 B2
(45) Date of Patent: *May 19, 2026

(54) SYSTEM AND METHOD FOR DYNAMICALLY-CHANGEABLE DISPLAYABLE PAGES WITH VEHICLE SERVICE INFORMATION

(71) Applicant: Snap-on Incorporated, Kenosha, WI (US)

(72) Inventors: Patrick S. Merg, Hollister, CA (US); Jacob G. Foreman, San Jose, CA (US); Todd Mercer, Descanso, CA (US); Joshua C. Covington, San Juan Bautista, CA (US); Kahlil H. Cacabelos, San Jose, CA (US); Thomas Southward, San Diego, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,237

(22) Filed: Jul. 20, 2022

(65) Prior Publication Data

US 2022/0358471 A1 Nov. 10, 2022

Related U.S. Application Data

(63) Continuation of application No. 14/874,317, filed on Oct. 2, 2015, now Pat. No. 11,429,936.

(51) Int. Cl.
*G06Q 10/20* (2023.01)
*G06F 3/04817* (2022.01)
(Continued)

(52) U.S. Cl.
CPC ......... *G06Q 10/20* (2013.01); *G06F 3/04817* (2013.01); *G06F 3/0482* (2013.01);
(Continued)

(58) Field of Classification Search
CPC ... G06Q 10/20; G06F 3/04817; G06F 3/0482; G06F 3/04855; G06F 16/5866; G09G 5/003; G09G 2370/022; G09G 2380/10
(Continued)

(56) References Cited

U.S. PATENT DOCUMENTS 4,404,639 A * 9/1983 McGuire .............. G01R 31/007
701/32.7
5,058,044 A 10/1991 Stewart et al.
(Continued)

FOREIGN PATENT DOCUMENTS

CN 102414676 A 4/2010
CN 102456172 A 5/2012
(Continued)

OTHER PUBLICATIONS

Anonymous "Diagnostics & Test Equipment," Professional Tool & Equipment News, vol. 25, (6), pp. 12-19, 2014 (Year: 2014).
(Continued)

*Primary Examiner* — Tyler D Paige
(74) *Attorney, Agent, or Firm* — McDonnell Boehnen Hulbert & Berghoff LLP

(57) ABSTRACT

A method and system for generating a displayable page with a display card is described. A computer server receives data indicating a vehicle symptom and searches a computer-readable database to determine a most-likely cause of the vehicle symptom, a most-probable component associated with the most-likely cause, a component-type identifier associated with the most-probable component, a subset of information categories from among a set of information
(Continued)

categories associated with at least one component-type identifier, and data to populate the display card. The server generates the displayable page including the display card and the data to populate in the display card. The server transmits the displayable page to a display device for displaying the displayable page on a display screen. The server receives data indicating selection of an action trigger in the display card occurred and responsively provides the display device with data to update the display card or another displayable page.

20 Claims, 32 Drawing Sheets

(51) Int. Cl.
  *G06F 3/0482* (2013.01)
  *G06F 3/04855* (2022.01)
  *G06F 16/58* (2019.01)
  *G09G 5/00* (2006.01)

(52) U.S. Cl.
  CPC ...... *G06F 3/04855* (2013.01); *G06F 16/5866* (2019.01); *G09G 5/003* (2013.01); *G09G 2370/022* (2013.01); *G09G 2380/10* (2013.01)

(58) Field of Classification Search
  USPC ....................................................... 701/33.2
  See application file for complete search history.

(56) References Cited

U.S. PATENT DOCUMENTS

| | | |
|---|---|---|
| 5,414,626 A | 5/1995 | Boorse et al. |
| 5,729,452 A | 3/1998 | Smith |
| 5,778,381 A | 7/1998 | Sandifer |
| 5,913,215 A | 6/1999 | Rubinstein et al. |
| 5,950,169 A | 9/1999 | Borghesi et al. |
| 6,067,486 A | 5/2000 | Aragones |
| 6,263,322 B1 | 7/2001 | Kirkevold et al. |
| 6,301,531 B1 | 10/2001 | Pierro et al. |
| 6,308,120 B1 | 10/2001 | Good |
| 6,311,162 B1 | 10/2001 | Reichwein et al. |
| 6,381,587 B1 | 4/2002 | Guzelsu |
| 6,487,479 B1 | 11/2002 | Nelson |
| 6,535,802 B1 | 3/2003 | Kramer |
| 6,609,050 B2 | 8/2003 | Li |
| 6,768,935 B1 | 7/2004 | Morgan et al. |
| 6,785,582 B2 | 8/2004 | Araujo |
| 6,804,589 B2 | 10/2004 | Foxford et al. |
| 6,807,469 B2 | 10/2004 | Funkhouser |
| 6,845,307 B2 | 1/2005 | Rother |
| 6,925,368 B2 | 8/2005 | Funkhouser |
| 6,941,514 B2 | 9/2005 | Bradford |
| 6,969,983 B2 | 11/2005 | Lipscomb |
| 6,993,421 B2 | 1/2006 | Pillar |
| 7,092,937 B2 | 8/2006 | Morgan et al. |
| 7,158,978 B2 | 1/2007 | Goodwin |
| 7,171,372 B2 | 1/2007 | Daniel et al. |
| 7,209,817 B2 | 4/2007 | Abdel-Malek et al. |
| 7,363,129 B1 | 4/2008 | Barnicle et al. |
| 7,373,225 B1 | 5/2008 | Grier et al. |
| 7,373,226 B1 | 5/2008 | Cancilla et al. |
| 7,444,216 B2 | 10/2008 | Rogers et al. |
| 7,551,993 B1 | 6/2009 | Cancilla et al. |
| 7,613,627 B2 | 11/2009 | Doyle et al. |
| 7,945,438 B2 | 5/2011 | Balmelli et al. |
| 8,140,411 B2 | 3/2012 | Staats |
| 8,290,833 B2 | 10/2012 | Yang et al. |
| 8,423,226 B2 | 4/2013 | Underdal |
| 8,600,610 B2 | 12/2013 | Bertosa et al. |
| 8,630,765 B2 | 1/2014 | Chen |
| 8,897,953 B2 | 11/2014 | Olsen, III |
| 8,977,423 B2 | 3/2015 | Merg et al. |
| 9,292,979 B2 | 3/2016 | Olsen, III |
| 9,424,608 B2 | 8/2016 | Greenberg et al. |
| 9,477,950 B2 | 10/2016 | Johnson et al. |
| 9,611,951 B2 | 4/2017 | Yoshimura |
| 9,646,432 B2 | 5/2017 | Madison |
| 10,068,207 B2 | 9/2018 | Merg et al. |
| 10,430,021 B2 * | 10/2019 | Merg ...................... H04W 4/70 |
| 10,430,026 B2 * | 10/2019 | Merg .................... G06F 3/0482 |
| 10,706,647 B2 | 7/2020 | Oliver |
| 10,810,554 B2 | 10/2020 | Merg et al. |
| 10,845,961 B2 * | 11/2020 | Merg ................... G06F 3/0482 |
| 11,029,813 B2 * | 6/2021 | Merg ................... G06F 3/0482 |
| 11,030,332 B1 | 6/2021 | Gillis |
| 11,144,888 B2 | 10/2021 | Merg |
| 11,221,738 B2 * | 1/2022 | Merg ..................... G06Q 10/20 |
| 11,429,936 B2 | 8/2022 | Merg |
| 11,481,737 B2 | 10/2022 | Merg et al. |
| 11,507,254 B2 * | 11/2022 | Merg ................... G06F 3/0482 |
| 12,423,167 B1 | 9/2025 | Gajdel et al. |
| 12,424,209 B1 | 9/2025 | Guo et al. |
| 2001/0032114 A1 | 10/2001 | Sinex |
| 2002/0007225 A1 | 1/2002 | Costello et al. |
| 2002/0007237 A1 | 1/2002 | Phung et al. |
| 2002/0007289 A1 | 1/2002 | Malin et al. |
| 2002/0103583 A1 | 8/2002 | Ohmura et al. |
| 2002/0128874 A1 | 9/2002 | McIntosh et al. |
| 2002/0138185 A1 | 9/2002 | Trsar et al. |
| 2003/0004624 A1 | 1/2003 | Wilson et al. |
| 2003/0050830 A1 | 3/2003 | Troyer |
| 2003/0109972 A1 * | 6/2003 | Tak ...................... G07C 5/0808 |
| | | 705/5 |
| 2003/0130966 A1 | 7/2003 | Thompson et al. |
| 2003/0195681 A1 | 10/2003 | Rother |
| 2004/0110472 A1 | 6/2004 | Witkowski |
| 2004/0176885 A1 | 9/2004 | Quinn |
| 2004/0199542 A1 | 10/2004 | Morgan et al. |
| 2005/0027694 A1 | 2/2005 | Sauermann |
| 2005/0049912 A1 | 3/2005 | Troyer et al. |
| 2005/0065678 A1 | 3/2005 | Smith et al. |
| 2005/0085964 A1 | 4/2005 | Knapp et al. |
| 2005/0096805 A1 | 5/2005 | Fudali et al. |
| 2005/0096868 A1 | 5/2005 | Trsar |
| 2005/0131595 A1 * | 6/2005 | Luskin ................... G07C 5/085 |
| | | 701/31.4 |
| 2005/0154749 A1 | 7/2005 | Snow et al. |
| 2005/0187834 A1 | 8/2005 | Painter et al. |
| 2005/0193252 A1 | 9/2005 | Cancilla et al. |
| 2005/0234602 A1 | 10/2005 | Rigsby |
| 2006/0095230 A1 | 5/2006 | Grier et al. |
| 2006/0101074 A1 | 5/2006 | Cancilla et al. |
| 2006/0106797 A1 | 5/2006 | Srinivasa et al. |
| 2006/0136104 A1 | 6/2006 | Brozovich et al. |
| 2006/0142907 A1 | 6/2006 | Cancilla et al. |
| 2006/0161313 A1 | 7/2006 | Rogers et al. |
| 2007/0005201 A1 | 1/2007 | Chenn |
| 2007/0043487 A1 | 2/2007 | Krzystofczyk et al. |
| 2007/0156313 A1 | 7/2007 | Fudali et al. |
| 2007/0293997 A1 | 12/2007 | Couch |
| 2008/0004764 A1 | 1/2008 | Chinnadurai et al. |
| 2008/0183351 A1 | 7/2008 | Grier et al. |
| 2008/0208609 A1 | 8/2008 | Preece et al. |
| 2008/0243488 A1 | 10/2008 | Balmelli et al. |
| 2008/0307010 A1 | 12/2008 | Cullison et al. |
| 2009/0006476 A1 | 1/2009 | Andreasen et al. |
| 2009/0062977 A1 | 3/2009 | Brighenti |
| 2009/0169092 A1 | 7/2009 | McCleary et al. |
| 2009/0216493 A1 | 8/2009 | Underdal et al. |
| 2009/0295559 A1 | 12/2009 | Howell et al. |
| 2009/0307027 A1 | 12/2009 | Charbeneau et al. |
| 2010/0005010 A1 | 1/2010 | Chenn |
| 2010/0057290 A1 | 3/2010 | Brillhart et al. |
| 2010/0063668 A1 | 3/2010 | Zhang et al. |
| 2010/0138242 A1 | 6/2010 | Ferrick et al. |
| 2010/0138701 A1 | 6/2010 | Costantino |
| 2010/0174446 A1 | 7/2010 | Andreasen et al. |
| 2011/0010656 A1 | 1/2011 | Mokotov |
| 2011/0035094 A1 | 2/2011 | Van Den Berg et al. |
| 2011/0118905 A1 | 5/2011 | Mylaraswamy et al. |
| 2011/0172874 A1 | 7/2011 | Patnaik et al. |

(56) References Cited

U.S. PATENT DOCUMENTS

| | | | |
|---|---|---|---|
| 2011/0238258 | A1 | 9/2011 | Singh et al. |
| 2011/0289055 | A1 | 11/2011 | Pothering et al. |
| 2012/0136802 | A1 | 5/2012 | McQuade et al. |
| 2012/0245791 | A1 | 9/2012 | Yun et al. |
| 2012/0265707 | A1 | 10/2012 | Bushnell |
| 2012/0303205 | A1 | 11/2012 | Subramania et al. |
| 2013/0030641 | A1 | 1/2013 | Olsen, III |
| 2013/0124032 | A1 | 5/2013 | Singh et al. |
| 2013/0246135 | A1 | 9/2013 | Wang |
| 2013/0304306 | A1 | 11/2013 | Selkirk et al. |
| 2013/0325541 | A1 | 12/2013 | Capriotti et al. |
| 2014/0032422 | A1 | 1/2014 | Jones |
| 2014/0074343 | A1 | 3/2014 | Fish et al. |
| 2014/0075356 | A1 | 3/2014 | Gray et al. |
| 2014/0207515 | A1 | 7/2014 | Merg et al. |
| 2014/0207771 | A1 | 7/2014 | Merg |
| 2014/0277908 | A1 | 9/2014 | Fish et al. |
| 2015/0007078 | A1 | 1/2015 | Feng et al. |
| 2015/0046023 | A1 | 2/2015 | Olsen, III |
| 2015/0058251 | A1* | 2/2015 | McGinnis .............. G06Q 10/10 |
| | | | 705/343 |
| 2015/0066781 | A1 | 3/2015 | Johnson et al. |
| 2015/0121275 | A1 | 4/2015 | Marshall et al. |
| 2016/0078403 | A1* | 3/2016 | Sethi .................. G06Q 10/0875 |
| | | | 705/26.81 |
| 2016/0104123 | A1 | 4/2016 | Viswanath et al. |
| 2016/0163135 | A1 | 6/2016 | Olsen, III |
| 2017/0098199 | A1 | 4/2017 | Merg et al. |
| 2017/0098200 | A1 | 4/2017 | Merg et al. |
| 2019/0361694 | A1* | 11/2019 | Gordon ................... G06F 9/452 |
| 2019/0370544 | A1* | 12/2019 | Wright, Jr. ................ G06T 7/20 |
| 2020/0126329 | A1 | 4/2020 | Mattern |
| 2020/0294401 | A1* | 9/2020 | Kerecsen .............. G08G 1/205 |
| 2021/0335063 | A1 | 10/2021 | Collins |
| 2021/0390517 | A1 | 12/2021 | Merg et al. |

FOREIGN PATENT DOCUMENTS

| | | | |
|---|---|---|---|
| WO | 0182136 | A2 | 11/2001 |
| WO | 02/17118 | A1 | 2/2002 |
| WO | 0217118 | A2 | 2/2002 |
| WO | 02/101555 | A2 | 12/2002 |
| WO | 2004/092918 | A2 | 10/2004 |
| WO | 2013/063232 | A2 | 5/2013 |
| WO | 2014/001799 | A1 | 1/2014 |
| WO | 2015/035056 | A2 | 3/2015 |

OTHER PUBLICATIONS

Eric Limer, "Here's the Iron Man UI Elon Musk Wants to Use to Design Rockets", Sep. 5, 2013, Gizmodo, http://gizmodo.com/heres-the-iron-man-ui-elon-musk-wants-to-use-to-build-1259695025.

Honda, "2011 Honda Odyssey Owner's Manual", copyrighted 2010, pp. 153, 614, 616, 631, 674-679.

European Patent Office; Summons to attend oral proceedings pursuant to Rule 115(1) EPC for European patent application No. 16 779 275.3-1222 dated Apr. 21, 2020, 9 pages.

Anonymous: "On-board diagnostics—Wikipedia", Sep. 1, 2015 (Sep. 1, 2015), pp. 1-15, XP055681313, Retrieved from the Internet: URL:https://en.wikipedia.org/w/index.phh?title=On-board_diagnostics&oldid=679006559 retrieved on Mar. 31, 2020].

Trice, Andrew; Implementing the "Card" UI Pattern in PhoneGap/HTML5 Applications; Dec. 2, 2013; pp. 1-9 of 11 total pages.

Oracle Corporation; Distributed Database Concepts; Oracle8 Distributed Database Systems Release 8.0 A58247-01; downloaded from the world wide web at https://docs.oracle.com/cd/A58617_01/server.804/a58247/ds_ch1.htm#4951 on Feb. 18, 2015; pp. 1-13.

Google LLC, Cards—Components—Google Design Guidelines; downloaded from the world wide web http://www.google.com/design/spec/components/cards.html#cards-behavior; Mar. 25, 2015; pp. 1-5.

Tyson, Jeff et al.; How Graphics Cards Work; The GPU—HowStuffWorks, downloaded from the world wide web at http://computer.howstuffworks.com/graphics-card1.htm/printable on Mar. 13, 2015; pp. 1-4.

Inside Intercom; Why Cards are the Future of the Web; downloaded from the world wide web at http://blog.intercom.io/why-cards-are-the-future-of-the-web/ on Mar. 20, 2015; pp. 1-10 of 12 total pages.

Ben-Bassat, Moshe, et al., Workflow Management Combined with Diagnostic and Repair Expert System Tools for Maintenance Operations, AUTOTESTCON '93, San Antonio, TX, Sep. 20-23, 1993, IEEE, pp. 367-375 (9 pages).

Consortium on Cognitive Science Instruction, Introduction to Natural Language Processing, downloaded from the World Wide Web at http://www.mind.ilstu.edu/curriculum/protothinker/natural_language_processing.php on Oct. 21, 2013 (32 pages).

Dickinson, Markus, Linguistics 362: Introduction to Natural Language Processing, PowerPoint slides, Jul. 1, 2012 (48 pages).

Jain, Anil K., et al., Artificial Neural Networks: A Tutorial, Mar. 1996, IEEE, pp. 31-44 (14 pages).

Jain, Anil K., et al., Data Clustering: A Review, Sep. 1999, ACM Computing Surveys, vol. 31, No. 3, pp. 264-323 (60 pages).

Muller, Tobias Carsten, et al., A Heuristic Approach for Offboard-Diagnostics in Advanced Automotive Systems, SAE World Congress 2009, Apr. 20, 2009, Detroit, MI, SAE Doc. No. 2009-01-1027 (9 pages).

Snap-On Incorporated, Ask-a-Tech FAQ, downloaded from the World Wide Web at http://web.archive.org/web/20110920223204/http://www.askatech.com/AskATechLive/faq.aspx as archived on Sep. 20, 2011 (10 pages).

Snap-On Incorporated, ShopKey Pro, Now Even Smarter, to Make Your Shop Look Even Smarter, Apr. 13, 2012 (4 pages).

The Stanford NLP Group, The Stanford Natural Language Processing Group, downloaded from the World Wide Web at http://nlp.stanford.edu/software/index.shtml on Oct. 17, 2014 (3 pages).

The Stanford NLP Group, The Stanford Natural Language Processing Group, Stanford CoreNLP, downloaded from the World Wide Web at http://nlp.stanford.edu/software/corenlp.shtml on Oct. 17, 2014 (8 pages).

Seyfert, Karl, OBD II Generic PID Diagnosis, Motor Magazine, Sep. 2007, Troy Michigan (7 pages).

Seyfert, Karl, "OBD II includes many helpful diagnostic trouble codes, designed to identify the possible causes of hundreds of potential system faults. But can ii correctly identify a loose nut behind the wheel?", Motor Magazine, Oct. 2015, Troy, Michigan, pp. 4 and 6 (2 pages).

Seyfert, Karl, "OBD II's self-diagnostic capabilities have been a real boon to repair on many vehicles. But the systems on some early vehicles can really throw you a curve.", Motor Magazine, Jun. 2005, Troy, Michigan, pp. 6 and 8 (2 pages).

International Search Report, International Application No. PCT/US2016/053951, dated Dec. 22, 2016 (5 pages).

Written Opinion of the International Searching Authority, International Application No. PCT/US2016/053951, dated Dec. 22, 2016 (5 pages).

Stan Stephenson; "Guided diagnostics: Taking OBD to the next level"; Motor Age, vol. 122, (6), pp. 161 and 168-170, Jun. 2003, Available: https://dialog.proquest.com/professional/docview/223218423?accountid=131444.

Albin Moore; The 10 Modes of OBDII; SearchAutoParts.com, Retrieved from Internet: https://www.searchautoparts.com/motorage/technicians/drivability/10-modes-obdii?page=0, 1 (Year 2013); Mar. 18, 2013; 8 pages.

Wikipedia; "OBD-II PIDs"; Wikipedia.com; Retrieved from the Internet: https://web.archive.org/web/20111019114024/https://en.wikipedia.org/wiki/OB-II_PIDs; archive date: Oct. 19, 2011; 24 pages.

Larry Carley; "Decoding On-Board Diagnostics"; retrieved from WayBack Machine, http://web.archive.org/web/20030804195537/http://www.aa1car.com/library/cm40122.htm, archive date: Aug. 4, 2003; 4 pages.

(56) References Cited

OTHER PUBLICATIONS

U.S. Appl. No. 19/382,584, filed Nov. 7, 2025, inventors: Patrick S. Merg, Jacob G. Foreman, Todd Mercer, Joshua C. Covington, Kahlil H. Cacabelos and Thomas Southward, (specification, claims, abstract and drawings 106 pages).

U.S. Appl. No. 19/403,109, filed Nov. 27, 2025, inventors: Patrick S. Merg, Jacob G. Foreman, Todd Mercer, Joshua C. Covington, Kahlil H. Cacabelos and Thomas Southward, (specification, claims, abstract and drawings 112 pages).

* cited by examiner

900

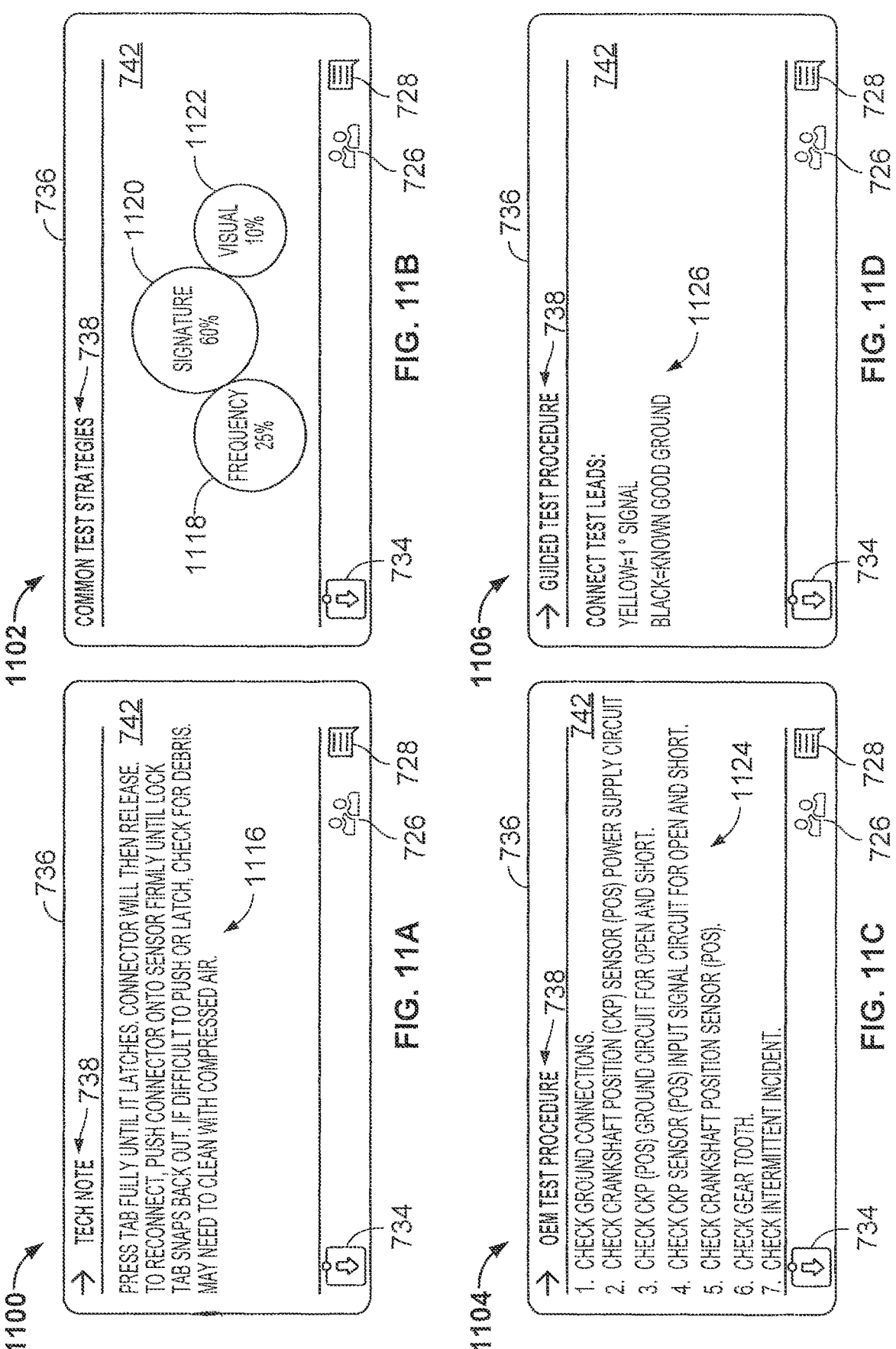

*1100*

→ TECH NOTE ◀ 738 *742*

PRESS TAB FULLY UNTIL IT LATCHES. CONNECTOR WILL THEN RELEASE.
TO RECONNECT, PUSH CONNECTOR ONTO SENSOR FIRMLY UNTIL LOCK
TAB SNAPS BACK OUT. IF DIFFICULT TO PUSH OR LATCH, CHECK FOR DEBRIS.
MAY NEED TO CLEAN WITH COMPRESSED AIR.

→ COMMON TEST STRATEGIES ◀ 738 *742*

SIGNATURE 60%

FREQUENCY 25%

VISUAL 10%

→ OEM TEST PROCEDURE ◀ 738 *742*

1. CHECK GROUND CONNECTIONS.
2. CHECK CRANKSHAFT POSITION (CKP) SENSOR (POS) POWER SUPPLY CIRCUIT
3. CHECK CKP (POS) GROUND CIRCUIT FOR OPEN AND SHORT.
4. CHECK CKP SENSOR (POS) INPUT SIGNAL CIRCUIT FOR OPEN AND SHORT.
5. CHECK CRANKSHAFT POSITION SENSOR (POS).
6. CHECK GEAR TOOTH.
7. CHECK INTERMITTENT INCIDENT.

→ GUIDED TEST PROCEDURE ◀ 738 *742*

CONNECT TEST LEADS:
YELLOW=1° SIGNAL
BLACK=KNOWN GOOD GROUND

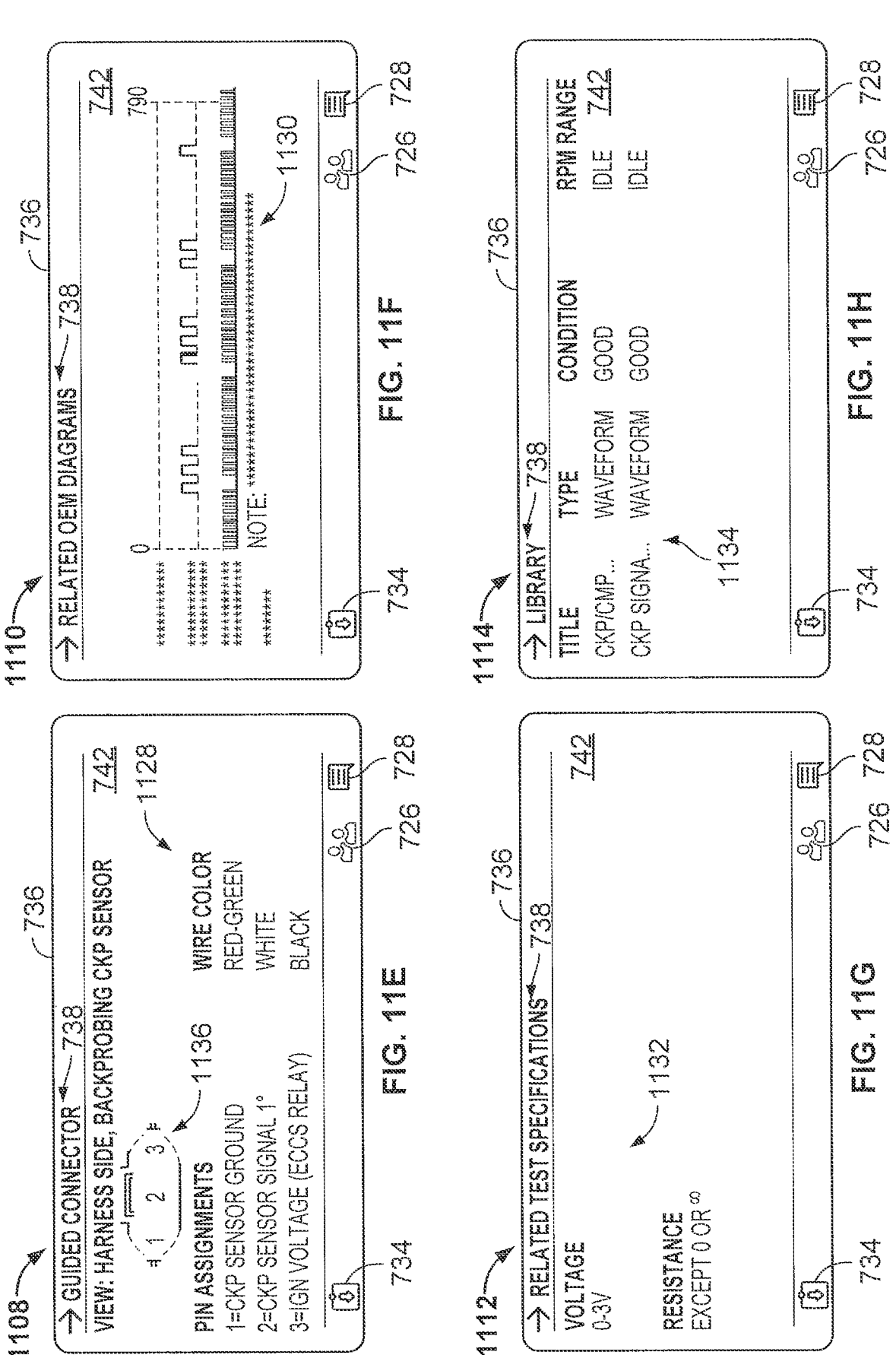

1108

→ GUIDED CONNECTOR ◀ 738    742

VIEW: HARNESS SIDE, BACKPROBING CKP SENSOR

1128

1136

PIN ASSIGNMENTS    WIRE COLOR

1=CKP SENSOR GROUND    RED-GREEN

2=CKP SENSOR SIGNAL 1°    WHITE

3=IGN VOLTAGE (ECCS RELAY)    BLACK 734    726   728

→ RELATED OEM DIAGRAMS ◀ 738    742

790

0

NOTE: ***********************

→ RELATED TEST SPECIFICATIONS ◀ 738    742

VOLTAGE
0-3V

1132

RESISTANCE
EXCEPT 0 OR ∞

→ LIBRARY ◀ 738

| TITLE | TYPE | CONDITION | RPM RANGE |
|---|---|---|---|
| CKP/CMP... | WAVEFORM | GOOD | IDLE   742 |
| CKP SIGNA... | WAVEFORM | GOOD | IDLE |

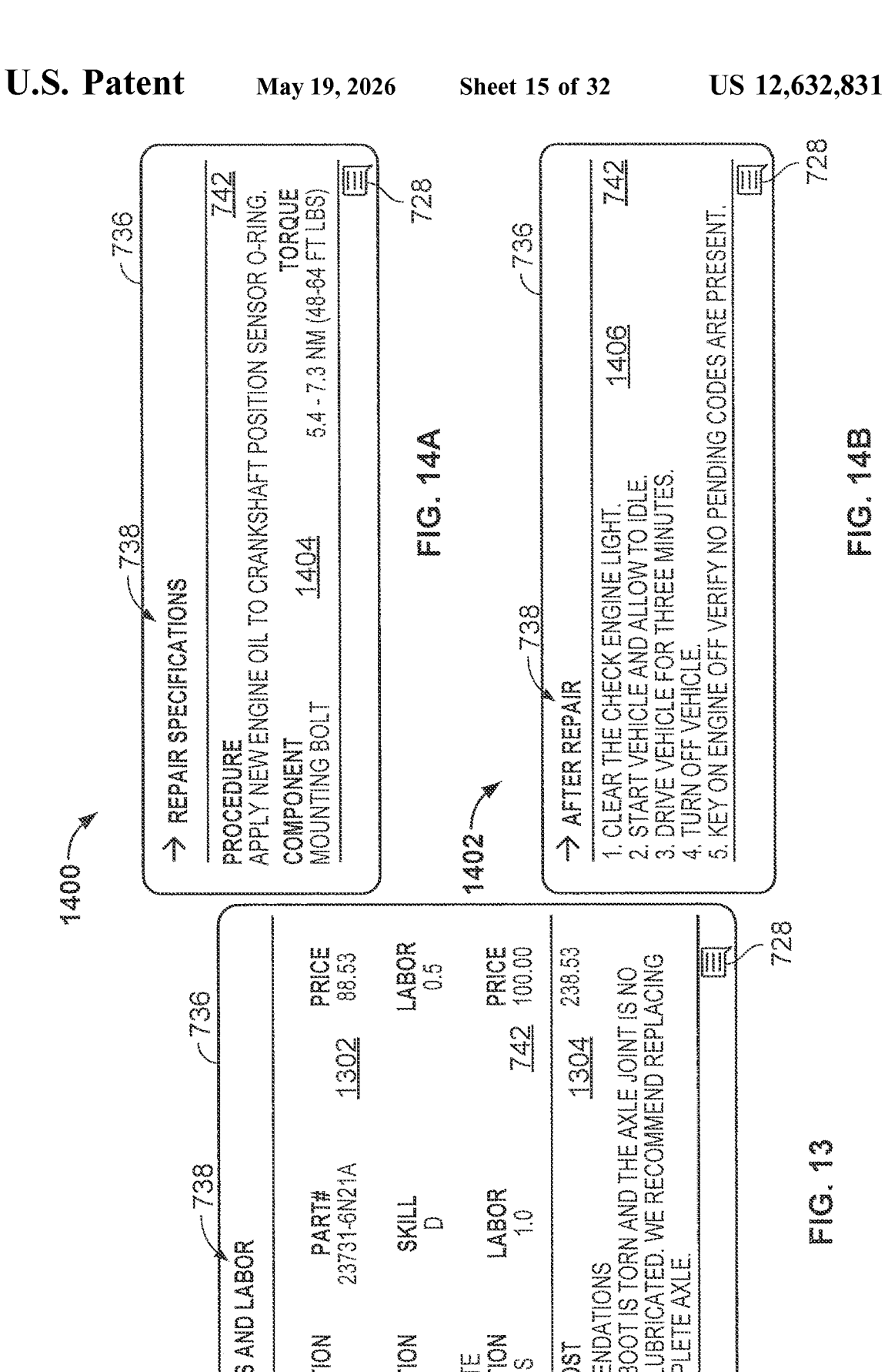

1300

→ PARTS AND LABOR   738   736

| PARTS APPLICATION 2.5L | PART# 23731-6N21A | 1302 | PRICE 88.53 |

| LABOR APPLICATION 2.5L | SKILL D | | LABOR 0.5 |

| SHOP RATE APPLICATION DIAGNOSIS | LABOR 1.0 | 742 | PRICE 100.00 |

| TOTAL COST | | 1304 | 238.53 |

RECOMMENDATIONS
CV AXLE BOOT IS TORN AND THE AXLE JOINT IS NO LONGER LUBRICATED. WE RECOMMEND REPLACING THE COMPLETE AXLE.

→ REPAIR SPECIFICATIONS   736   742

738

PROCEDURE   1404
APPLY NEW ENGINE OIL TO CRANKSHAFT POSITION SENSOR O-RING.

| COMPONENT | TORQUE |
| MOUNTING BOLT | 5.4 - 7.3 NM (48-64 FT LBS) |

→ AFTER REPAIR   736   742

738

1406

1. CLEAR THE CHECK ENGINE LIGHT.
2. START VEHICLE AND ALLOW TO IDLE.
3. DRIVE VEHICLE FOR THREE MINUTES.
4. TURN OFF VEHICLE.
5. KEY ON ENGINE OFF VERIFY NO PENDING CODES ARE PRESENT.

→ FINAL REPORT

CAUSE
CONNECTED A SCAN TOOL AND FOUND CODE P0335 - CRANKSHAFT POSITION SENSOR "A" CIRCUIT. VISUAL INSPECTION OF THE CRANKSHAFT POSITION (CKP) SENSOR WIRING FOUND NO APPARENT DAMAGE. DISCONNECTED THE CKP SENSOR CONNECTOR AND VERIFIED THE SIGNAL, GROUND, AND REFERENCE VOLTAGE CIRCUITS USING A MULTI-METER. CONNECTED THE CKP SENSOR AND BACKPROBED THE SENSOR SIGNAL WHILE CRANKING THE ENGINE. THE SENSOR HAD INTERMITTENT DROP-OUTS IN THE SIGNAL OUTPUT, INDICATING AN INTERNALLY FAULTY CKP SENSOR.

CORRECTION
REPLACED THE CRANKSHAFT POSITION SENSOR, CLEARED CODES, PERFORMED A ROAD TEST AND VERIFIED THE VEHICLE OPERATED PROPERLY. THE CHECK ENGINE LIGHT DID NOT ILLUMINATE AND NO FAULT CODES RETURNED.

RECOMMENDATIONS
CV AXLE BOOT IS TORN AND THE AXLE JOINT IS NO LONGER LUBRICATED. WE RECOMMEND REPLACING THE COMPLETE AXLE.

FIG. 15

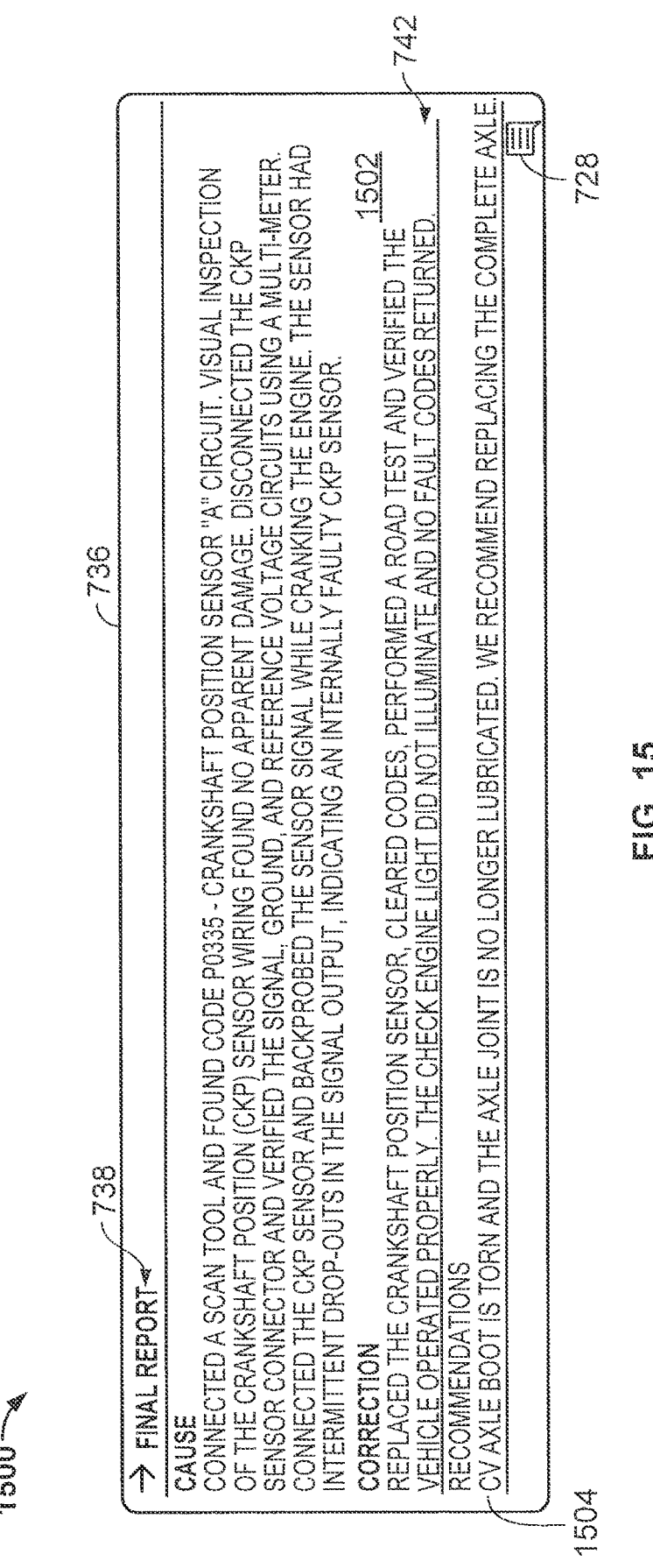

Figure 16:
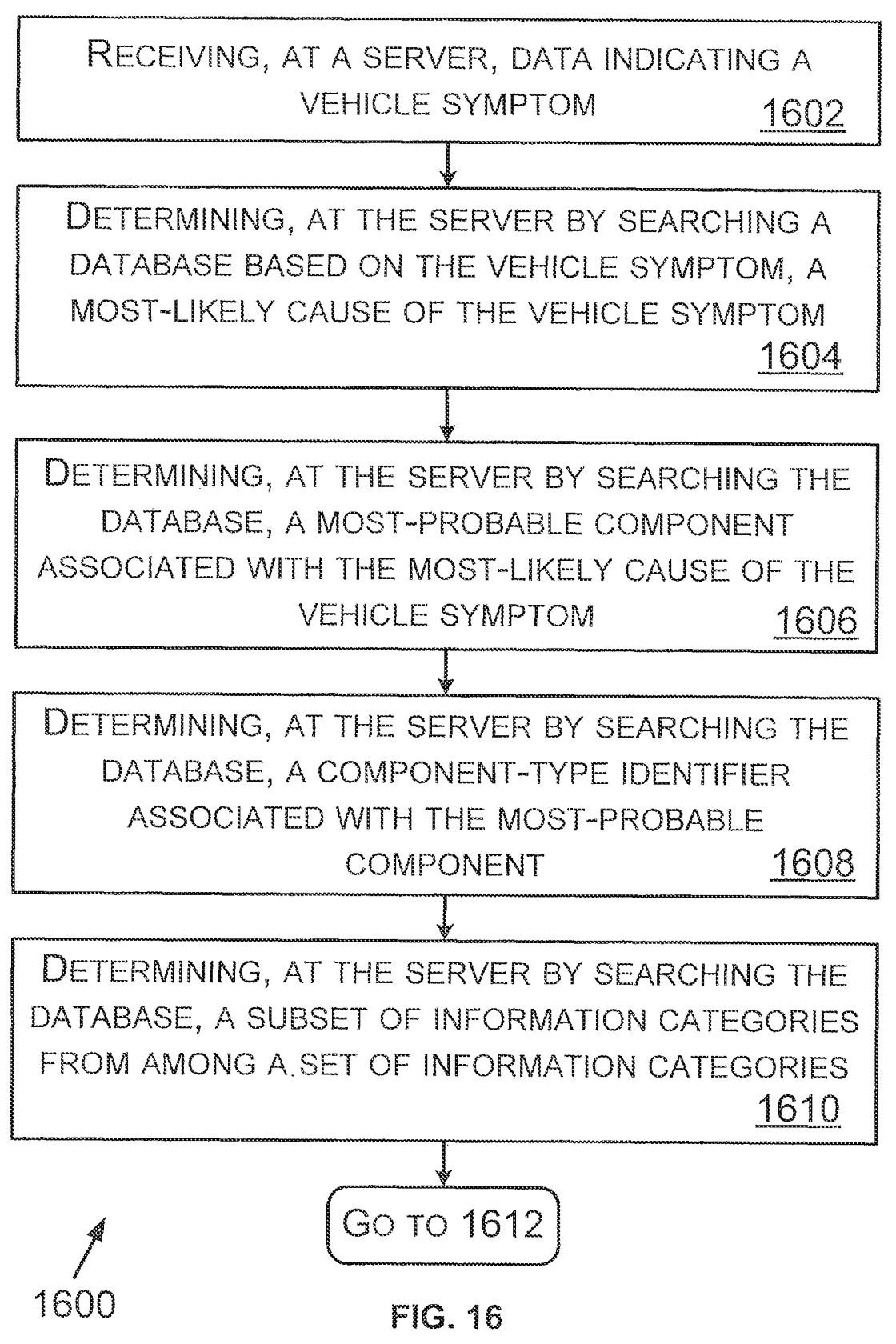

RECEIVING, AT A SERVER, DATA INDICATING A VEHICLE SYMPTOM　　1602

DETERMINING, AT THE SERVER BY SEARCHING A DATABASE BASED ON THE VEHICLE SYMPTOM, A MOST-LIKELY CAUSE OF THE VEHICLE SYMPTOM　1604

DETERMINING, AT THE SERVER BY SEARCHING THE DATABASE, A MOST-PROBABLE COMPONENT ASSOCIATED WITH THE MOST-LIKELY CAUSE OF THE VEHICLE SYMPTOM　　1606

DETERMINING, AT THE SERVER BY SEARCHING THE DATABASE, A COMPONENT-TYPE IDENTIFIER ASSOCIATED WITH THE MOST-PROBABLE COMPONENT　　1608

DETERMINING, AT THE SERVER BY SEARCHING THE DATABASE, A SUBSET OF INFORMATION CATEGORIES FROM AMONG A SET OF INFORMATION CATEGORIES　　1610

FROM 1610

DETERMINING, AT THE SERVER BY SEARCHING THE DATABASE, DATA TO DISPLAY IN MULTIPLE DISPLAY CARDS OF A FIRST DISPLAYABLE PAGE   <u>1612</u>

GENERATING, AT THE SERVER, THE FIRST DISPLAYABLE PAGE INCLUDING THE MULTIPLE DISPLAY CARDS OF THE FIRST DISPLAYABLE PAGE AND THE DATA TO DISPLAY IN THE RESPECTIVE DISPLAY CARDS OF THE FIRST DISPLAYABLE PAGE <u>1614</u>

1600

Figure 18:
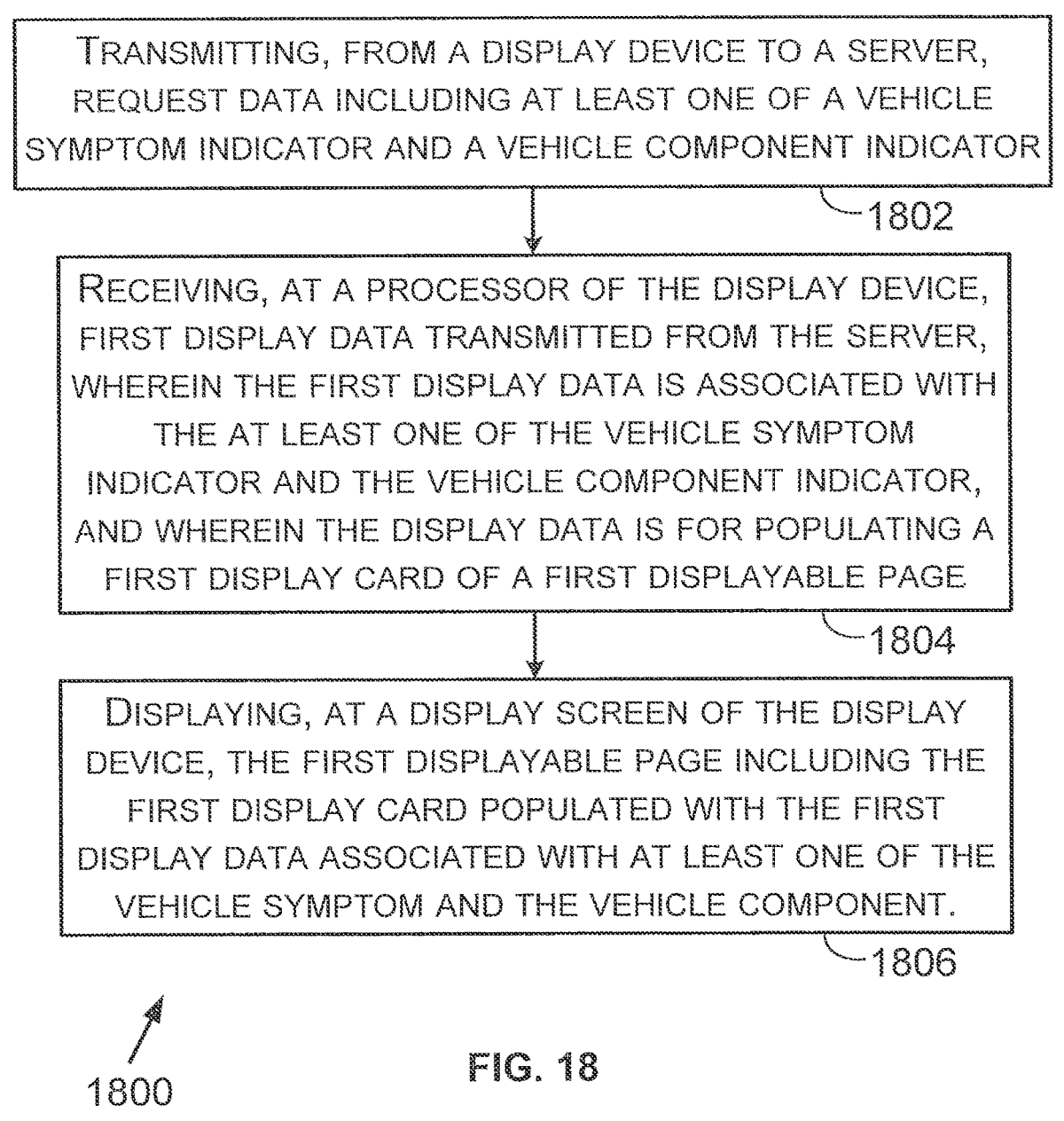

TRANSMITTING, FROM A DISPLAY DEVICE TO A SERVER, REQUEST DATA INCLUDING AT LEAST ONE OF A VEHICLE SYMPTOM INDICATOR AND A VEHICLE COMPONENT INDICATOR

⌐1802

RECEIVING, AT A PROCESSOR OF THE DISPLAY DEVICE, FIRST DISPLAY DATA TRANSMITTED FROM THE SERVER, WHEREIN THE FIRST DISPLAY DATA IS ASSOCIATED WITH THE AT LEAST ONE OF THE VEHICLE SYMPTOM INDICATOR AND THE VEHICLE COMPONENT INDICATOR, AND WHEREIN THE DISPLAY DATA IS FOR POPULATING A FIRST DISPLAY CARD OF A FIRST DISPLAYABLE PAGE

⌐1804

DISPLAYING, AT A DISPLAY SCREEN OF THE DISPLAY DEVICE, THE FIRST DISPLAYABLE PAGE INCLUDING THE FIRST DISPLAY CARD POPULATED WITH THE FIRST DISPLAY DATA ASSOCIATED WITH AT LEAST ONE OF THE VEHICLE SYMPTOM AND THE VEHICLE COMPONENT.

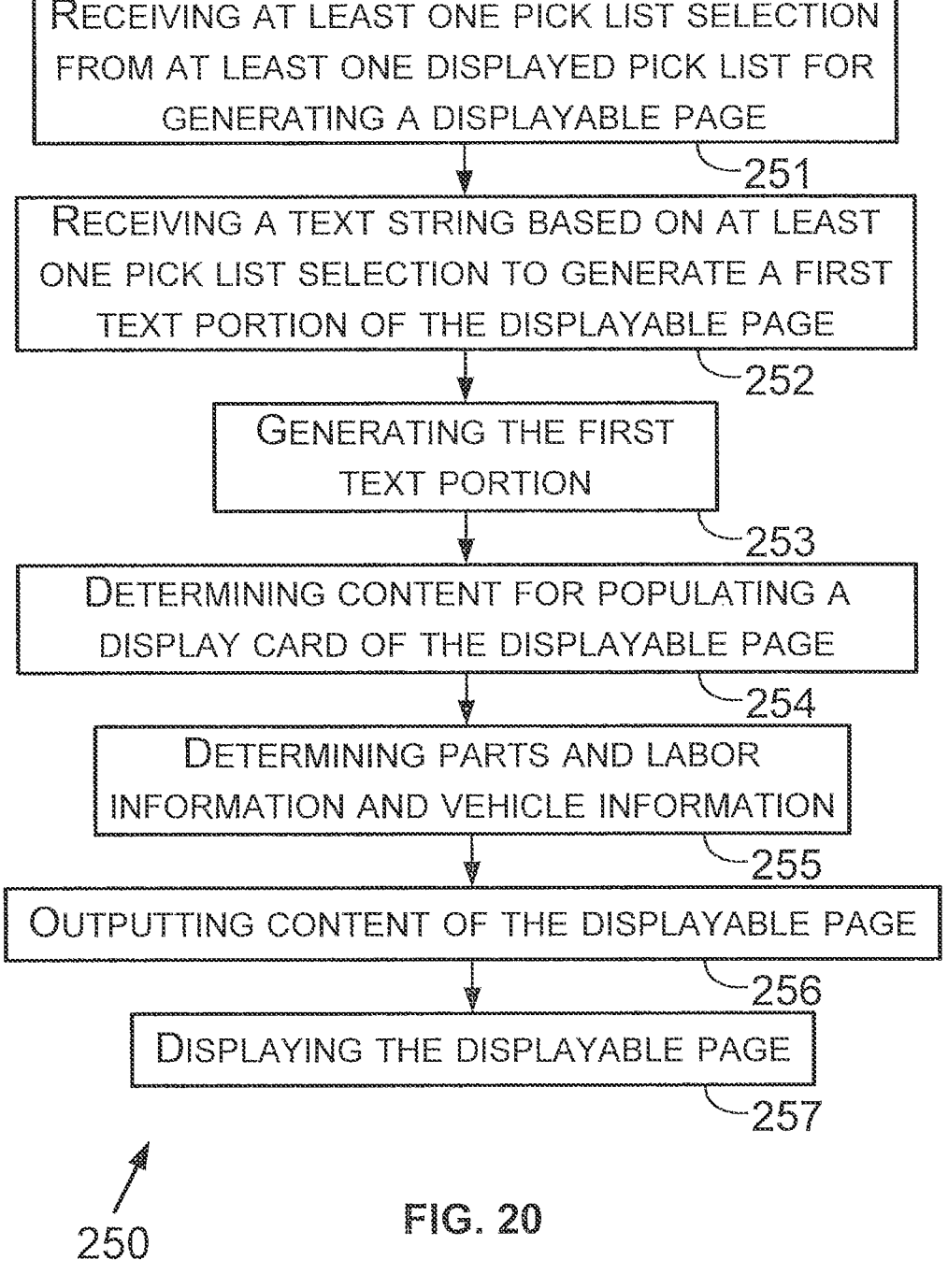

RECEIVING AT LEAST ONE PICK LIST SELECTION FROM AT LEAST ONE DISPLAYED PICK LIST FOR GENERATING A DISPLAYABLE PAGE ~251

RECEIVING A TEXT STRING BASED ON AT LEAST ONE PICK LIST SELECTION TO GENERATE A FIRST TEXT PORTION OF THE DISPLAYABLE PAGE ~252

GENERATING THE FIRST TEXT PORTION ~253

DETERMINING CONTENT FOR POPULATING A DISPLAY CARD OF THE DISPLAYABLE PAGE ~254

DETERMINING PARTS AND LABOR INFORMATION AND VEHICLE INFORMATION ~255

OUTPUTTING CONTENT OF THE DISPLAYABLE PAGE ~256

DISPLAYING THE DISPLAYABLE PAGE ~257

270

Vehicle Information ←—271

Year: 2001

Make: Honda

Model: Accord    Submodel: EX

Engine: 3.0L     Mileage: 71,333

Parts and Labor ←—272

Component: EGR valve

Part Number: 18011-P8A-A00

Price: $236.28

Labor: Diagnosis (D45) Time: 0.5

Labor: R & R (R105) Time: 0.6

Total labor time: 1.1 Rate: $105

Total labor cost: $115.50

Service information ←—273

Complaint: The customer states the check engine light is on. ←

274 ——275

Cause: Connected a scan tool and found code P0401 – exhaust gas recirculation 'A' flow insufficient detected. Used the scan tool to command the exhaust gas recirculation valve open to 100%, observed the valve position parameters on the scan tool, and found the valve actual position remained at 0%.

277

→ Common Replaced Parts Graph +3263

804

526

256

0

0k   25k   50k   75k   100k   125k   150k   175k   200k

278

276

Additional Related Replacements +1502

CKP Bolt
10%

CKP Connector
10%

O-Ring
25%

Camshaft Position Sensor
60%

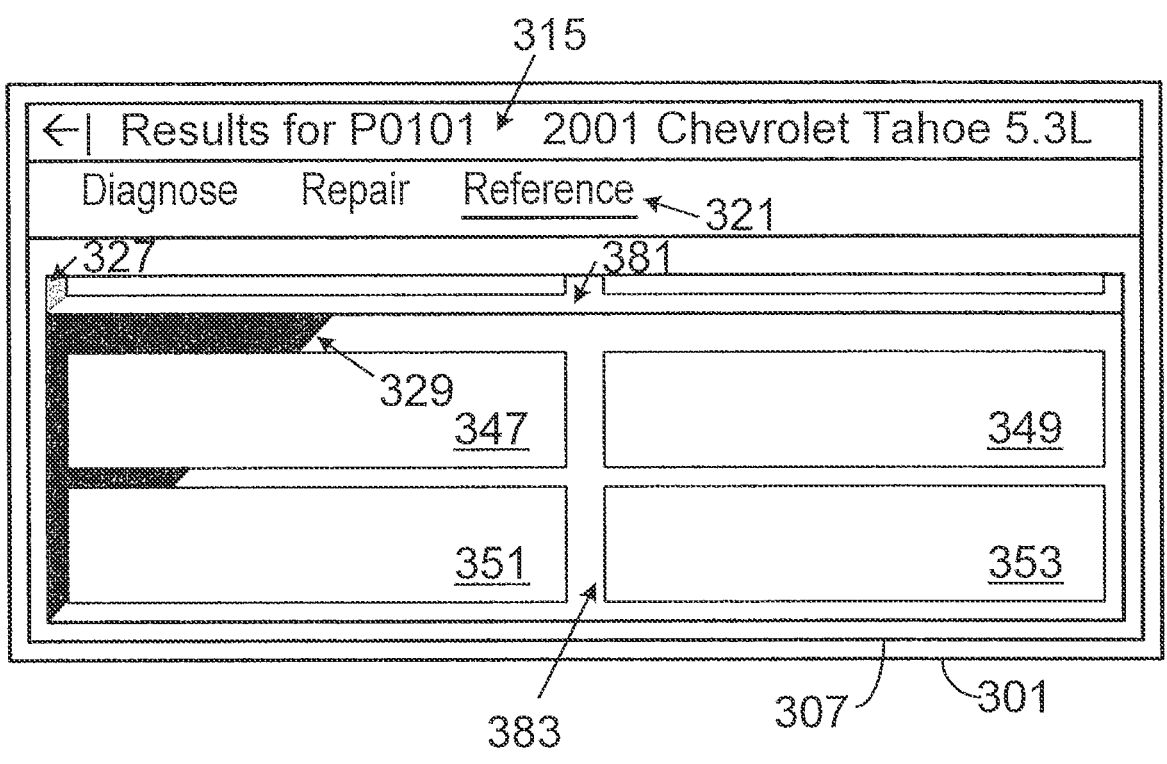
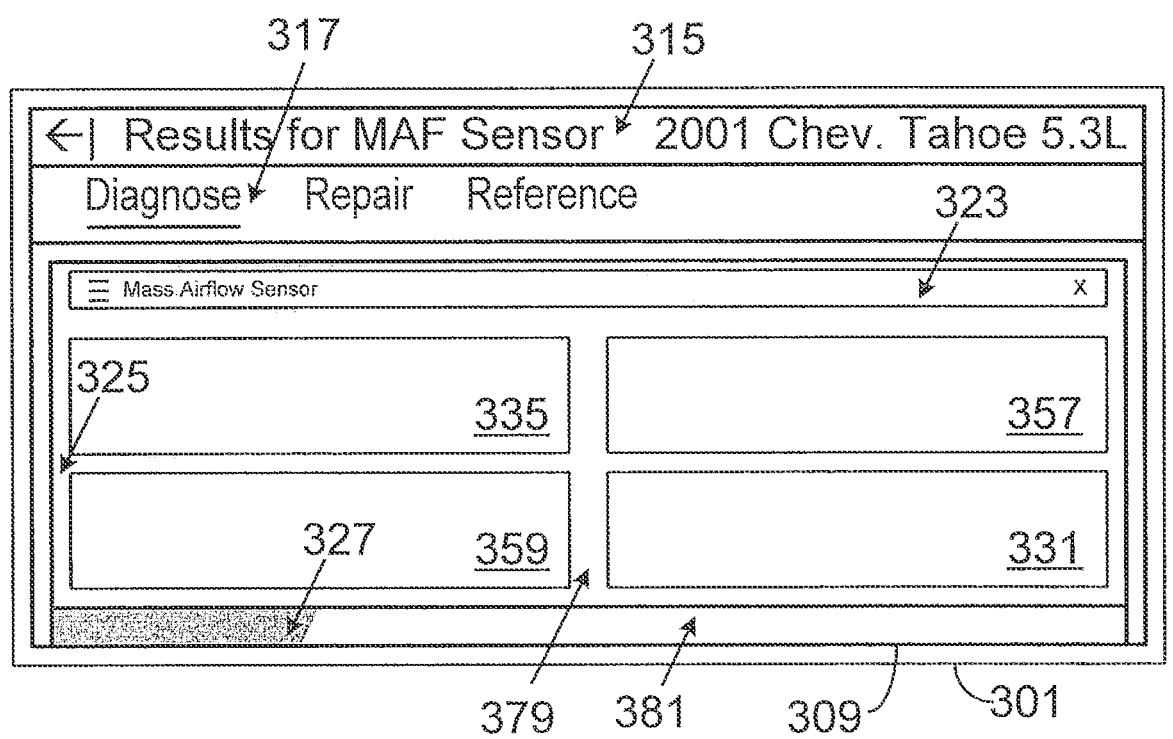
FIG. 24

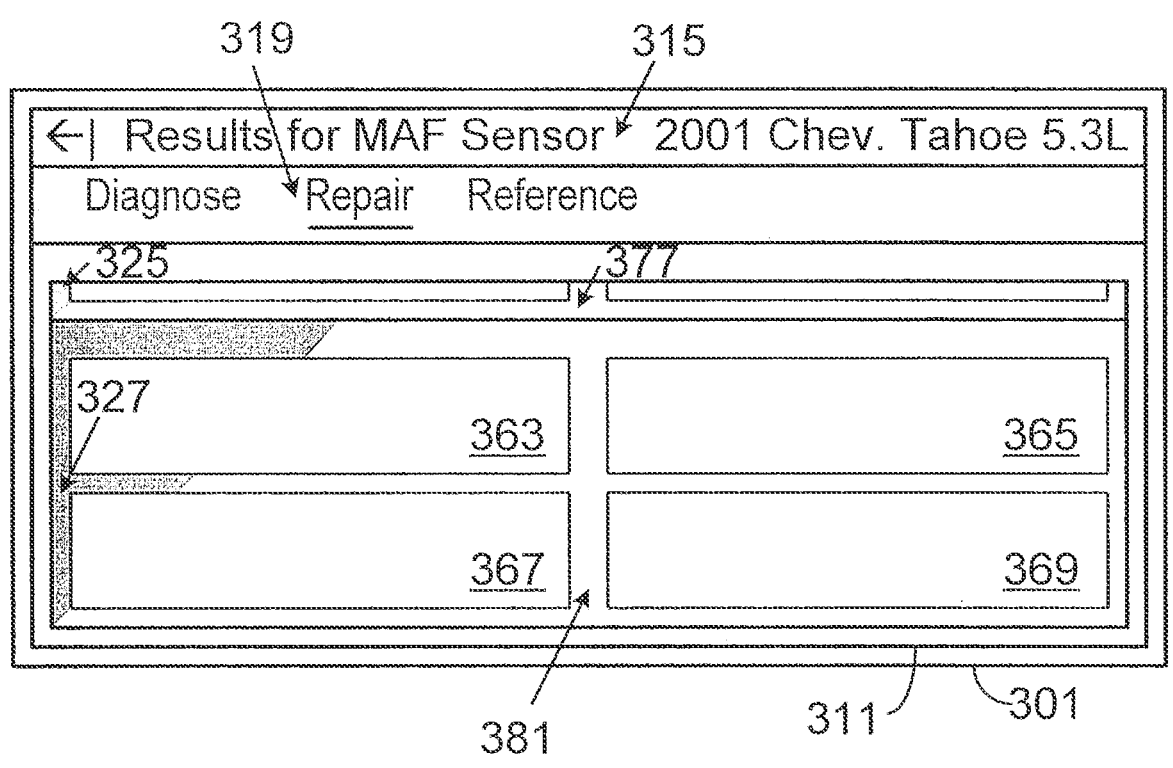
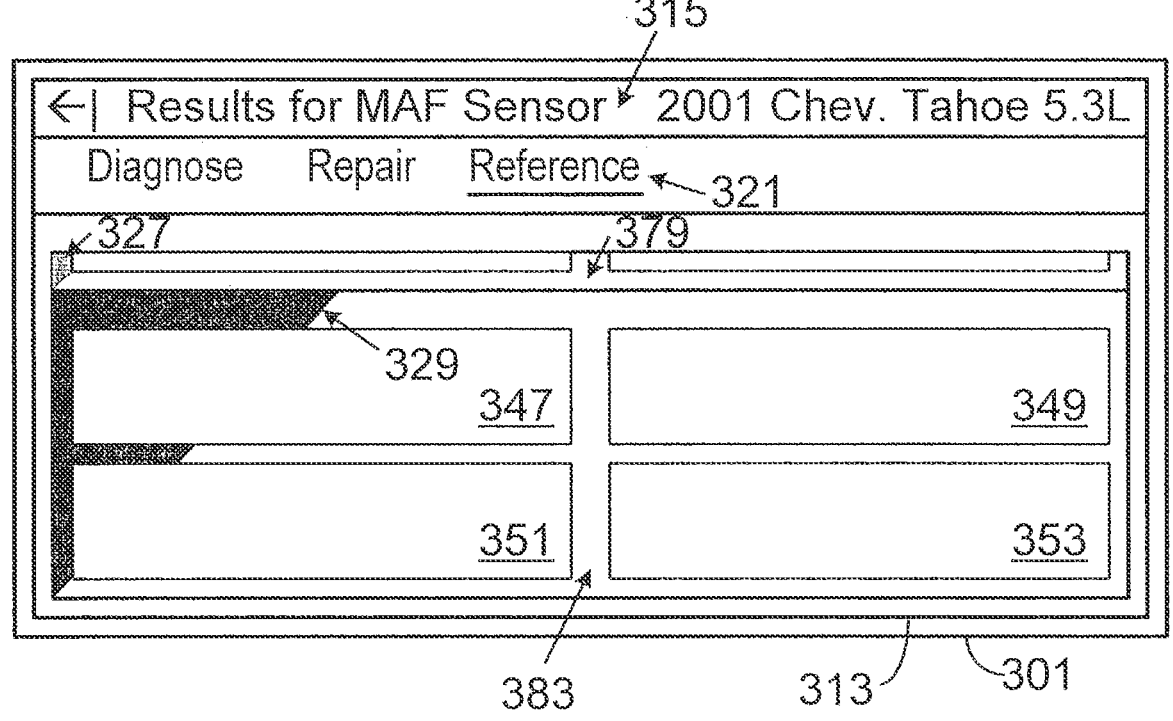
FIG. 25

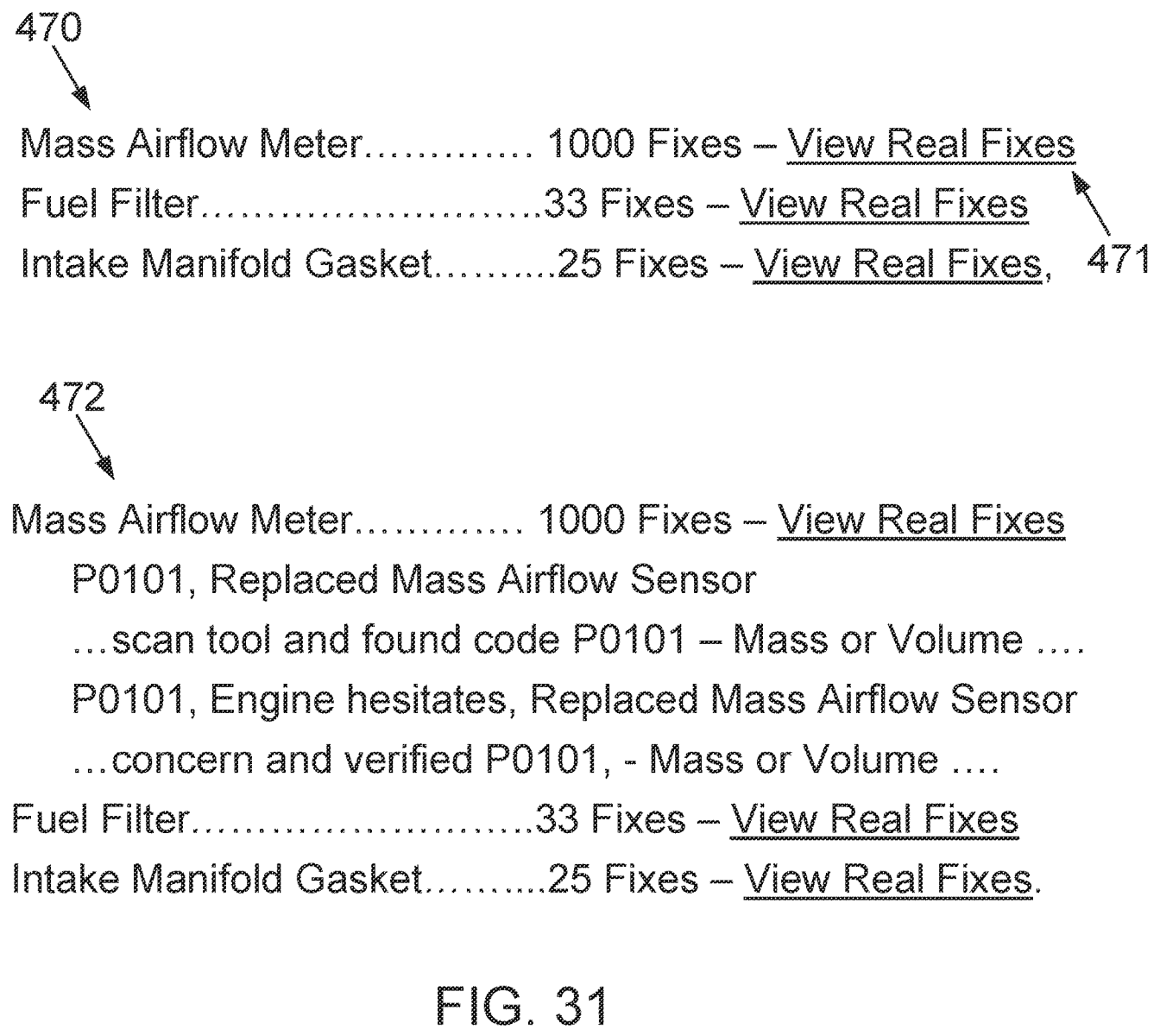

470

Mass Airflow Meter............... 1000 Fixes – View Real Fixes

Fuel Filter..............33 Fixes – View Real Fixes

Intake Manifold Gasket..........25 Fixes – View Real Fixes, 471

472

Mass Airflow Meter............... 1000 Fixes – View Real Fixes

P0101, Replaced Mass Airflow Sensor

...scan tool and found code P0101 – Mass or Volume ....

P0101, Engine hesitates, Replaced Mass Airflow Sensor

...concern and verified P0101, - Mass or Volume ....

Fuel Filter..............33 Fixes – View Real Fixes

Intake Manifold Gasket..........25 Fixes – View Real Fixes.

FIG. 31

SYSTEM AND METHOD FOR DYNAMICALLY-CHANGEABLE DISPLAYABLE PAGES WITH VEHICLE SERVICE INFORMATION

REFERENCE TO RELATED APPLICATION

This application is a continuation application of U.S. patent application Ser. No. 14/874,317, which was filed on Oct. 2, 2015 and was published as United States Patent Application Publication No. 2017/0098200 A1 on Apr. 6, 2017. U.S. patent application Ser. No. 14/874,317 and United States Patent Application Publication No. 2017/0098200 A1 are incorporated herein by reference.

BACKGROUND

Most vehicles are serviced at least once during their useful life. In many instances, a vehicle is serviced at a facility with professional mechanics (e.g., technicians). The technicians may use any of a variety of hand tools to service (e.g., repair) any of the wide variety of mechanical components on a vehicle. The technicians may also use electronic diagnostic equipment to service (e.g., diagnose) any of the wide variety of electrical components on a vehicle. The technician may need different data during various stages of servicing the vehicle in conjunction with or without the various tools and equipment. The technician may need to spend valuable time searching for the various data needed to service the vehicle and even more valuable time explaining the extent of service performed on the vehicle to a service advisor so that the repair shop may prepare a customer invoice in connection with servicing the vehicle.

OVERVIEW

Several example embodiments are described herein. In one respect, an example embodiment may take the form of a method comprising: (i) receiving, at a computer server, data indicating a vehicle symptom, (ii) determining, at the server by searching a computer-readable database coupled to the server based on the vehicle symptom, a most-likely cause of the vehicle symptom, (iii) determining, at the server by searching the database, a most-probable component associated with the most-likely cause of the vehicle symptom, (iv) determining, at the server by searching the database, a component-type identifier associated with the most-probable component, wherein the component-type identifier is one of a plurality of component type identifiers, (v) determining, at the server by searching the database, a subset of information categories from among a set of information categories, wherein the set of information categories include multiple categories associated with at least one component type identifier of the plurality of component type identifiers, (vi) determining, at the server by searching the database, data to populate in at least one display card of a first displayable page, wherein each respective display card of the first displayable page pertains to a respective information category of the subset of information categories and to the vehicle symptom, and (vii) generating, at the server, the first displayable page including the at least one display card and the data to populate in the at least one display card.

In another respect, an example embodiment may take the form of a system comprising: a computer-readable database containing data to populate in at least one display card of a first displayable page to be displayed at a display of a display device, and a computer server coupled to the computer-readable database and programmed to: (i) receive from the display device by way of a network coupled to the computer server data indicating a vehicle symptom, (ii) search the database to determine a most-likely cause of the vehicle symptom, (iii) search the database to determine a most-probable component associated with the most-likely cause of the vehicle symptom, (iv) search the database to determine a component-type identifier associated with the most-probable component, wherein the component-type identifier is one of a plurality of component type identifiers, (v) search the database to determine a subset of information categories from among a set of information categories, wherein the set of information categories include multiple categories associated with at least one component type identifier of the plurality of component type identifiers, (vi) search the database to determine data to populate in the at least one display card of the displayable page, wherein each display card of the first displayable page pertains to a respective information category of the subset of information categories and to the vehicle symptom, and (vii) generate the first displayable page including the at least one display card and the data to populate in the at least one display card.

In yet another respect, an example embodiment may take the form of a method comprising: (i) transmitting, from a display device to a server, request data including at least one of a vehicle symptom indicator and a vehicle component indicator, (ii) receiving, at a processor of the display device, first display data transmitted from the server, wherein the first display data is associated with the at least one of the vehicle symptom indicator and the vehicle component indicator, and wherein the first display data is for populating a first display card of a first displayable page, and (iii) displaying, at a display of the display device, the first displayable page including the first display card populated with the first display data associated with at least one of the vehicle symptom and the vehicle component.

In yet another respect, an example embodiment may take the form of a system comprising: a network interface: a display screen, a processor, and a computer-readable data storage medium containing computer-readable program instructions, that when executed by the processor, cause a set of functions to be performed, the set of functions comprising: (i) transmitting, by the network interface to a server, request data including at least one of a vehicle symptom indicator and a vehicle component indicator, (ii) receiving, at the processor, first display data transmitted from the server, wherein the first display data is associated with the at least one of the vehicle symptom indicator and the vehicle component indicator, and wherein the first display data is for populating a first display card of a first displayable page, and (iii) displaying, at the display screen, the first displayable page including the first display card populated with the first display data associated with at least one of the vehicle symptom and the vehicle component.

In yet another respect, an example embodiment may take the form of a method comprising: (i) receiving, at a processor, at least one pick list selection from at least one displayed pick list for generating a displayable page, (ii) receiving, at the processor, a text string based on the at least one pick list selection to generate a first text portion of the displayable page, (iii) generating, at the processor, the first text portion, (iv) determining, at the processor, content for populating a display card of the displayable page, (v) determining, at the processor, parts and labor information and vehicle information, and (vi) outputting, by the processor, content of the displayable page including the display card, the first text portion, the parts and labor information, and the vehicle information.

In yet another respect, an example embodiment may take the form of a system comprising: a processor, and a computer-readable data storage medium containing computer-readable program instructions, that when executed by the processor, cause a set of functions to be performed, the set of functions comprising: (i) receiving, at the processor, at least one pick list selection from at least one displayed pick list for generating a displayable page, (ii) receiving, at the processor, a text string based on the at least one pick list selection to generate a first text portion of the displayable page, (iii) generating, at the processor, the first text portion, (iv) determining, at the processor, content for populating a display card of the displayable page, (v) determining, at the processor, parts and labor information and vehicle information, and (vi) outputting, by the processor, content of the displayable page including the display card, the first text portion, the parts and labor information, and the vehicle information.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIGS. 11A, 11B, 11C, 11D, 11E, 11F, 11G, 11H, 12A, 12B, 12C, 12D, 12E, 13, 14A, 14B, and 15 show display cards in accordance with an example embodiment.

FIG. 16 and FIG. 17 show a flowchart depicting a set of functions that may be carried out in accordance with an example embodiment.

FIG. 18 shows a flowchart depicting another set of functions that may be carried out in accordance with an example embodiment.

FIG. 20 is a flowchart depicting aspects pertaining to displaying a displayable page on a display device.

FIG. 21 shows a displayable page in accordance with an example embodiment.

FIGS. 22, 23, 24, and 25 show displayable pages with multiple displayable sections.

FIG. 31 depicts example text displayed on a display.

DETAILED DESCRIPTION

I. Introduction

Figure 1:
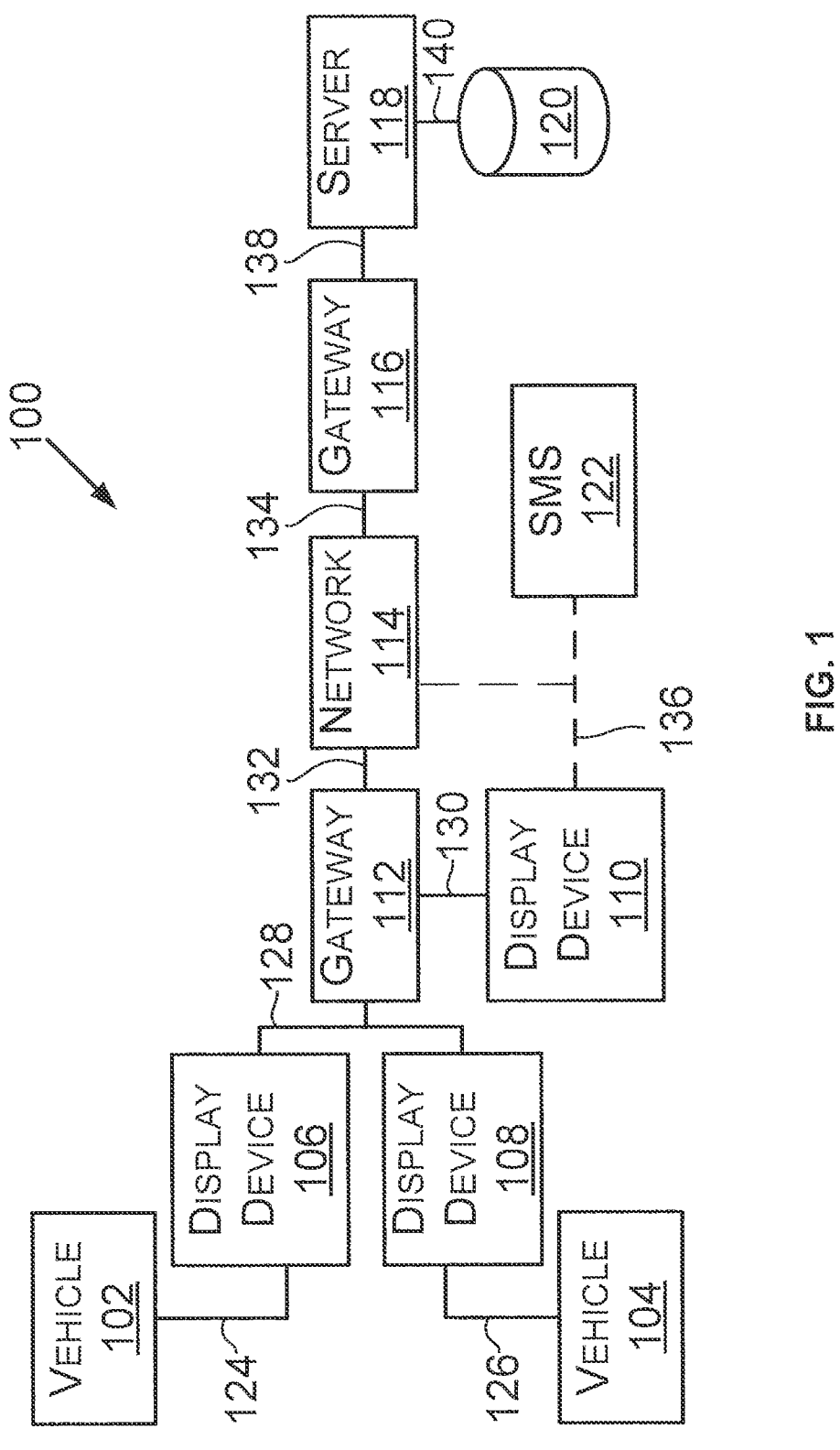
FIG. 1 is a block diagram showing components of a system in accordance with an example embodiment.

This description describes several example embodiments. At least some of those example embodiments pertain to generating a displayable page or displayable section including one or more display cards and data within the display card(s). At least some of the example embodiment pertain to displaying a displayable page or displayable section including one or more display cards and data within the display card(s). An example embodiment pertains to servers that may generate a display page or displayable section including one or more display cards and data within the display card(s). An example embodiment pertains to display devices and components thereof for displaying a display page or displayable section including multiple display cards and data within the display cards. A person having ordinary skill in the art will understand that a displayable page with a single display card, such as any example display card shown or described herein, can be generated and displayed at a display device with or without other data. Other example embodiments are also described.

In this description, the articles "a," "an" or "the" are used to introduce elements of the example embodiments. The intent of using those articles is that there is one or more of the elements. The intent of using the conjunction "or" within a described list of at least two terms is to indicate any of the listed terms or any combination of the listed terms. For example, in a list of terms recited as "A, B, or C," the combinations indicated by that list of terms include "A and B," "A and C," "B, and C," and "A, B, and C." Each individual term A, B, and C in the list of terms may exist independently without any other term in the list. The use of ordinal numbers such as "first," "second," "third" and so on is to distinguish respective elements rather than to denote a particular order of those elements unless the context of using those terms explicitly indicates otherwise.

The term "data" within this description may be used interchangeably with the term "information" or similar terms, such as "content." The data described herein may be transmitted and received. As an example, any transmission of the data described herein may occur directly from a transmitting device (e.g., a transmitter) to a receiving device (e.g., a receiver). As another example, any transmission of the data described herein may occur indirectly from the transmitter to receiver via one of one or more intermediary network devices, such as an access point, an antenna, a base station, a hub, a modem, a relay, a router, a switch, or some other network device.

The diagrams, flow charts, and other data shown in the figures are provided merely as examples and are not intended to be limiting. Many of the elements illustrated in the figures or described herein are functional elements that may be implemented as discrete or distributed components or in conjunction with other components, and in any suitable combination and location. Those skilled in the art will appreciate that other arrangements and elements (e.g., machines, interfaces, functions, orders, or groupings of functions) may be used instead. Furthermore, various functions described as being performed by one or more elements may be carried out by a processor executing computer-readable program instructions (CRPI) or by a combination of hardware, firmware, or software. Furthermore still, identical reference numbers used in the same or different figures denote elements that are identical to other elements referred to by the same reference number, but those denoted elements and the other elements are no so limited.

II. Example Systems and Devices

FIG. 1 is a block diagram 100 showing component(s) of a system. The components shown in FIG. 1 include a vehicle 102, a vehicle 104, a display device 106, a display device 108, a display device 110, a gateway 112, a network 114, a gateway 116, a server 118, a database 120, a vehicle-to-display-device communication link 124, a vehicle-to-display-device communication link 126, a display-device-to-gateway communication link 128, a display-device-to-gateway communication link 130, a server-to-gateway communication link 138, a server-to-database communication link 140, network communication links 132, 134, a service management system (SMS) 122, and an SMS-to-network communication link 136.

A system including a component shown in FIG. 1 may include all of the components shown in FIG. 1 or any proper subset of components shown in FIG. 1. Any one of those systems may include other components not shown in FIG. 1 as well. As an example, a first example system may include one of the display devices 106, 108 and 110, the gateways 112, 116, the network 114, the server 118, and the database 120, and the communication links shown connecting the system components. Multiple display devices are shown in FIG. 1 to illustrate examples of how a display device may be used or connected within an example system.

A person skilled in the art will understand that an example embodiment including a display device may include only one display device rather than multiple display devices. Accordingly, in some embodiments, such as an embodiment including the display device 110, the system may be operational without a vehicle being connected to a display device. At another time though, the display device 110 may connect to a vehicle and be operational within the example system.

A vehicle, such as the vehicle 102 or the vehicle 104, is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, an all-terrain vehicle (ATV) defined by ANSO/SVIA-1-2007, a snowmobile, a personal watercraft (e.g., a JET SKI® personal watercraft), a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

A first end of the vehicle-to-display-device communication links 124, 126 may connect to a DLC within the vehicle 102 and a DLC within the vehicle 104, respectively, and a second end of the vehicle-to-display-device communication links 124, 126 may connect to the display device 106 and the display device 108, respectively. The vehicle-to-display-device communication links 124, 126 may include one or more conductors (e.g., copper wire conductors) or may be wireless. As an example, the vehicle-to-display-device communication links 124, 126 may include one or two conductors for carrying vehicle data messages in accordance with a vehicle data message (VDM) protocol. A VDM protocol may include a Society of Automotive Engineers (SAE) J1850 (PWM or VPW) VDM protocol, an International Organization of Standardization (ISO) 15764-4 controller area network VDM protocol, an ISO 9141-2 K-Line VDM protocol, an ISO 14230-4 KWP2000 K-Line VDM protocol, or some other protocol presently defined or that may be defined in the future for performing communications within a vehicle.

The DLC may include an on-board diagnostics (OBD) II connector. An OBD II connector may include slots for retaining up to 16 connector terminals, but may include a different number of slots or no slots at all. As an example, the DLC connector may include an OBD II connector that meets the SAE J1962 specification such as a connector 16M, part number 12110252, available from Delphi Automotive LLP of Troy, Michigan. The DLC may include conductor terminals that connect to a conductor in the vehicle 102. For instance, the DLC may include connector terminals that connect to conductors that respectively connect to positive and negative terminals of a vehicle battery. The DLC may include one or more conductor terminals that connect to a conductor of the vehicle communication link such that the DLC is communicatively connected to the ECU. The display devices that are connectable to a vehicle may include a DB-25 connector, an Ethernet connector, a Universal Serial Bus connector or some other connector for connecting to the vehicle-to-display-device communication links 124, 126. Two or more devices described herein as being communicatively coupled to each other may be carried out using circuit-switched communication links, packet-switched communication links, or a combination of such communication links.

A display device, such as the display device 106, 108, or 110, may operate through use of an electrical current provided to it from a vehicle battery by way of a DLC and a communication link, or by another electrical energy source. For example, the display devices 106, 108, and 110 may include an electrical energy source, such as a battery, or the display devices 106, 108, and 110 may receive an electrical current for its operation from an electrical energy source other than a vehicle or an internal battery, such as an alternating electrical current available at a wall outlet.

The ECU may control various aspects of vehicle operation or components within a vehicle, such as the vehicle 102. For example, the ECU may include a powertrain system ECU, an engine control module (ECM) ECU, a supplemental inflatable restraint system (i.e., an air bag system) ECU, an entertainment system ECU, or some other ECU. The ECU may receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within the vehicle 102.

Transmission of a VDM may occur over the vehicle communication link within a vehicle. In that way, a VDM may be transmitted to the DLC and, in turn, to the display device 106 or 108 connected to the vehicle. A VDM may include data such as (i) an ECU identifier, (ii) a parameter identifier (PID), (iii) a mode identifier that identifies a current data mode, a freeze frame data mode, a vehicle information mode, a DTC mode, or some other mode, (iv) a parameter value, (v) data identifying a characteristic of the vehicle (e.g., a vehicle identification number (VIN)), or (vi) some other vehicle data. As an example, a VDM that indicates the engine revolutions per minute (RPM) of an engine within the vehicle 102 may comprise the hexadecimal data "41 0C 0F A0," where "41" represents a response to a mode 01 request, "0C" is a PID indicating engine RPM, and "0F A0" is the parameter value representing the RPM (¼ RPM per bit). In this case, the hexadecimal value "0F A0" equals 4,000. At ¼ RPM per bit, the engine RPM represented by the example VDM is 1,000 RPM.

In accordance with the example embodiments in which a communication link, such as the vehicle-to-display-device communication link 124 or any other communication link described herein, communicates data wirelessly, such wireless communication of data may be carried out in accordance with a wireless communication protocol (e.g., a wireless communication standard). As an example, a wireless communication protocol may include an Institute of Electrical and Electronics Engineers (IEEE) 802.15.1 standard for wireless personal area networks (PANs) or a Bluetooth version 4.1 standard developed by the Bluetooth Special Interest Group (SIG) of Kirkland, Washington. As another example, the wireless communication protocol may include an IEEE 802.11 standard for wireless LANs, which is sometimes referred to as a "Wi-Fi® standard." As another example, the wireless communication protocol may include a cellular phone standard, such as standard for 3G or 4G cellular phone communications developed by the $3^{rd}$ Generation Partnership Project (3GPP). Other examples of a wireless communication protocol are also possible.

A gateway, such as gateway 112, gateway 116, or any other gateway described herein, may include a computing device that connects the network 114 to another computing device, such as the display device 106, 108, or 110 or the server 118. As an example, a gateway may include a router, a modem, an access point, a wiring hub, an Ethernet switch or some other device. A communication link, such as the display-device-to-gateway communication link 128 or 130, may include a wireless communication link, such as a Wi-Fi® communication link, or a wired communication link, such as an Integrated Service Digital Network, a Digital Subscriber Link, a coaxial cable, or a fiber optic cable. The network 114 may include a local area network (LAN), a metropolitan area network (MAN), or a wide area network (WAN). The network 114 may include the Internet or a portion thereof. The network 114 may include one or more of the gateway 112, the gateway 116, and the network communication links 132, 134.

The server 118 may include one or more servers, such as one or more of a communications server, an application server, a file server, a database server, and a web server. A server, such as server 118 or any other server described in this description, may be referred to as a "computer server" or a "server computing device." The communications server and the web server may process requests transmitted over the network 114 from one or more of the display devices 106, 108, and 110. Those requests may be arranged according to a hyper-text transmission protocol (HTTP), a file transfer protocol (FTP), or according to another protocol. As an example, a request processed by the server 118 may include data that indicates (i) an action-trigger displayed within a display card at a display of the display device 106, 108, or 110, and (ii) an identifier of the display card including the action-trigger. As another example, a request processed by the server 118 may include data indicating a vehicle symptom and data identifying a characteristic of a vehicle. Processing a request by the server 118 may include searching the database 120 based on data included within the request.

The file server and the database server may provide access to the database 120 for storing data at the database 120 or for retrieving data stored at the database 120. The communications server or the web server may deliver responses to the network 114 for transmission to the one or more display devices 106, 108, and 110 that made the request processed by the server 118. The responses from the server 118 may be arranged according to the HTTP, the FTP, or another protocol. The application server may execute applications and handle connections between the communications server and the file server. In an embodiment in which the server 118 includes multiple servers, two or more of the multiple servers may be interconnected by a server-to-server communication link (not shown). The server 118 may connect to the gateway 116 by the server-to-gateway communication link 138.

The database 120 may include one or more databases. The database 120 may include a computer-readable medium. Each database of the database 120 may include data stored at a computer-readable medium. In accordance with an embodiment in which the database includes multiple databases, the database 120 may include a distributed database including at least a first database and a second database. The distributed databases may be communicatively coupled by a database communication link (not shown). The database communication link may include at least a part of the network 114. In accordance with that embodiment, the server 120 may include a single server that searches both the first database and the second database, or the server may include at least a first server to search the first database and a second server to search the second database. As an example, the first database may include data indicating a most-probable component associated with a most-likely cause of a vehicle symptom, and the second database may include data indicating a set of information categories. Each information category may define a respective display card displayable on a displayable page.

In accordance with an embodiment in which the database 120 includes multiple databases, the databases may be referred to generally by the context of the data stored at the database. That context may be referred to herein as a "database context." As an example, the database context for stored data may include a vehicle parts information context, a technician labor time context, a vehicle symptom context, a most-likely cause of the vehicle symptom context, a most-probable component associated with the most-likely cause of the vehicle symptom context, a component-type identifier context, an information category context, or some other context.

Any one or more of those example contexts may include data pertaining to particular vehicles or particular vehicle components. In that regard, a basis for searching the database 120 may include characteristics of the vehicle 102 or

104. The characteristics of the vehicle may include, for example, a year (Y), make ($M_1$), model ($M_2$), engine (E), and system (S) pertaining to the vehicle 102 or 104. An abbreviation for those characteristics is $YM_1M_2ES$. As another example, the characteristics that define a vehicle may be $YM_1M_2$ or $YM_1M_2E$. The data identifying characteristics of the vehicle may include a vehicle identification number (VIN) or some portion of a VIN. The data identifying characteristics of the vehicle may include data that indicates characteristics of an instance of a vehicle exhibiting a vehicle symptom or characteristics of a plurality of vehicles having common characteristics, such as $YM_1M_2ES$, $YM_1M_2$, or $YM_1M_2E$. The characteristics of a particular vehicle may include a serial number within the VIN. A vehicle characteristic may indicate a sub-model, an engine size, a fuel-type (e.g., diesel or unleaded), a region where the vehicle was built, or other characteristic represented by the VIN.

The data identifying characteristics of the vehicle, or at least of some of the characteristics of the vehicle, may be implied. For example, if a vehicle manufacturer manufactured a particular model only during the calendar or mode year 2014, then the year for such a vehicle may be implied by the data that identifies the make and model of the vehicle, such that the data identifying characteristics of the vehicle would not need to include the year.

The database 120, or the computer-readable medium of the database 120, may connect to the server 118 by the server-to-database communication link 140.

The SMS 122 may include a computing device that operates within a repair shop to manage various aspects regarding servicing vehicles at the repair shop. One or more of the display devices 106, 108, and 110 may, at least from time-to-time, be used at the repair shop where the SMS 122 is located. The SMS 122 may include a display device, such as the display device 300 shown in FIG. 3 or all of the components or any proper subset of components within the display device 300. The SMS 122 may connect to the network 114 and to another display device, such as the display device 110, via a communication link, such as the SMS-to-network communication link 136.

The SMS 122 may perform a variety of functions, examples of which are now described. The SMS 122 may receive data by way of a user input device 310 (shown in FIG. 3). The received data may include data for preparing a repair order for a vehicle, such as vehicle 102 or 104. The data for preparing the repair order may include data that identifies a customer that brought the vehicle to the repair shop or the owner of the vehicle. The data for preparing the repair order may include data identifying a characteristic of the vehicle or a vehicle symptom.

As another example, the SMS 122 may provide data received at the SMS 122 to the server 118 for storage at the database 120. The data provided by the SMS 122 to the server 118 may, subsequently, be displayed within a display card (e.g., a display card 806 or 808 shown in FIG. 8 or a complaint within a display card 1204 shown in FIG. 12).

Figure 3:
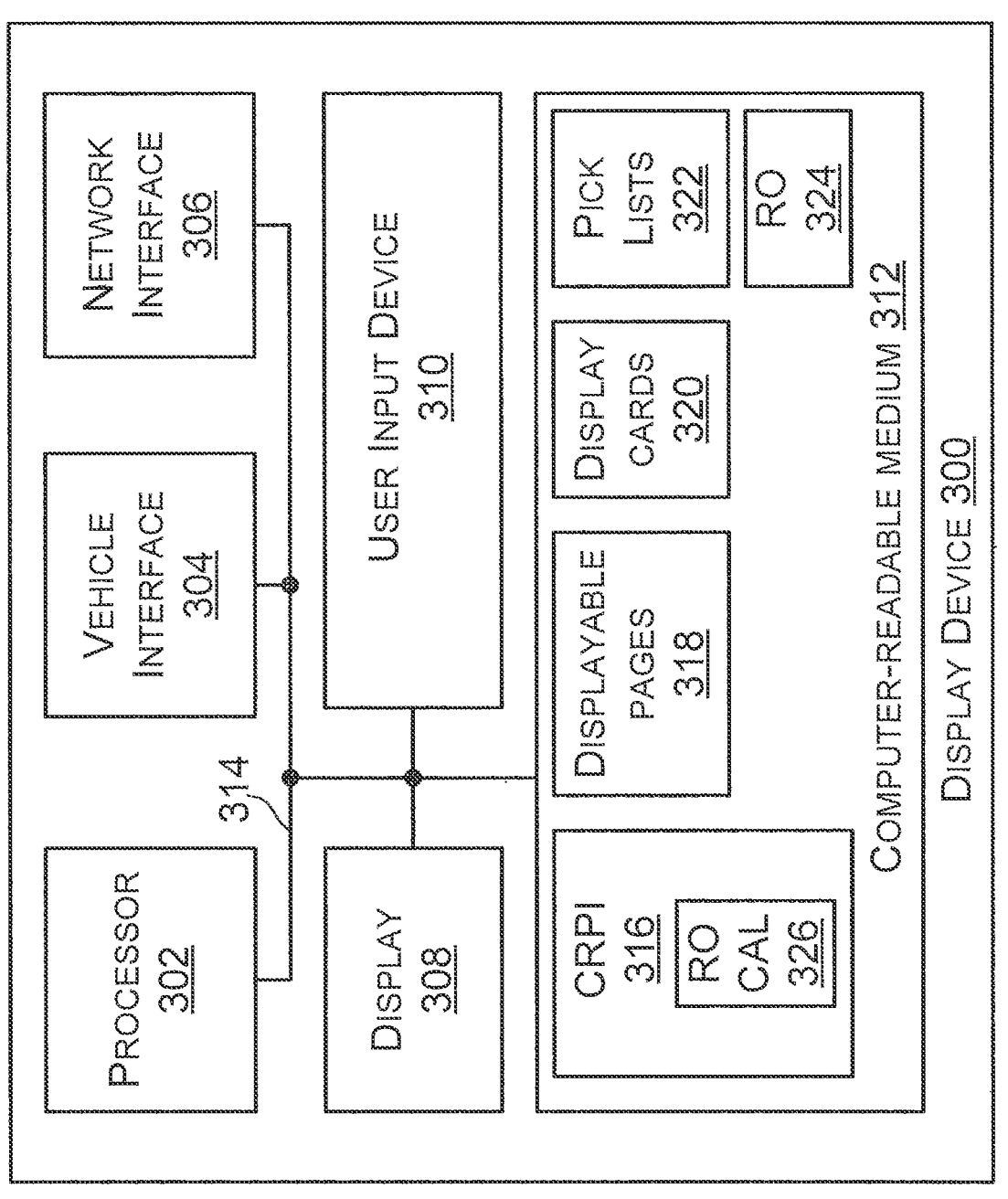
FIG. 3 is a block diagram of a display device in accordance with an example embodiment.
Figure 4:
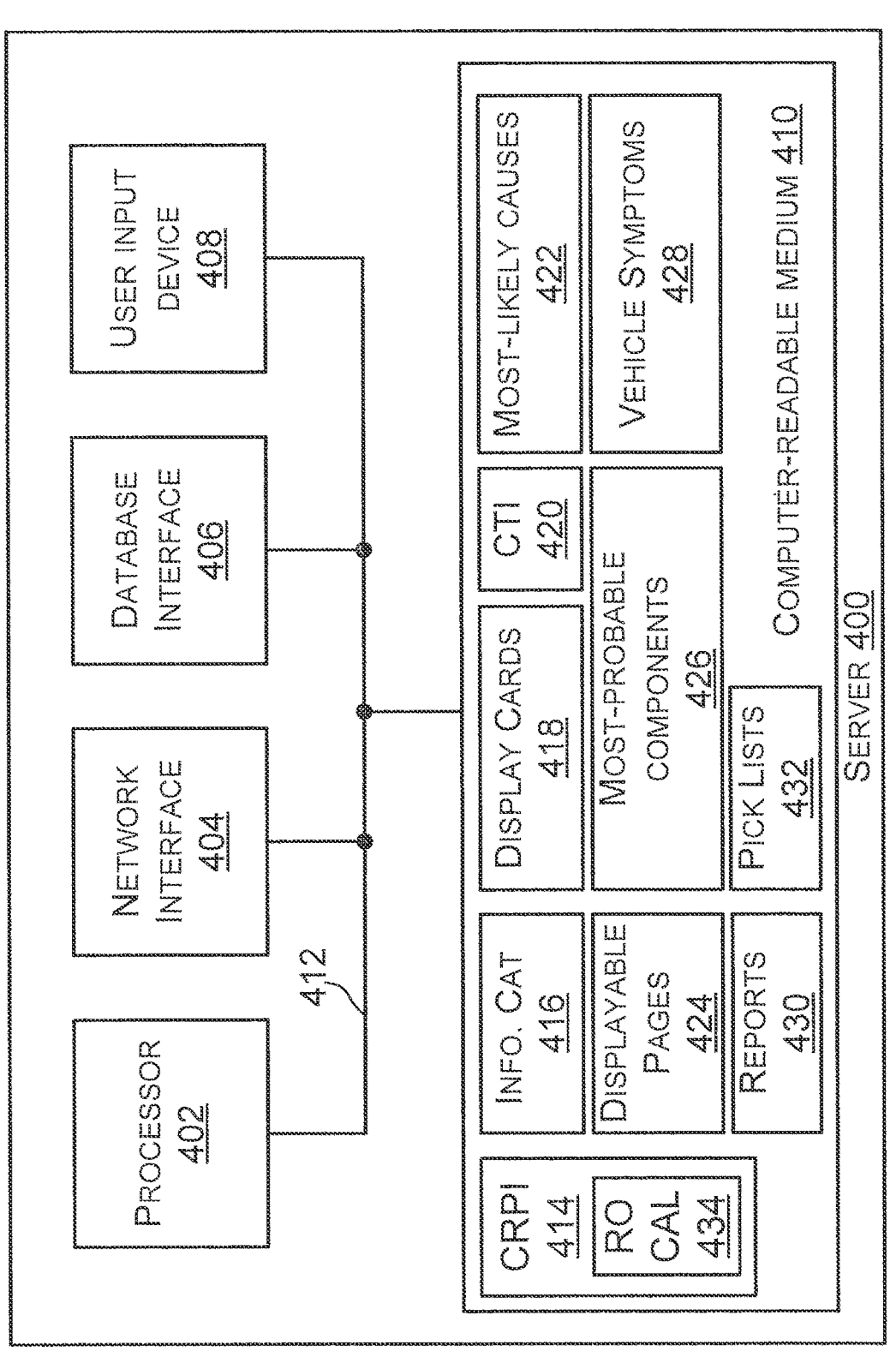
FIG. 4 is a block diagram of a server in accordance with an example embodiment.

As another example, the SMS 122 may receive a report generated by the server 118, such as a report stored in the reports 430 (shown in FIG. 4). The report received by the SMS 122 may include a final report, such as a final report shown in the display card 1500. The SMS 122 may display the report, such as the final report, in a display card at the display 308 (shown in FIG. 3). The SMS 122 may generate a repair order including a report received from the server 118 for providing to the customer or owner associated with the vehicle.

Figure 2:
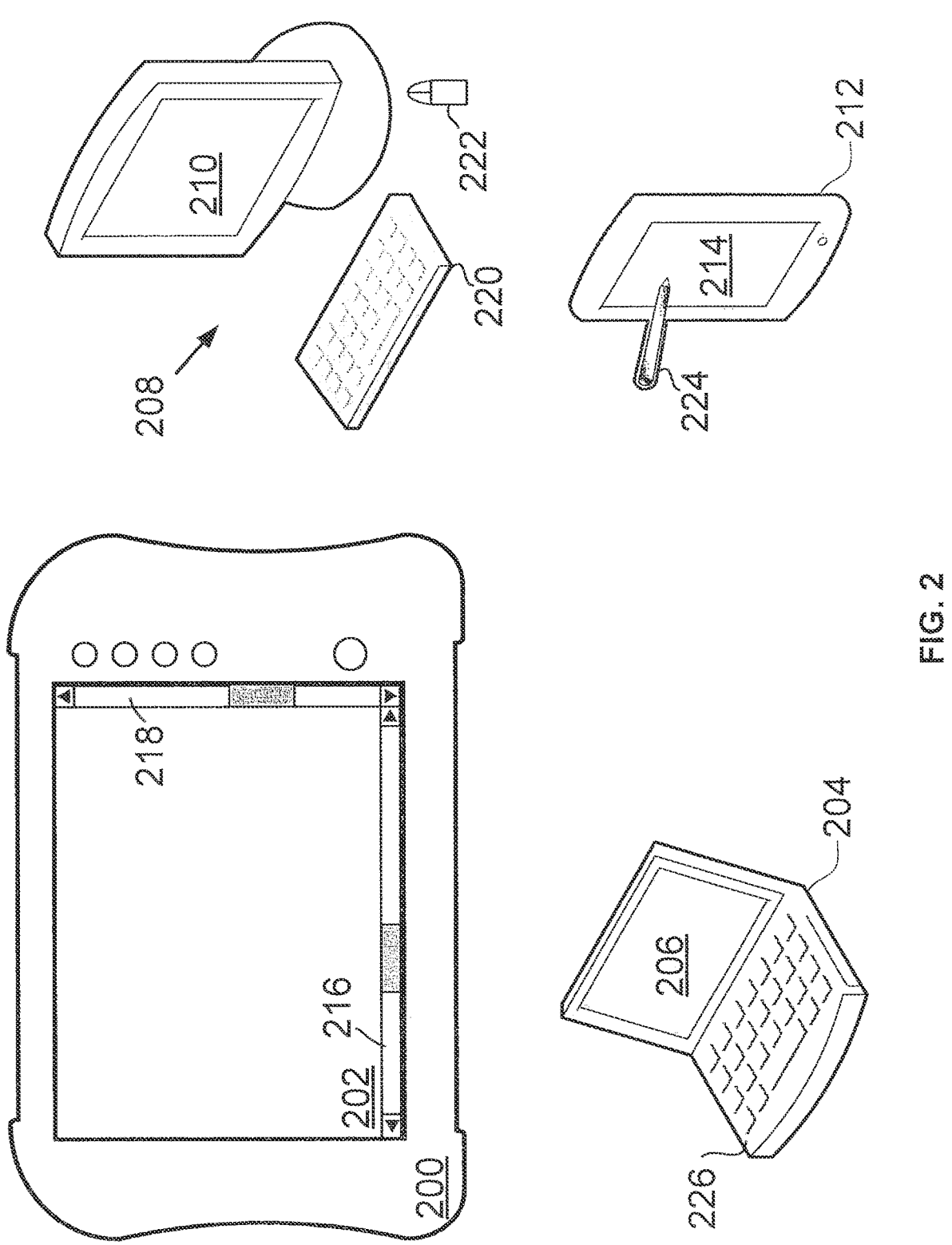
FIG. 2 shows a plurality of display devices having a display in accordance with an example embodiment.

Next, FIG. 2 shows a plurality of example display devices having a display screen. A first example display device shown in FIG. 2 is a display device 200 that includes a display 202. The display device 200 may include, or may be configured to operate as, a vehicle diagnostic device, the SMS 122, or at least as part of a vehicle diagnostic device or the SMS 122. A vehicle diagnostic device may connect to a vehicle, such as the vehicle 102, by a communication link, such as the vehicle-to-display-device communication link 124. As an example, the display device 200 may include, or may be configured as, a hand-held vehicle diagnostic device, such as a MODIS™ ultra integrated diagnostic system (reference number EEMS328 W) available from Snap-on Incorporated of Kenosha, Wisconsin.

Another example display device shown in FIG. 2 is a display device 208. The display device 208 may include a display 210, and may include one or more of a keyboard 220 and a pointing device 222. The display device 208 may include, or may be configured as, a desktop computing system, such as an OptiPlex® 9020 Mini Tower desktop computing system available from Dell Computer Corporation, Austin, Texas, or some other desktop computing system. The keyboard 220 may include, or may be configured as, a wired or wireless QWERTY keyboard or some other keyboard for entering data or selections into the display device 208. The pointing device 222 may include, or may be configured as, a wired or wireless computer mouse. The display device 208 may include or be configured to operate as a vehicle diagnostic device, the SMS 122, or at least as part of a vehicle diagnostic device or the SMS 122.

Another example display device shown in FIG. 2 is a display device 204. The display device 204 may include a display 206 and may include a keyboard 226. The display device 204 may include, or may be configured as, a laptop computing system, such as the Dell Chromebook 11 desktop computing system available from Dell Computer Corporation, or some other laptop computing system. The display device 204 may include or be configured to operate as a vehicle diagnostic device, the SMS 122, or at least as part of a vehicle diagnostic device or the SMS 122.

Another example display device shown in FIG. 2 is a display device 212 having a display 214. The display device 212 may include, or may be configured as, a smartphone (such as an IPHONE® smartphone from Apple Inc. of Cupertino, California, or a GALAXY S® smartphone from Samsung Electronics Co., Ltd. Of Maetan-Dong, Yeong-tong-Gu Suwon-Si, Gyeonggi-Do, Republic of Korea). Alternatively, the display device 212 may include, or may be configured as, a tablet device (such as an IPAD® tablet device from Apple Inc., or a SAMSUNG GALAXY TAB tablet device from Samsung Electronics Co., Ltd.). Data or selections may be entered at the display device 212 by way of a stylus 224 in contact with the display 214. Data or selections may be entered at the display device 212 in other ways as well. The display device 212 may include or be configured to operate as a vehicle diagnostic device, the SMS 122, or at least as part of a vehicle diagnostic device or the SMS 122.

The display 202, 206, 210, and 214 may include, or may be configured as, any example display described herein or some other type of display configured for displaying the displayable aspects described herein, such as the displayable pages or page sections. A first example display includes or is configured as a capacitive touch display. A second example display includes or is configured as a resistive touch display. A third example display includes or is configured as a plasma display. A fourth example display includes or is configured as a light emitting diode (LED) display. A fifth example display includes or is configured as a cathode ray tube display. A sixth example display includes or is configured as an organic light-emitting diode (OLED) display, such as an active-matrix OLED or a passive-matrix OLED. A seventh example display includes or is configured as a touch-display such as a color touch used on a MODIS™ ultra integrated diagnostic system. An eighth example display includes or is configured as a backlit color liquid crystal display (LCD) having a resistive touch or panel.

As shown in FIG. 2, the display 202 may display a horizontal scroll bar 216 and a vertical scroll bar 218. The horizontal scroll bar 216 may be used to cause the display device 200 to display an unseen portion of a displayable page at the display 202 instead of another portion of the displayable page currently displayed at the display 202. The vertical scroll bar 218 may be used to cause the display device 200 to display another unseen portion of the displayable page at the display 202 instead of the portion of the displayable page currently displayed at the display 202. Any other display described herein may include a horizontal scroll bar configured to operate like the horizontal scroll bar 216. Any other display described herein may include a vertical scroll bar configured to operate like the vertical scroll bar 218.

Next, FIG. 3 is a block diagram of a display device 300. The display device 300 may include all of the components shown in FIG. 3 or any proper subset of the components shown within the display device in FIG. 3. For example, the display device 300 may include a processor 302, a vehicle interface 304, a network interface 306, a display 308, a user input device 310, and a computer-readable medium (CRM) 312. Two or more of the aforementioned components shown in FIG. 3 may be communicatively coupled or linked together via a system bus, network, or other connection mechanism 314. A display device (e.g., display device 106, 108, or 110) shown in FIG. 1 may include, or may be configured as, the display device 300. The display device shown in FIG. 1 may include all or any proper subset of the components of the display device 300. Two or more of the components shown within the display device 300 may be located within a single housing. Two or more of the components shown within the display device 300 may be located remotely from each other in different housings or otherwise.

A processor, such as the processor 302 or any other processor discussed in this description or included within a device or system described in this description (hereinafter, "a described processor"), may include one or more general purpose processors (e.g., INTEL® single core microprocessors or INTEL® multicore microprocessors) or one or more special purpose processors (e.g., digital signal processors or graphics processors). A graphics processor may be configured to access and use the CRM 312 for creating, or retrieving from the display pages 318, a displayable page to display on the display 308. Additionally or alternatively, a described processor may include an application specific integrated circuit (ASIC). A described processor may be configured to execute computer-readable program instructions (CRPI), such as CRPI 316 stored in the CRM 312. A described processor may be configured to execute hard-coded functionality in addition to or as an alternative to software-coded functionality (e.g., via CRPI).

A computer-readable medium, such as the CRM 312 or any other computer-readable medium discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EE-PROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 114. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

The CRM 312 may store all of the computer-readable elements shown in the CRM 312 in FIG. 3 or any proper subset of the computer-readable elements shown within the CRM 312. For example, the CRM 312 may store the CRPI 316, the displayable pages 318, display cards 320, pick lists 322, and repair orders (RO) 324. A first example of a proper subset of the computer-readable elements of CRM 312 is the CRPI 316, the displayable pages 318, and the display cards 320. A second example of a proper subset of the computer-readable elements of CRM 312 is the CRPI 316, the pick lists 322, and the RO 324. Other examples of a proper subset of the computer-readable elements of the CRM 312 are also possible. Other examples of computer-readable elements stored within the CRM 312 are also possible.

The pick lists 322 may include one or more pick lists. Each pick list may include one or more selectable terms that may be selected (e.g., picked) for providing to RO authoring logic that can generate an RO based on the terms selected from the pick lists 322. Each pick list may be limited to a predefined set of terms related in some manner. A first example pick list (referred to hereinafter as "vehicle system pick list") includes terms identifying vehicle systems (e.g., brakes, transmission, engine, entertainment, steering, suspension, etc.). A second example pick list (referred to hereinafter as "vehicle component pick list") includes terms identifying vehicle components (e.g., brake caliper, brake shoe, brake pad, bleeder screw, brake line, etc.). A third example pick list (referred to hereinafter as "vehicle symptom pick list") includes terms identifying vehicle symptoms (e.g., faults (perceived or real) complaints, DTC, etc.). A fourth example pick list (referred to hereinafter as "temporal qualifier pick list") includes temporal qualifiers (e.g., when stopping a vehicle, in the morning when the vehicle is cold, etc.). A fifth example pick list (referred to hereinafter as "spatial qualifier pick list") includes terms identifying spatial qualifiers (e.g., left front, right rear, front, inside, outside, passenger compartment, under-hood, etc.) that describe a relative location of a vehicle. A sixth example pick list (referred to hereinafter as "test and results pick list") includes terms identifying tests and results (e.g., voltage test and voltage high, resistance test and open circuit, resistance test and short circuit, etc.). A seventh example pick list (referred to hereinafter as "DTC pick list") includes DTC identifiers (e.g., P0401, P1115, etc.).

One of the example pick lists may be divided into two or more distinct pick lists. For instance, the test and results pick list could be divided into a pick list identifying tests and another pick list identifying test results. Two or more of the example pick lists may be combined into a single pick list. For instance, the vehicle systems pick list and the vehicle components pick list may be combined into a single pick list identifying vehicle systems and components.

The pick lists 322 may also include pick list selections (i.e., a set of terms selected from one or more pick lists). As an example, the pick lists 322 may include pick list selections for generating RO content as described herein with respect to FIG. 19.

The RO 324 may contain one or more RO. The RO contained in the RO 324 may include an RO generated by the display device 300. The RO contained in the RO 324 may include an RO the display device 300 receives at the network interface 306 via the network 114. An RO stored in the RO 324 may be transmitted by the network interface 306 to a device remote from the display device 300. An RO stored in the RO 324 may be displayed at the display 308. Displaying an RO stored in the RO 324 may include displaying the RO as at least part of a displayable page 318.

The display cards 320 may include display cards that make up at least a portion of a displayable page. The display cards 320 may include a display card that is configured like or that includes any aspect shown in the display cards in FIGS. 7, 8, 9, 10, 11A, 11B, 11C, 11D, 11E, 11F, 11G, 11H, 12A, 12B, 12C, 12D, 12E, 13, 14A, 14B, and 15. That set of figures is referred to hereinafter as "the figures showing a display card." The display cards 320 may include data received from the server 118 for initially displaying a particular display card or for updating the particular display card.

The vehicle interface 304 may include one or more components for communicatively coupling the display device 300 to a vehicle over a communication link. The vehicle interface 304 may include a transceiver (e.g., an integrated transmitter and receiver, or a distinct transmitter and a distinct receiver). The transmitter of the vehicle interface 304 may be configured to transmit data to a vehicle. The data transmitted by the vehicle interface 304 to the vehicle may include a request for a VDM. The receiver of the vehicle interface 304 may be configured to receive data transmitted by the vehicle 102 over the vehicle-to-display-device communication link 124. The data received by the vehicle interface 304 from the vehicle 102 may include a VDM. The processor 302 may select data from within the VDM received from the vehicle and cause the selected data to be displayed at the display 308. As an example, the display 308 may display the selected data within a display card.

The network interface 306 may include one or more components for communicatively coupling the display device 300 to the network 114 or to a gateway that is part of or connected to the network 114. The network interface 306 may include component(s) for wireless or wired communications via the network 114. The network interface 306 may include a modem or a network interface card. The network interface 306 may include the communication interfaces 425 shown in FIG. 29 or some portion thereof.

The network interface 306 may transmit various messages over the network 114. As an example, a message transmitted by the network interface 306 may include a vehicle service information (VSI) request that identifies a selected action-trigger displayed on the display 308. As another example, a message transmitted by the network interface 306 may include a VSI request that identifies a characteristic (or attribute) of a vehicle, such as a year, make, model, or engine of the vehicle. As another example, a message transmitted by the network interface 306 may include a message to request a different displayable page or section, such as a DIAGNOSE displayable page or section, a JOB PREVIEW displayable page or section, a REPAIR displayable page or section, or a JOB SUMMARY displayable page or section while some other displayable page or section is displayed at the display 308. As another example, a message transmitted by the network interface 306 may include any of the data contained in the CRM 312, such an RO stored in the RO 324. Other examples of the data included within the messages transmitted over the network 114 by the network interface 306 are also possible.

The network interface 306 may receive various message transmitted over the network 114. As an example, the network interface 306 may receive a message that includes data for displaying a displayable page or section, such as a DIAGNOSE displayable page or section, a JOB PREVIEW displayable page or section, a REPAIR displayable page or section, or a JOB SUMMARY displayable page or section, or a message to update some portion (e.g., a display card) of a displayable page or section. As another example, the network interface 306 may receive a message that includes a display card, the data to include in a display card, or the data for modifying a display card. As another example, the network interface may include an RO to be stored in the RO 324.

The display 308 may display a displayable page, such as a displayable page described herein or any aspect of a displayable page described herein. The display 308 may display any aspect of any displayable page described herein. The display 308 may display a display card, such as any display card described herein. The display 308 may display other forms of visually-presentable data as well. The display 308 may display vehicle diagnostic data while displaying any displayable page, displayable page, or display card. The display 308 may be configured like display 202, 206, 210, or 214 or like any example display described herein. The display 308 may display any visually-presentable data provided by the processor 302 or the CRM 312. The display 308 may display an action-trigger, such as any action-trigger described herein. The display 308 may be configured for a user to input a selection of an action-trigger and to provide a signal to the user input device 310 for detecting a selection of the action-trigger.

The user input device 310 may include user-input elements configured so that a user of display device 300 may input data for use by the processor 302 or by another element of the display device 300. As an example, the user-input elements may include a connection to the display 308 in an embodiment in which the display 308 includes a touch display. As another example, the user-input elements may include a user input section having one or more input keys. As another example, the user-input elements may include a pointing device such as a computing device mouse, a keyboard (e.g., a QWERTY keyboard), a joystick, a display pointer (e.g. the pointing device 222 shown in FIG. 2), or a microphone for receiving spoken inputs. As yet another example, the user-input elements may include a scanner configured to scan a one or two dimensional code (e.g., a bar code or a quick-response (QR) code). The user input device 310 may be used to select an action-trigger.

In general, CRPI, such as the CRPI 316 or any other CRPI described herein, include program instructions executable by a processor. Further, and in general, CRPI may include various structures, modules, routines, or some other computer-readable logic. Further, and in general, CRPI may be written using a computer-programming language such as C++ or some other programming language.

In particular, the CRPI 316 may include program instructions executable by the processor 302 to carry out any one or more functions described herein or represented by the figures as being performed, at least in part, by the display device 300 or a component of the display device 300, or any other display device described herein.

As an example, the CRPI 316 may include program instructions to generate an RO or some portion of an RO. Such program instructions are referred to in this description as "RO content authoring logic program instructions," "RO content authoring logic" or "RO CAL." The RO CAL 326 within the CRPI 316 may include program instructions to display pick lists contained in the pick lists 322, receive selections of terms from a displayed pick list, match the terms selected from the pick lists to an appropriate text string, and to insert the terms selected from the pick lists or phrases associated with or including the terms selected from the pick lists into the text string RO for inclusion within an RO. The program instructions to generate an RO may include program instructions to perform any or all of the functions shown in or described with respect to FIG. 19.

As another example, the CRPI 316 may include program instructions to receive at least one pick list selection from at least one displayed pick list for generating a displayable page, and to receive vehicle information indicating at least one vehicle attribute of a subject vehicle. The CRPI 316 may include program instructions to send the server 400 a request to search the database 120 for a text string based on at least one pick list selection to generate a text portion of the displayable page. The text portion may include a complaint portion of an RO, a cause portion of an RO, of some other text portion of a displayable page. The CRPI 316 may include program instructions to receive the text string the server 300 determined from the database 120 and to generate the text portion of the displayable page. The CRPI 316 may include program instructions to determine content for populating a display card of the displayable page. Those program instructions may be executed by the processor 302 to send the server 400 a request to search the database 120 for the content and to receive the content the server 400 determined from the database 120. The CRPI 316 may include program instructions to determine parts and labor information and vehicle information regarding a subject vehicle. Those program instructions may be executed by the processor 302 to receive at least one of the parts and labor information and the vehicle information from the user input device 310 or the vehicle interface 304. The CRPI 316 may include program instructions to output content of the displayable page. Those program instructions may be executed by the processor 302 to cause the content to be transmitted to the display 308. The CRPI 316 may include program to cause the display 308 to display the displayable page. As least some of the content displayed at the display 308 may be populated into a display card by the server 400 while at least some other content output displayed at the display may be for populated into a display card by the processor 302.

The display device 300 may operate within the system 100 in place of one of the display device 106, 108, or 110, or in addition to any or each of the display devices 106, 108, and 110. One or more of the display devices 106, 108, and 110 shown in FIG. 1 may include or be arranged like the display device 300 or may include all or any proper subset of the components of the display device 300. One or more of the components of the display device 300 may be arranged as a device or a system. A device or system may include one or more of the components of the display device 300.

Figure 29:
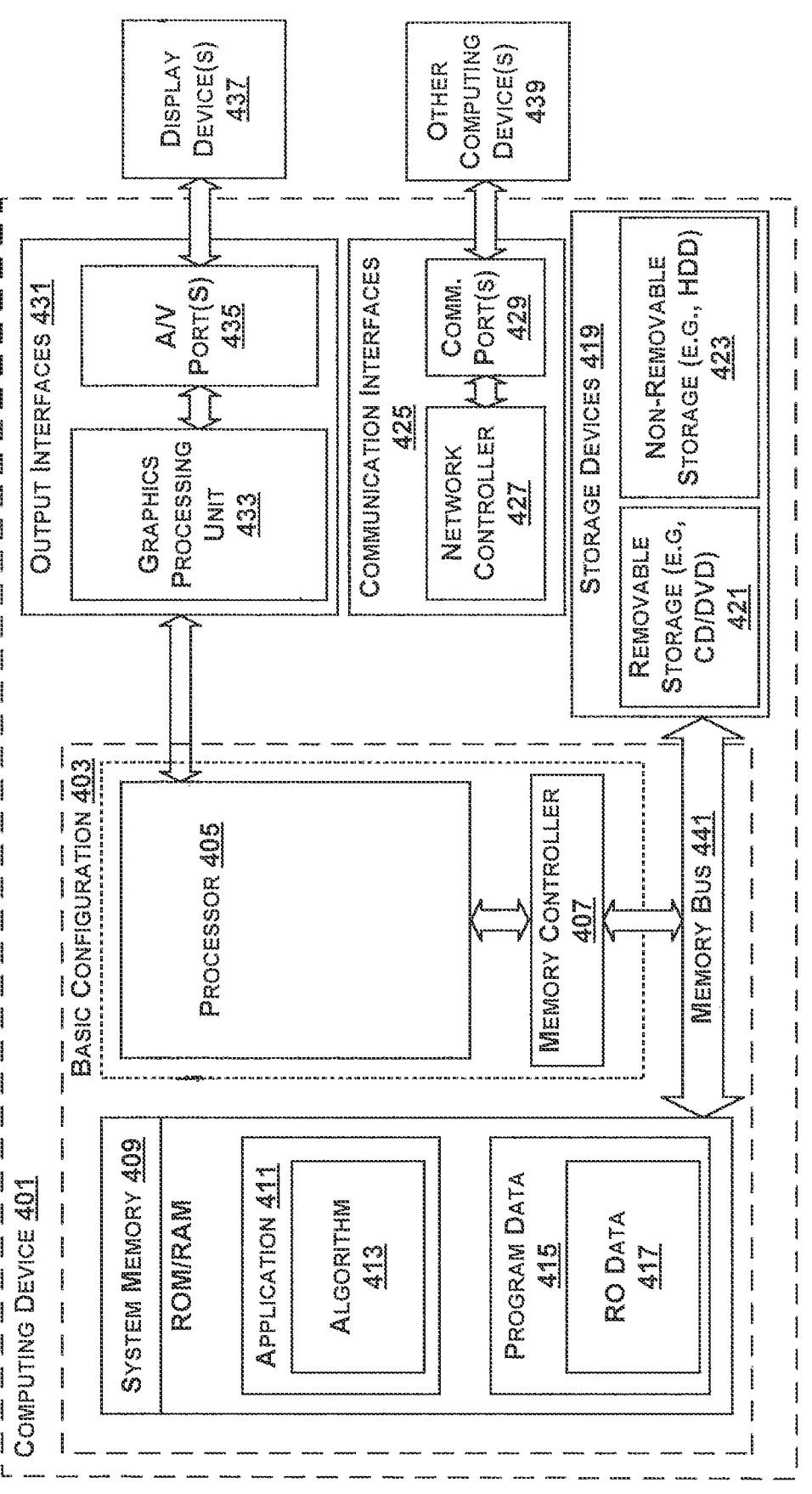
FIG. 29 is a functional block diagram illustrating an example computing device used in a computing system that is arranged in accordance with at least some example embodiment(s).

The display devices 106, 108, 110, and 300 are computing devices and may be arranged as or comprise the computing device 401 shown in FIG. 29 or any portion thereof. The CRPI 316 may be included as part of the program instructions 455 within a computer program product, such as the computer program product shown in FIG. 29.

Next, FIG. 4 is a block diagram of a server 400. The server 400 may include all of the components shown in FIG. 4 or any proper subset of the components shown within the server 400. For example, the server 400 may include a processor 402, a network interface 404, a database interface 406, a user input device 408, and a computer-readable medium 410. Two or more of the aforementioned components shown in FIG. 4 may be communicatively coupled or linked together via a system bus, network, or other connection mechanism 412. The server 118 shown in FIG. 1 may include, or may be configured as, the server 400. The server 118 may include all or any proper subset of the components of the server 400. Two or more of the components shown within the server 400 may be located within a single housing. Two or more of the components shown within the server 400 may be located remotely from each other in different housings or otherwise.

The server 400 may take the place of the server 118 shown in FIG. 1. The computer-readable medium 410 may include the database 120. The computer-readable medium 410 may include at least some of the data stored in the database 120. As an example, the data stored in both the computer-readable medium 410 or the database 120 may include one or more of CRPI 414, information categories 416, display cards 418, component-type identifiers 420, most-likely causes data 422, displayable pages 424, most-probable components data 426, vehicle symptom data 428, reports 430, and pick lists 432.

The network interface 404 may include one or more components for communicatively coupling the server 400 to the network 114 or to a gateway (e.g., gateway 116) that is part of or connected to the network 114. The network interface 404 may include component(s) for wireless or wired communications via the network 114. The network interface 404 may include a modem or a network interface card. The network interface 404 may include a receiver to receive the various data described as being transmitted over the network to a server 118 or 400 or described as being received by the server 118 or 400 or the network interface 404. The network interface 404 may include a transmitter to transmit the various data described as being transmitted by the network interface 404, the processor 402, the server 400 or the various data described as being received by a display device 106, 108, 110, or 300 or the network interface 306. The network interface 404 may include the communication interfaces 425 shown in FIG. 29 or some portion thereof.

The database interface 406 may include one or more components for requesting data from the database 120 and one or more components for receiving data from the database 120. The database interface 406 may include the server-to-database communication link 140. The processor 402 may transmit the requests to the database interface 406 and over the server-to-database communication link 140. The database interface 406 may transmit the data it receives from the database 120 to the processor 402.

The user input device 408 may include one or more components for entering (e.g., inputting) data into the server 400 or modifying data stored in the computer-readable medium 410 or the database 120 or for use by the processor 402. As an example, the components of the user input device 408 may include a display screen, a user input section having one or more input keys, a pointing device such as a computing device mouse, a keyboard (e.g., a QWERTY keyboard), a display pointer (e.g. the pointing device 222 shown in FIG. 2), or a microphone for receiving spoken inputs.

The computer-readable medium 410 may include CRPI 414. The processor 402 may execute the CRPI 414. The CRPI 414 may include program instructions to perform any function described herein as being performed by a server, such as the server 118 or the server 400, or by any component described herein as being a component of a server.

For example, the CRPI 414 may include program instructions to perform each of the functions or any portion described with respect to the functions of the set of functions shown in FIG. 16.

As another example, the CRPI 414 may include program instructions to receive request data sent from a display device, such as the request data described with respect to block 1802 in FIG. 18. The CRPI 414 may include program instructions to cause the network interface 404 to transmit display data to a display device. The display data may include the first display data described with respect to block 1804 in FIG. 18 or any other display data described herein.

As another example, the CRPI 414 may include program instructions to receive at least one pick list selection from at least one displayed pick list for generating a displayable page, and to receive vehicle information indicating at least one vehicle attribute of a subject vehicle. The CRPI 414 may include program instructions to search the database 120 for a text string based on at least one pick list selection to generate a text portion of the displayable page. The text portion may include a complaint portion of an RO, a cause portion of an RO, of some other text portion of a displayable page. The CRPI 414 may include program instructions to receive the text string from the database 120 and to generate the text portion of the displayable page. The CRPI 414 may include program instructions determine content for populating a display card of the displayable page. Those program instructions may be executed by the processor 402 to search the database 120 for the content and to receive the content from the database 120. The CRPI 414 may include program instructions to determine parts and labor information and vehicle information regarding a subject vehicle. Those program instructions may be executed by the processor 402 to receive at least one of the parts and labor information and the vehicle information from the display device 300. The CRPI 414 may include program instructions to output content of the displayable page. Those program instructions may be executed by the processor 402 to cause the network interface 404 to transmit the content to the display device 300. As least some of the content output by the server 400 may be populated into a display card while at least some other content output by the server 400 may be for populating into a display card by the display device 300.

As still yet another example, the CRPI 414 may include program instructions executable by the processor 402 to generate a report, such as a final report generated after the vehicle 102 or 104 is repaired (shown in FIG. 15). The server 400 may receive data indicating that an action-trigger of an add-to-report icon 734 (shown, for example, in FIG. 7) for a particular display card has been selected. The server 400 may add information from the display card associated with the action-trigger of an add-to-report icon 734 to the report. After adding information from a particular display card to the report, the server 400 may remove that same information from the report after the server 400 receives data indicating the added-to-report icon 724 (shown in, for example, in FIG. 7) for the particular display card has been selected. The server 400 may provide the report to the SMS 122 so that the report may be attached to a repair order and provided to an owner of the vehicle. The server 400 may store the report in the reports 430. The server 400 may perform analytics on multiple reports for determining the data to provide within display cards. The CRPI 414 may include RO content authoring logic 434 to generate portions of an RO as described above with respect to RO CAL 326.

As still yet another example, the CRPI 414 may include program instructions to receive data input via an ask-a-community display card, to forward at least a portion of the received data to a community of users that are served by the server 400, to receive a response from at least one user of the community of users, and to publish the data input via the ask-a-community display card the user response for viewing at one or more display devices, such as one or more the display device 106, 108, 110, or 300.

The server 118 and the server 400 are computing devices and may be arranged as or comprise the computing device 401 shown in FIG. 29 or any portion thereof. The CRPI 414 may be included as part of the program instructions 455 within a computer program product, such as the compute program product shown in FIG. 30.

The displayable pages 424 may include current-request data that defines which display cards pertain to a displayable page or section that can be presented by the display device 300. Table 1 below shows an example of such data. The displayable pages 424 may also include current-view data that defines which display cards are presently displayed by one or more display devices. The server 400 may use the current-view data to retrieve data for other display cards, such as display cards adjacent to the display cards presently displayed by the one or more display devices.

The display cards 418 may include card-definition data that defines the type of data to be populated into each display card. As an example, the defined types of data for a display card may include the following types of data shown in FIG. 7: display card title 738, a prior repair count 740, an ask-a-community icon 726, a comment icon 728, and the type of data to display in an information display area 742. As another example, the defined types of data for a display card may include a status of whether to display an added-to-report icon 724 or an add-to-report icon 734 shown in FIG. 7.

The server 400 may receive vehicle service information (VSI) requests from one or more display devices for vehicle service information. The one or more display devices may be configured to display vehicle service information via the displayable pages the server 400 provides to the display devices or the data to populate the display cards within displayable pages having display cards. A VSI request received by the server 400 may include (i) data that identifies categories of vehicle characteristics as described elsewhere herein, (ii) a displayable page or section identifier (e.g., an identifier that corresponds to the displayable page or section selectors 702, 704, 706, and 708 shown in FIG. 7, and data that indicates at least one of a DTC, a component, and a symptom.

The server 400 may execute the CRPI 414 to search the database 120 (i.e., one or more databases) based on data within the VSI request to determine data to populate the display cards with data in the information display area 742. The data to populate the display cards corresponds to a vehicle having the identified vehicle characteristics and to the at least one of a DTC, a component, and a symptom. As an example, the data to populate the display cards may include text, graphs, or images. FIGS. 7, 8, 9, 10, 11A-H, 12A-D, 13, 14A-B, and 15 illustrate examples of the data the server 400 may obtain from the database 120 to populate a display card.

The server 400 may execute the CRPI 414 in response to receiving a VSI request including an action-trigger identifier associated with an action-trigger displayed within a display card. The display device 300 may generate the VSI request in response to the displayed action-trigger being selected by the user input device 310. The processor 402 can execute the CRPI 414 to determine one or more actions associated with the identified action-trigger and perform the one or more actions. As an example, an action can include determining data associated with the display card including the selected action trigger, a vehicle having the vehicle characteristics, and one or more of a DTC, component, and symptom.

III. Example Displayable Pages and Displayable Page Sections

Figure 5:
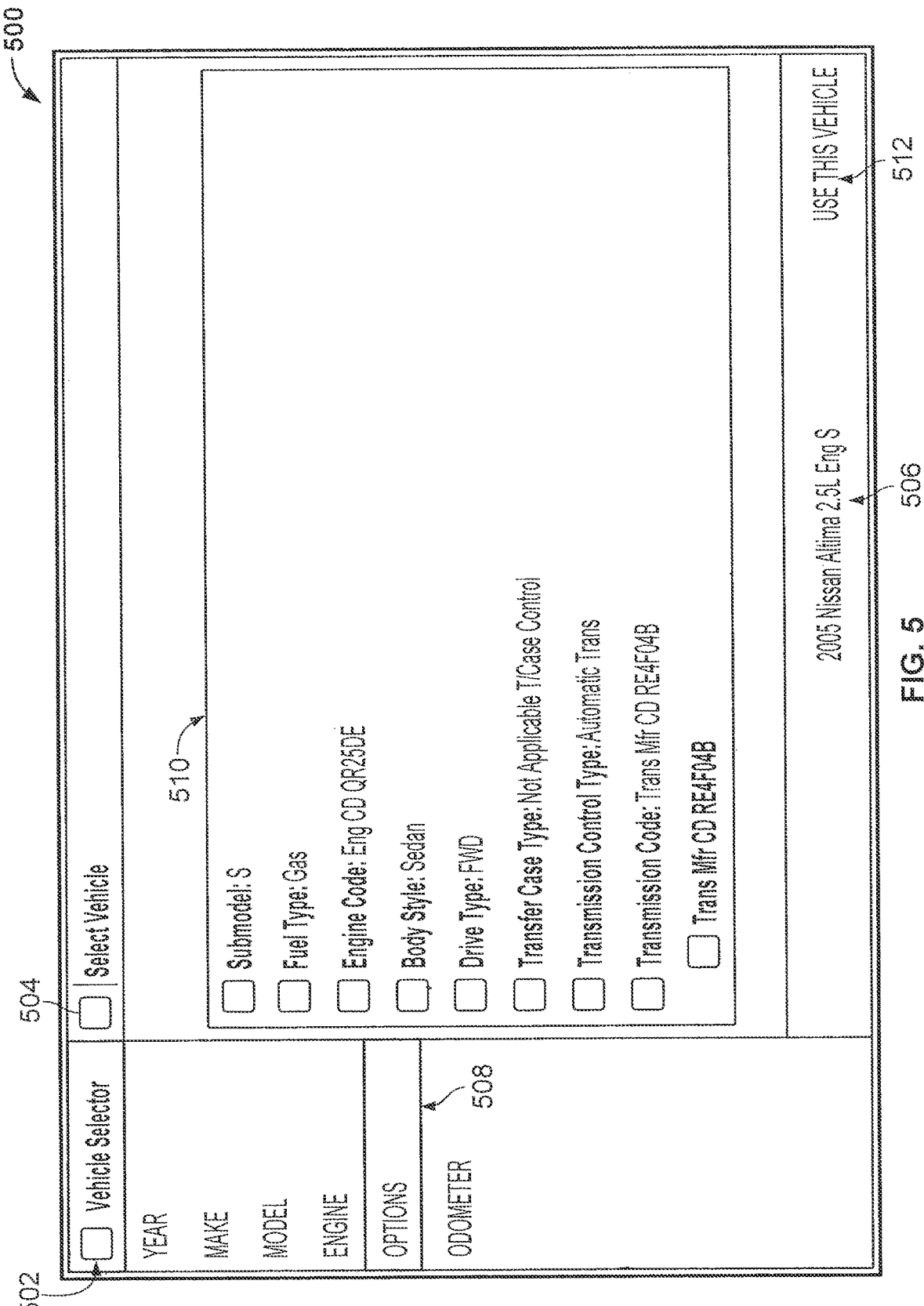
FIGS. 5, 6, 7, 8, 9, and 10 shows displayable pages or page sections in accordance with an example embodiment.
Figure 6:
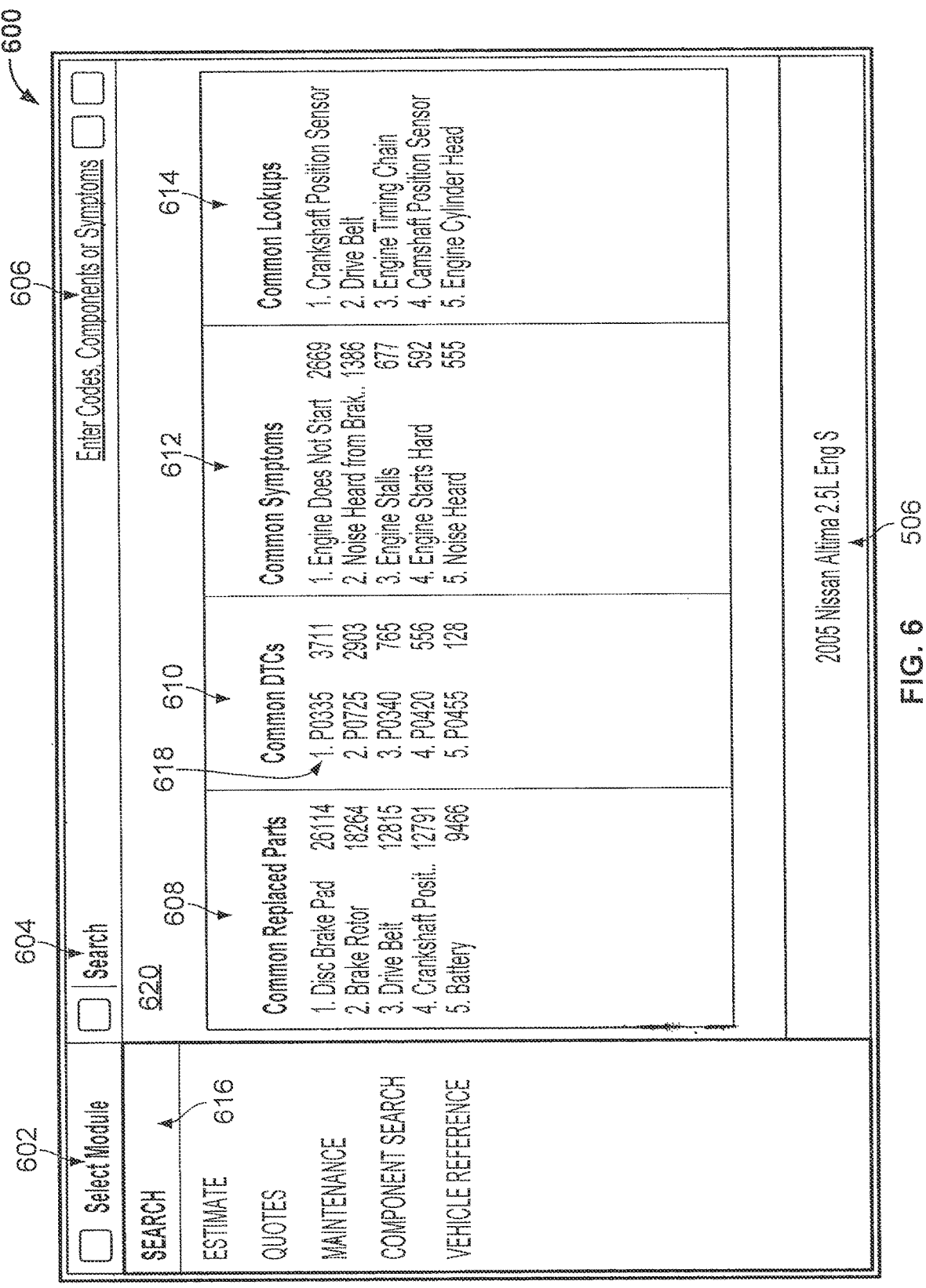

Next, FIGS. 5 and 6 show example displayable pages 500, 600, respectively, and FIGS. 7, 8, 9, and 10 show example displayable pages or sections 700, 800, 900, and 1000, respectively. Those displayable elements may be referred to as the "displayable pages or sections 500-1000." Each of the displayable pages or sections 500-1000 may be displayed at a display of any display device described herein.

Each of the displayable pages or sections 500-1000 may include one or more action-trigger that is selectable by the user input device 310. The user input device 310 may provide input selection(s) of an action-trigger to the processor 302. Selection of an action-trigger may occur by way of a finger touching a touch display, a pointing device being used to position a cursor on or in proximity to the action-trigger and being used to receive an input trigger while the cursor is so positioned, a voice command, or in some other manner.

Each of the displayable pages or selections 500-1000 shows at least a portion of a displayable page. Any or all of the displayable pages or sections 500-1000 may include a scroll bar (e.g., the horizontal scroll bar 216 or the vertical scroll bar 218). A scroll bar may be used to cause the display device to display an unseen-portion of a displayable page that is not currently visible on the display while another portion of the displayable page is currently visible on the display screen. Use of the scroll bar may cause a portion of the displayable page currently visible on the display to become an unseen-portion of the displayable page and to simultaneously cause an unseen-portion of the displayable page to become another portion of the displayable page currently visible on the display screen.

As shown in FIG. 5, the displayable page 500 includes a vehicle-characteristic-category-selection display-segment 502, a vehicle-selector display-segment 504, a selected-vehicle display-segment 506, a vehicle characteristic category identifier 508, a vehicle characteristic selection display-segment 510, and a use-this-vehicle display-segment 512. The displayable page 500, when displayed at a display screen, provides a way for a user to select characteristics of a vehicle to identify characteristics of the vehicle. The displayable page shown in the displayable page 500, when displayed at a display screen, provides a way for a user to select a vehicle to use with respect to other features of the display device displaying the displayable page 500. The displayable page 500 may be referred to as a "vehicle selection displayable page."

The vehicle-characteristic-category-selection display-segment 502 identifies categories of vehicle characteristics (i.e., year, make, model, engine, options, and odometer) that may be selected to display, within the vehicle characteristic selection display-segment 510, vehicle characteristics of the selected category. The vehicle characteristic category identifier 508 identifies (e.g., by highlighting with respect to the other selectable categories) a currently-selected vehicle characteristic category. As shown in FIG. 5, the "OPTIONS" vehicle characteristic category is currently selected and the vehicle characteristic selection display-segment 510 shows an example of characteristics (e.g., Submodel, Fuel Type, etc.) that may be selected or that have already been selected to identify a subject vehicle with respect to other features of the display device displaying the displayable page 500.

Upon entering characteristics of a vehicle via the aspects shown in the displayable page 500, an action-trigger of the use-this-vehicle display-segment 512 may be selected to finalize a selection of the subject vehicle. The processor 302 may detect the action-trigger of use-this-vehicle display-segment 512 has been selected and cause the display device to display a different displayable page, such as a module selection displayable page.

Next, FIG. 6 shows the displayable page 600 is an example of a module selection displayable page that includes a module selection display-segment 602, a selected module identifier display-segment 604, a search-trigger display-segment 606, the selected-vehicle display-segment 506, a selectable module identifier 616, and a module display-segment 620 including (i) a common replaced parts selection display-segment 608, (ii) a common DTC selection display-segment 610, (iii) a common symptom selection display-segment 612, and (iv) a common lookups selection display-segment 614.

The module selection segment 602 identifies selectable modules (e.g., search, estimate, quotes, maintenance, component search, and vehicle reference) that may be selected to cause particular display-segment(s) to be displayed within the module display-segment 620. The module selection segment 602 may display selectable modules other than those shown in the displayable page 600. The selectable module identifier 616 identifies (e.g., by highlighting with respect to the other selectable modules) a currently-selected selectable module. As shown in FIG. 6, the "SEARCH" selectable module is currently selected. The module display-segment 620 may display other display-segments when the selectable module identifier 616 identifies a module other than the "SEARCH" selectable module. The selected module identifier display-segment 604 may also identify a currently-selected selectable module.

The search-trigger display-segment 606 may include an action-trigger to cause the display device to display another displayable page based on action-trigger (s) selected via the module display-segment 620. As an example, each of the displayed parts numbered 1 to 5 in the common replaced parts selection display-segment 608 may include an action-trigger. Similarly, each of the displayed DTC numbered 1 to 5 in the common DTC display-segment 610 may include an action-trigger. Similarly, each of the displayed symptoms numbered 1 to 5 in the common symptoms display-segment 612 may include an action-trigger. Similarly, each of the displayed lookups numbered 1 to 5 in the common lookup display-segment 614 may include an action-trigger.

As an example, selecting the action-trigger of the search-trigger display-segment 606 after selection of the action-trigger 618 of the common DTC number 1 (i.e., DTC P00335), may cause the display device to display a displayable page with aspects of the displayable pages or sections 700, 800, 900, or 1000, shown respectively, in FIG. 7, FIG. 8, FIG. 9, and FIG. 10. Those four displayable pages or sections may be referred to as the "displayable pages or sections 700-1000."

Figure 7:
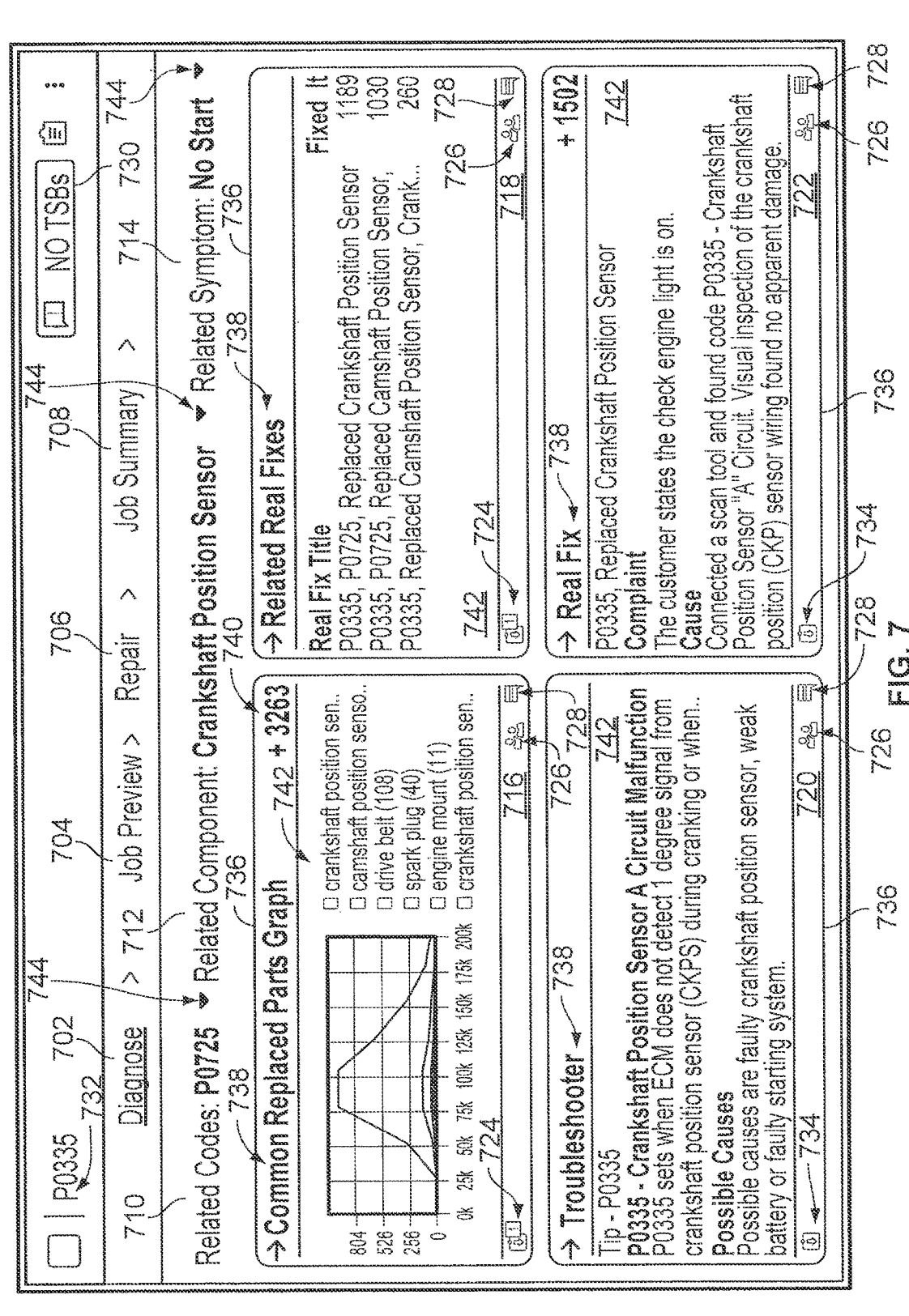

Next, FIG. 7 shows the displayable pages or sections 700-1000 include a search-trigger identifier display-segment 732. In the displayable pages or sections 700-100, the search-trigger identifier display-segment 732 identifies the DTC P0335. The search-trigger identifier display-segment 732 may display an identifier of other action-triggers selected from a module within the module display-segment 620. The search-trigger identifier display-segment 732 may display multiple selected identifiers, such as, for example, a common replaced part and a common symptom, or a common symptom and a common lookup selected from the displayable page 600.

The displayable pages or sections 700-1000 include displayable page or section selectors 702, 704, 706, and 708. The displayable page or section selector 702 includes a displayed-selectable element with respect to a DIAGNOSE displayable page or section. The displayable page or section selector 704 includes a displayed-selectable element with respect to a JOB PREVIEW displayable page or section. The displayable page or section selector 706 includes a displayed-selectable element with respect to a REPAIR displayable page or section. The displayable page or section selector 708 includes a displayed-selectable element with respect to a JOB SUMMARY displayable page or section. The term "page or section selector" indicates that the selector corresponding to that term is a page selector (i.e., a selector usable to select a displayable page) or is a section selector (i.e., a selector usable to select a section (i.e., a portion) of a displayable page.

In the displayable page or section 700, the displayable page or section selector 702 is underlined to identify that the displayable page or section 700 is a DIAGNOSE displayable page. In the displayable page or selection 800, the displayable page or section selector 704 is underlined to identify that the displayable page or section 800 is a JOB PREVIEW displayable page. In the displayable page or selection 900, the displayable page or section selector 706 is underlined to identify that the displayable page or selection 900 is a REPAIR displayable page. In the displayable page or selection 1000, the displayable page or section selector 708 is underlined to identify that the displayable page or selection 1000 is a JOB SUMMARY displayable page. Other ways in addition to or as an alternative to underlining a displayable page or section selector may be used to identify the type of displayable page currently displayed at a display screen. The example displayable pages or sections shown in the displayable pages or sections 700, 800, 900, and 1000 may be displayed in any sequence and may not be displayed at all during the occurrence of servicing a particular vehicle. Moreover, one or more of those displayable pages or sections may be displayed more than once during the occurrence of servicing the particular vehicle.

The displayable page or section selectors 702, 704, 706, and 708 may include action-triggers. As an example, action-trigger of the displayable page or section selectors 702, 704, 706, and 708 may be selected to cause the display device to display a different displayable page. For instance, while the DIAGNOSE displayable page shown in FIG. 7 is displayed, the action-trigger of the displayable page or section selector 706 may be selected to cause the display device to display a REPAIR displayable page, such as REPAIR displayable page or selection 900. As another example, selection of an action-trigger associated with a currently-displayed displayable page may cause the currently-displayed displayable page to change (e.g., change to displaying a top portion of the currently-displayed displayable page or change to display an unseen portion of the currently-displayed displayable page). Additionally or alternatively, selection of an action-trigger associated with a currently-displayed displayable page may cause a display-segment within the currently-displayed displayable page to be updated with newly or recently received or determined information.

The displayable pages or sections 700-1000 may include a technical service bulletin (TSB) indicator 730. In the displayable pages or sections 700-100, the TSB indicator 730 indicates that no TSBs were discovered during a search of the database 120 based on the selected identifier(s) indicated by the search-trigger identifier display-segment 732. In accordance with an example in which one or more TSBs was discovered during a search, the TSB indicator 730 may indicate that the one or more TSBs were discovered and the TSB indicator 730 may include a displayed-selectable element that, when selected, causes the display device to display an identifier of a TSB or the TSB. As an example, the display device may display the TSB by overlaying the TSB upon the currently-displayed displayable page or the currently-displayed displayable page may be updated to include a display-segment that includes the TSB or an action-trigger selectable to cause the TSB to be displayed by the display device.

A displayable page or section, such as the displayable page or section 700, may include an action-trigger 710 to identify a related DTC, an action-trigger 712 to identify a related component, and an action-trigger 714 to identify a related symptom. The action-triggers 710, 712, and 714 may include an expander 744 selectable to display additional DTC(s), component(s), and symptom(s), respectively.

Figure 22:
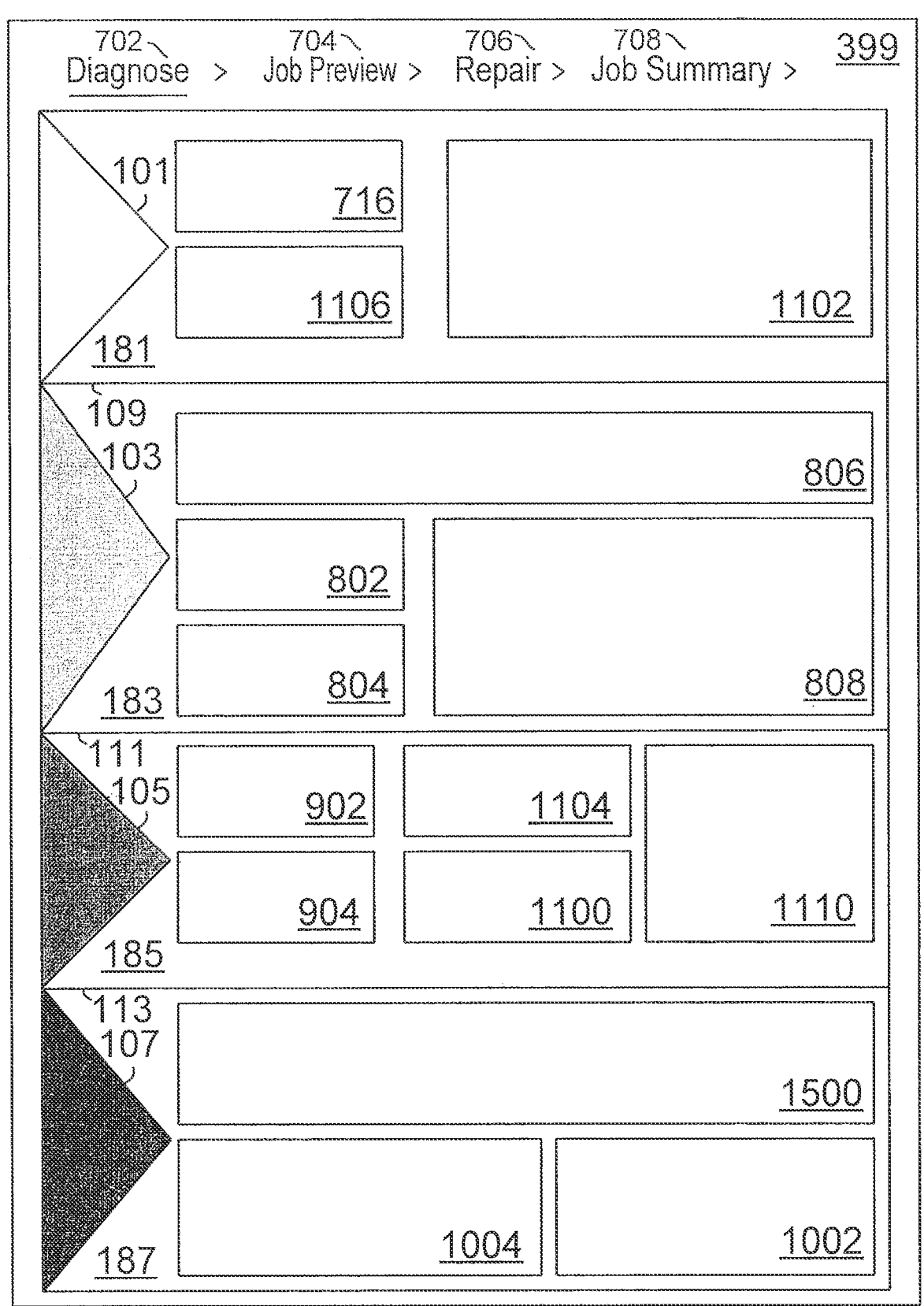

Next, FIG. 22 shows a displayable page 399 with multiple displayable sections, particularly, displayable sections 181, 183, 185, and 187 that can be displayed on a display described herein. The displayable page 399 includes section boundary lines 109, 111, and 113 to show portions of two displayable sections abut one another. Displayable section 181 includes a section banner 101 and display cards 716, 1102, and 1106, which are described elsewhere. Displayable section 183 includes a section banner 103 and display cards 802, 804, 806, and 808, which are described elsewhere. Displayable section 185 includes a section banner 105 and display cards 902, 904, 1100, 1104, and 1110, which are described elsewhere. Displayable section 187 includes a section banner 107 and display cards 1002, 1004, and 1500, which are described elsewhere. The section banners 101, 103, 105, and 107 assist viewers of displayable page 399 in knowing boundaries of the displayable sections. The section banners 101, 103, 105, and 107 can be different colors.

The underlined displayable page or section selector 702 represents that the displayable section 181 for DIAGNOSE is currently selected. Selecting an available displayable section 181, 183, 185, and 187 via one of selectors 702, 704, 706, and 708, respectively, can result in an upper portion of the selected displayable section being displayed at a top portion of the displayable page 399.

Figure 23:
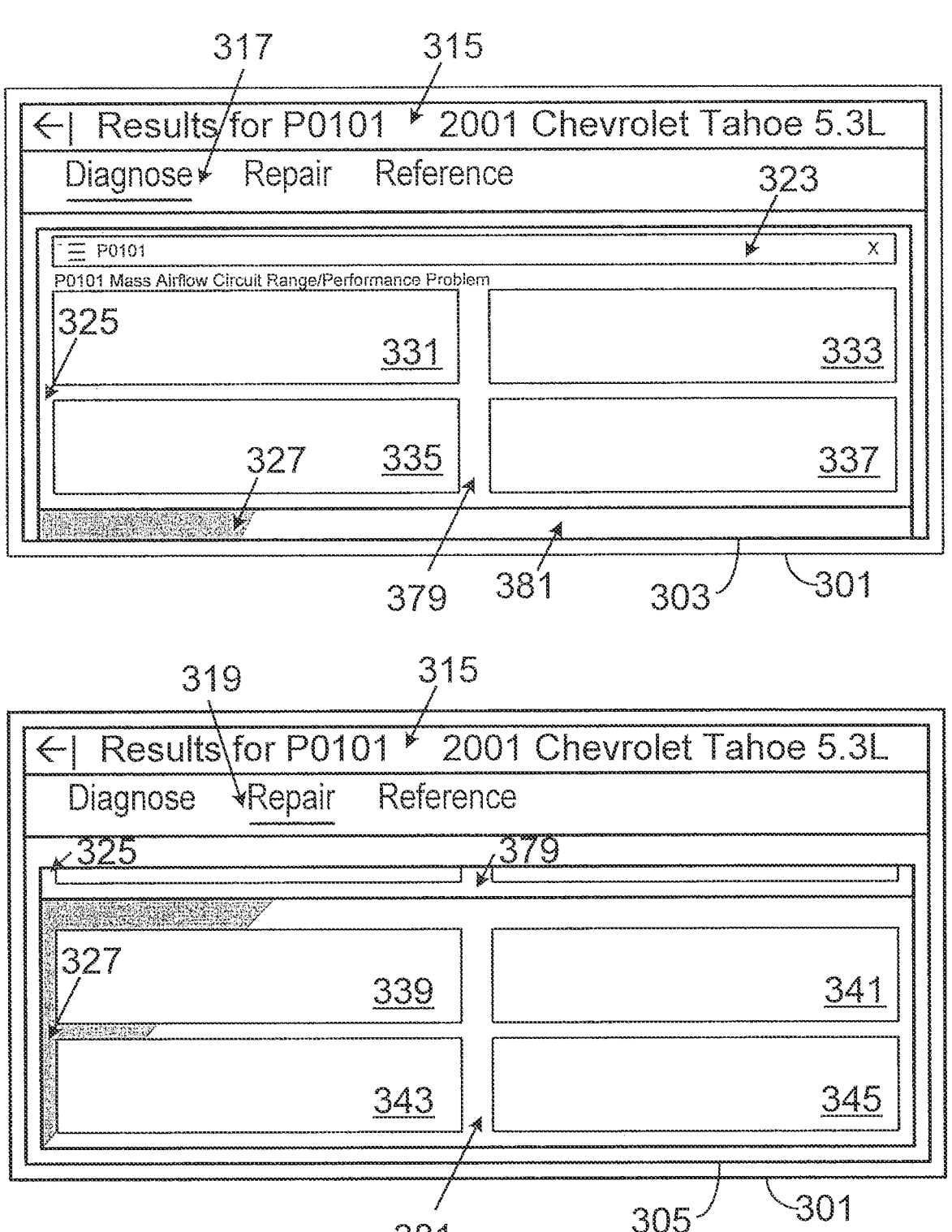

Next, FIG. 23, FIG. 24, and FIG. 25 show a display 301 displaying displayable pages 303, 305, 307, 309, 311, and 313. Collectively, those displayable pages are referred to as displayable pages 303-313. The display 301 may be located within any of the display devices discussed herein. The displayable pages 303-313 include displayable section selectors 317, 319, and 321 selectable to select a distinct displayable section within those pages. As an example, the displayable section selector 317 is for selecting a displayable section 379 having display cards pertaining to diagnostics, the displayable section selector 319 is for selecting a displayable section 381 having display cards pertaining to repairs, and the displayable section selector 321 is for selecting a displayable section 383 having display cards pertaining to reference information. The underlined selector in the displayable pages 303-313 indicates which displayable section has been selected for display.

FIGS. 23, 24, and 25 shows each displayable section 379, 381, and 383 with four display cards. Each display card is shown as being the same size. One or more of the displayable sections 379, 381, and 383 may include a different number of display cards. One or more of the displayable sections 379, 381, and 383 may include two or more display cards with different sizes. FIGS. 23, 24, and 25 show the displayable pages 303-313 showing at least a portion of two different displayable sections (i.e., 379 and 381 or 381 and 383). In an alternative arrangement, the display 301 may display only one displayable section or only a portion of one displayable section.

The display 301 may display a search bar 323 within which search criterion or criteria may be entered and a search bar 315 to display the entered search criterion or criteria. As an example, the search criterion may include a vehicle type and one or more of a symptom and a component. The vehicle type search criterion may include a YMM (e.g., 2001. Chevrolet Tahoe), a YMME (e.g., 2001. Chevrolet Tahoe 5.3 L) or a YMMES (e.g., 2001. Chevrolet Tahoe 5.3 L, air conditioning). The search criterion for the displayable pages 303, 305, and 307 is a symptom (i.e., DTC P0101). The search criterion for the displayable pages 309, 311, and 313 is a component (i.e., mass airflow sensor). Other examples of the search criterion are also possible. Since the symptom DTC P0101 is related to the component MAF sensor, the display cards discussed with respect to the searches below have some common display cards. Searches based on an unrelated symptom component for a single vehicle may or may not result in displaying a common display card.

Displayable section 379 includes a section banner 325. As shown in FIG. 23, for a search based on a vehicle and symptom, the displayable section 379 includes display cards 331, 333, 335, and 337. As shown in FIG. 24, for a search based on a vehicle and component, the displayable section 379 includes display cards 331, 335, 357, and 359. FIGS. 23 and 24 thus show that two different searches may result in displaying a different set of display cards within a displayable section, but the different sets of display cards may have at least one display card in common. FIGS. 23 and 24 also show that a displayable section may display the common display card at different areas within the displayable section. The display device 300 may receive information describing which area to display each display card. That information may be based on prior viewing of display cards and prior searches.

Displayable section 381 includes a section banner 327. As shown in FIG. 23, for a search based on a vehicle and symptom, the displayable section 381 includes display cards 339, 341, 343, and 345. As shown in FIG. 25, for a search based on a vehicle and component, the displayable section 381 includes display cards 363, 365, 367, and 369. FIGS. 23 and 25 thus show that two different searches may result in two different sets of display cards within a displayable section with no common display card.

Displayable section 383 includes a section banner 329. As shown in FIG. 24, for a search based on a vehicle and symptom, the displayable section 383 includes display cards 347, 349, 351, and 353. As shown in FIG. 25, for a search based on a vehicle and component, the displayable section 383 includes display cards 347, 349, 351, and 353. FIGS. 24 and 25 thus show that two different searches may result in displaying the same set of display cards within a displayable section. The display cards of that set of display cards may be arranged in the same or different configuration for the different searches.

The section banners 325, 327, and 329 may assist viewers in knowing boundaries of the displayable sections 379, 381, and 383. The section banners 325, 327, and 329 may be different colors.

IV. Example Display Cards

The displayable pages or sections 700-1000 include multiple display cards. For example, the displayable page or section 700 shown in FIG. 7 includes display cards 716, 718, 720, and 722. As another example, the displayable page or section 800 shown in FIG. 8 includes display cards 802, 804, 806, and 808. As yet another example, the displayable page or section 900 shown in FIG. 9 includes display cards 902, 904, and 906. As yet another example, the displayable page or selection 1000 shown in FIG. 10 includes display cards 1002, 1004, 1006, and 1008. Each display card displayed on a displayable page may include data provided by a separate web service executing on the server 118. Each display card displayed on a displayable page may include one or more action-triggers that are selectable by a user of the display device 300. The display device 300 may transmit an identifier of the display card and an identifier of the action-trigger to the server 118 and received data for updating the display card including the action-trigger or another display card to display instead of the display card including the action-trigger.

The arrangement of a displayable page, displayable section, or display card may be defined using web coding with stylesheets, such as cascading style sheets. The stylesheets may define how the content of the displayable page or section or display card, written in a markup language, is to be displayed. The display cards may be encoded with queries and rules to generate the data to be displayed in each display card. For example, a display card for showing a vehicle wiring diagram. A first rule for the display card may be to query a database for an image of a particular electrical circuit of a schematic diagram, and a second rule for the display card may be to query a database for an image of a system schematic showing the particular electrical circuit if the image is not returned in response to the first query. The example display cards described in this description may include rules to perform queries for the particular data to be displayed in those display cards.

A display card, displayed at a displayable page, may include a display card border 736 that forms an outer boundary of the display card. In the displayable page or section 700, the display card borders 736 are rounded rectangles. In accordance with the example embodiments, a display card border may be a shape other than a rounded rectangle. Display card information may be displayed within an information display area 742 formed by the display card border 736. A displayable page including a display card may include a scroll bar to cause the display card to be displayed at the display device 300 if not currently displayed at the display device 300 or to more fully display the display card or to remove at least a portion of the display card from the display 308.

A display card may include a display card title 738. A display card title 738 may, for example, include a title such as "Corrective Action Graph," "Related Real Fixes," "Troubleshooter," "Real Fix," or some other title. A display card title 738 may provide an indication of the information displayed within the information display area 742 of the display card having the display card title 738.

A display card may include a prior repair count 740. As shown in the displayable page or section 700, the display card 716 includes a prior repair count 740 that indicates "+3263." The number 3263 with respect to the display card 716 may indicate the number of parts that have been replaced for instances of a selected vehicle with respect to the search-trigger identifier within the search-trigger identifier display-segment 732. For instance, with respect to the DTC P0335 and the selected vehicle, a drive belt may have been replaced 108 times, a spark plug may have been replaced 40 times, and an engine mount may have been replaced 11 times. The other parts shown in the list of parts in the display card 716 may have been replaced a number of times that add up to 3,104 times such that the number of times the parts in the list of parts have been replaced equals 3,263.

A display card may include an add-to-report icon 734, as shown in the display card 720. The add-to-report icon 734 may include an action-trigger that, when selected or in response to being selected, may cause an aspect, based on the display card including the add-to-report icon 734, to be added to a final report within the reports 430 or within the database 120. Other examples of display cards including an instance of an add-to-report icon 734 are shown in various display cards shown in the figures showing a display card.

A display card may include an added-to-report icon 724, as shown in the display card 716. The added-to-report icon 724 may appear in a display card in response to an add-to-report card within the same display card being selected. The added-to-report icon 724 may include an action-trigger that, when selected or in response to being selected, may cause the add-to-report icon 734 to be displayed instead of the added-to-report icon 724 and removal of the added aspect based on the display card from the final report. Other examples of display cards including an instance of an added-to-report icon 724 are shown in various display cards shown in the figures showing a display card.

A display card may include an ask-a-community icon 726, as shown in the display card 718. The ask-a-community icon 726 may include an action-trigger that, when selected or in response to being selected, results in the display device 300 displaying an ask-a-community display card (not shown) at which data may be input for sending to devices of a community of users, such as display devices configured like the display device 300 being used by the community of users. The ask-a-community display card, in accordance with the ask-a-community icon 726, may include, for example, a pop-up window. After inputting the data via the ask-a-community display card, the display device 300 may transmit the data to the server 118 for subsequent transmission to the display devices of the community of users. Furthermore, after inputting the data via the ask-a-community display card, the display device 300 may stop displaying the ask-a-community display card. Other examples of display cards including an instance of an ask-a-community icon 726 are shown in various display cards shown in the figures showing a display card.

A display card may include a comment icon 728, as shown in the display card 718. The comment icon 728 may include an action-trigger that, when selected or in response to being selected, results in the display device 300 displaying an add-a-comment display card (not shown) at which data may be input as comments to be transmitted to the server 118. The add-a-comment display card, in accordance with the comment icon 728, may include, for example, a pop-up window. After inputting the data via the add-a-comment display card, the display device 300 may transmit the comment data to the server 118. Furthermore, after inputting the data via the add-a-comment display card, the display device 300 may stop displaying the add-a-comment display card. The comments provided to the server 118 may be stored in the database 120 for use as data to be displayed in the information display area 742 of a display card. Other examples of display cards including an instance of a comment icon 728 are shown in various display cards shown in the figures showing a display card.

The display card title 738 of the display card 716 is "Corrective Action Graph." The display card 716 may include one or more action-triggers that is selectable by a user of the display device 300. For example, a part within the list of parts or the graph may include an action-trigger. Selecting a part, such as crankshaft position sensor, from the list of parts may cause the server 118 to update the graph in the display card, such that the graph pertains to the selected part. A graph that pertains to a single part rather than multiple parts may appear as the graph shown in the display card 802 in FIG. 8. The display card 716 may be displayed on a displayable page such as the DIAGNOSE displayable page or section 700 or on another displayable page.

The display card title 738 of the display card 718 is "Related Real Fixes." The information display area 742 of the display card 718 may include a textual note. As an example, the textual note may include titles of repair tips based on previous repairs. The display card 718 may include one or more action-triggers (e.g., a repair tip title) that are selectable by a user of the display device 300. Selection of a particular repair tip title can cause the server 118 to update the display card 718 with a repair tip pertaining to the selected repair tip title. The display card 718 may be displayed on a displayable page such as the DIAGNOSE displayable page or section 700 or on another displayable page. The data populated into the display card 718 can be data the server 118 locates in the database 120 regarding other real fixes for the displayed related code and the displayed related symptom.

The display card title 738 of the display card 720 is "Troubleshooter." The information display area 742 of the display card 720 may include a textual note. As an example, the textual note may include a text descriptor of a DTC and text describing possible causes of the DTC. The display card 720 may include one or more action-triggers (e.g., a portion of the textual note) that are selectable by a user of the display device 300. The display card 720 may be displayed on a displayable page such as the DIAGNOSE displayable page or section 700 or on another displayable page.

The display card title 738 of the display card 722 is "Real Fix." The information display area 742 of the display card 722 may include a textual note. As an example, the textual note may include text describing a complaint and text describing a cause of the complaint. The display card 722 may include one or more action-triggers (e.g., a portion of the textual note) that are selectable by a user of the display device 300. The display card 722 may be displayed on a displayable page such as the DIAGNOSE displayable page or section 700 or on another displayable page. The data populated into the display card 722 can be data the server 118 locates in the database 120 based on at least one of a related code, a related component, and a related symptom.

Figure 8:
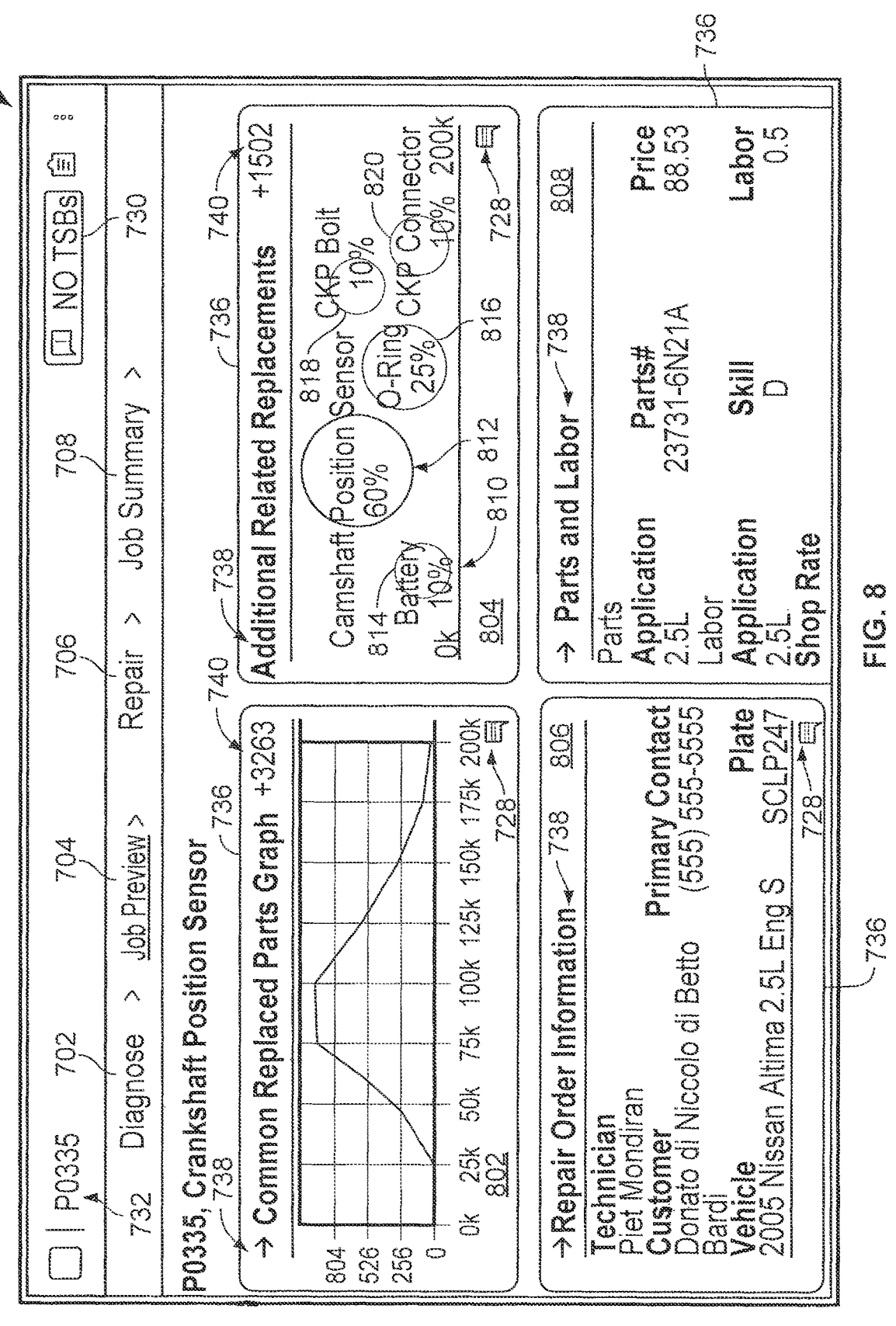

Next, FIG. 8 shows the display card title 738 of the display card 802 is "Corrective Action Graph." An information display area of the display card 802 may include the same information as described with respect to the display card 716 shown in FIG. 7. Alternatively, as shown in FIG. 8, the display card 802 may include additional or alternative data with respect to the data shown within the display card 716 (e.g., a different graph). The graph may include an action-trigger. Selection of the action-trigger being displayed can cause the display 300 to navigate to content related to the selected action-trigger. Any of the action-triggers can be configured to show the related content when the action-trigger is being selected with a pointer device or otherwise selected and the related content can be hidden (i.e., not displayed when the action-trigger is not being selected with a pointer device or otherwise selected). The display card 802 may be displayed on a displayable page such as the JOB PREVIEW displayable page or selection 800 or on another displayable page.

The display card title 738 of the display card 804 is "Additional Related Replacements." An information display area of the display card 804 may include action-triggers 812, 814, 816, 818, and 820 that are associated with a percentage at which parts for a particular vehicle type have been replaced during prior instances of servicing such a vehicle. A size of the displayed selectable elements 812, 814, 816, 818, and 820 may be proportional to its associated percentage. Each of the action-triggers 812, 814, 816, 818, and 820 may be selected to cause the server 118 to update the display card 804 with information related specifically to the part associated with the action-trigger.

The display area of the display card 804 may also include a usage indicator 810. As an example, the usage indicator may indicate a distance a vehicle may have been driven in miles or kilometers, or a time, such as hours an engine has been used. As an example, the displayed selectable element 814 and usage indicator 810 indicate that the battery is an additional replaced part ten percent of the time at a range of about 20,000 to 30,000 kilometers. The display card 804 may be displayed on a displayable page such as the JOB PREVIEW displayable page or selection 800 or on another displayable page or selection.

The display card title 738 of the display card 806 is "Repair Order Information." An information area of the display card 806 may include repair order data entered at the SMS 122 or the display device 300 or via another device. The information area may include the data identifying a characteristic of the vehicle. The display card 806 may be displayed on a displayable page such as the JOB PREVIEW displayable page 800 or selection or on another displayable page or selection.

The display card title 738 of the display card 808 is "Parts and Labor." The display card 808 may include the same information as described with respect to the display card 1300 shown in FIG. 13. Alternatively, the display card 808 may include additional or alternative data with respect to the data shown within the display card 1300. The displayable page 800 or selection, as shown in FIG. 8, is displaying only a portion of the display card 808. A vertical scroll bar 218 (not shown in FIG. 8) may be used to cause the unseen portion of the display card 808 to be displayed at a display 308. The display card 808 may be displayed on a displayable page such as the JOB PREVIEW displayable page 800 or selection or on another displayable page or selection.

Figure 9:
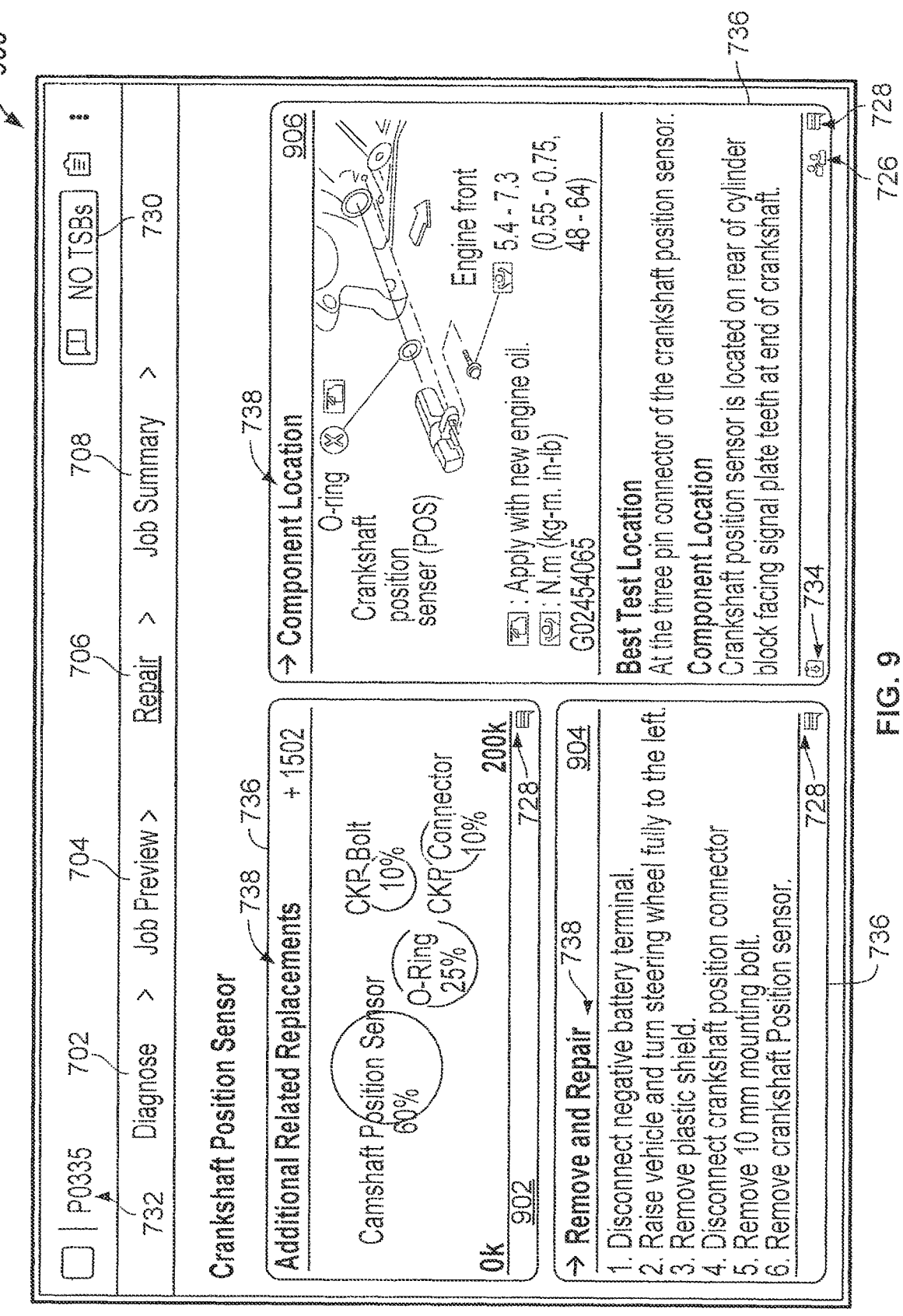

Next, FIG. 9 shows the display card title 738 of the display card 902 is "Additional Related Replacements." The display card 902 may include the same information as described with respect to the display card 804 shown in FIG. 8. Alternatively, the display card 902 may include additional or alternative data with respect to the data shown within the display card 804. Comparing the display cards 804 and 902, the display card 804 includes the action-trigger 814 with respect to battery, but the display card 902 does not include the action-trigger 814. As an example, the server 118 may cause an action-trigger to be removed, or otherwise updated, after the action-trigger is selected. As another example, the server 118 may cause data within a display card to be updated if a symptom is changed, such as changing a symptom from DTC "P0335, Crankshaft Position Sensor" as shown on the displayable page 800 or selection to just "Crankshaft Position Sensor" as shown on the displayable page 900. The display card 902 may be displayed on a displayable page such as the REPAIR displayable page or selection 900 or on another displayable page or selection.

The display card title 738 of the display card 904 is "Remove and Repair." An information display area of the display card 904 may include a textual note including steps of removing or repairing a part on a vehicle. The display card 904 may be displayed on a displayable page such as the REPAIR displayable page 900 or selection or on another displayable page or selection.

Figures 12A, 12B:
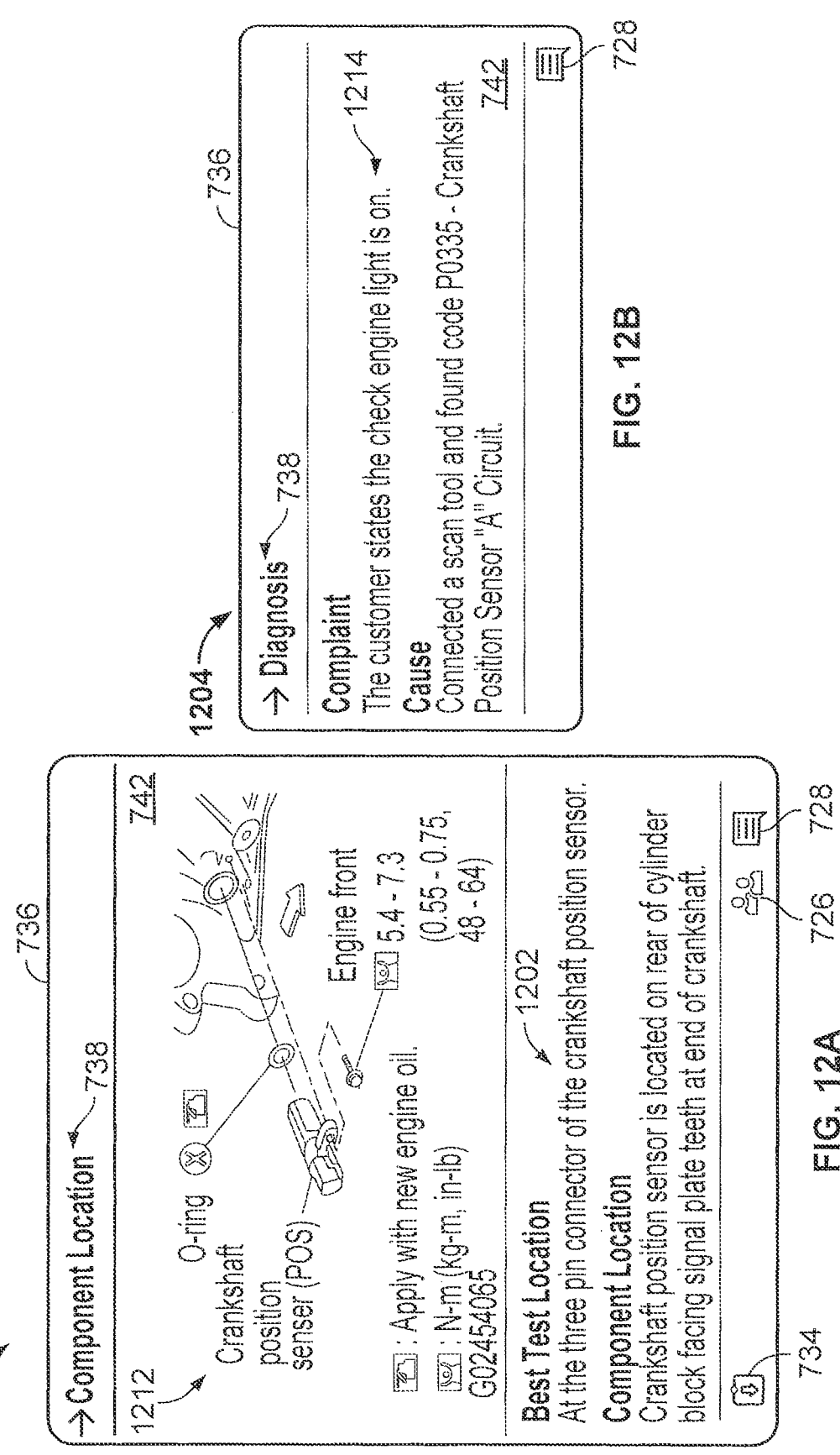

The display card title 738 of the display card 906 is "Component Location." The display card 906 may include the same information as described with respect to the display card 1200 shown in FIG. 12A. Alternatively, the display card 906 may include additional or alternative data with respect to the data shown within the display card 1200. The display card 906 may be displayed on a displayable page such as the REPAIR displayable page or selection 900 or on another displayable page or selection.

Figure 10:
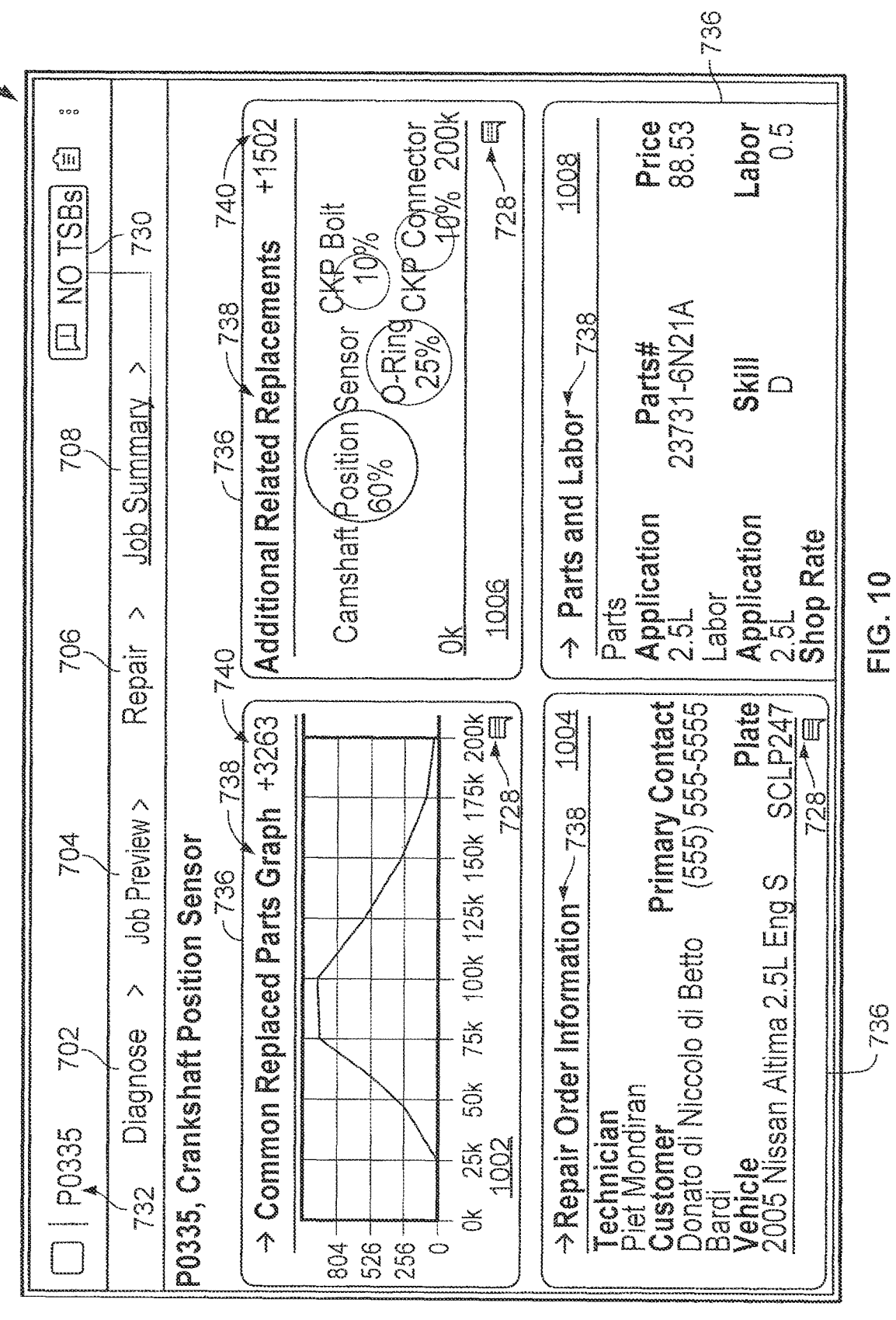

Next, FIG. 10 shows the display card title 738 of the display card 1002 is "Corrective Action Graph." The display card 1002 may include the same information as described with respect to the display card 802 shown in FIG. 8. Alternatively, the display card 1002 may include additional or alternative data with respect to the data shown within the display card 802. The display card 1002 may be displayed on a displayable page such as the JOB SUMMARY displayable page or selection 1000 or on another displayable page or selection.

The display card title 738 of the display card 1004 is "Repair Order Information." The display card 1004 may include the same information as described with respect to the display card 806 shown in FIG. 8. Alternatively, the display card 1004 may include additional or alternative data with respect to the data shown within the display card 806. The display card 1004 may be displayed on a displayable page such as the JOB SUMMARY displayable page 1000 or selection or on another displayable page or selection.

The display card title 738 of the display card 1006 is "Additional Related Replacements." The display card 1006 may include the same information as described with respect to the display card 902 shown in FIG. 9. Alternatively, the display card 1006 may include additional or alternative data with respect to the data shown within the display card 902. The display card 1006 may be displayed on a displayable page such as the JOB SUMMARY displayable page 1000 or selection or on another displayable page or selection.

The display card title 738 of the display card 1008 is "Parts and Labor." The display card 1008 may include the same information as described with respect to the display card 808 shown in FIG. 8. Alternatively, the display card 1008 may include additional or alternative data with respect to the data shown within the display card 808. The display card 1008 may be displayed on a displayable page such as the JOB SUMMARY displayable page 1000 or selection or on another displayable page or selection.

Next, FIGS. 11A, 11B, 11C, 11D, 11E, 11F, 11G, 11H, 12A, 12B, 12C, 12D, 12E, 13, 14A, 14B, and 15 show example display cards 1100, 1102, 1104, 1106, 1108, 1110, 1112, 1114, 1200, 1204, 1206, 1208, 1210, 1300, 1400, 1402, and 1500, respectively. The display cards 1100, 1102, 1104, 1106, 1108, 1110, 1112, 1114, 1200, 1204, 1206, 1208, 1210, 1300, 1400, 1402, and 1500 include a display card border 736, an information display area 742, and may include any one or more of an ask-a-community icon 726, a comment icon 728, and an add-to-report icon 734.

In FIG. 11A, the display card title 738 of the display card 1100 is "Tech Note." The information display area 742 of the display card 1100 may include a textual note 1116 based on a comment previously entered at a display card that appears in response to selection of the comment icon 728. Other examples of the textual note 1116 are also possible. The display card 1100 may be displayed on a displayable page such as the DIAGNOSE displayable page shown in the displayable page or section 700 or on another displayable page.

In FIG. 11B, the display card title 738 of the display card 1102 is "Common Test Strategies." The display card 1102 may include one or more action-triggers that are selectable by a user of the display device 300. Those action-triggers may include a test strategy indicator for a frequency test 1118, a test strategy indicator for a signature (e.g., a signal) test 1120, and a test strategy indicator for a visual test 1122. The display card 1102 may be displayed on a displayable page such as the DIAGNOSE displayable page shown in the displayable page or section 700 or on another displayable page.

In FIG. 11C, the display card title 738 of the display card 1104 is "OEM Test Procedure." The information display area 742 of the display card 1102 may include a textual note 1124 based on an OEM procedure stored in the database 120. Other examples of the textual note 1124 are also possible. The display card 1104 may be displayed on a displayable page such as the DIAGNOSE displayable page shown in the displayable page or section 700 or on another displayable page or section.

In FIG. 11D, the display card title 738 of the display card 1106 is "Guided Test Procedure." The information display area 742 of the display card 1106 may include a textual note 1126 based on a guide test procedure stored in the database 120. Other examples of the textual note 1126 are also possible. The display card 1106 may be displayed on a displayable page such as the DIAGNOSE displayable page shown in the displayable page or section 700 or on another displayable page or section.

In FIG. 11E, the display card title 738 of the display card 1108 is "Guided Connector." The information display area 742 of the display card 1108 may include a connector view 1136 and a textual note 1128 associated with the connector view 1136 stored in the database 120. The textual note 1128 includes pin assignments and wire colors. Other examples of the textual note 1128 are also possible. The display card 1108 may include one or more action-triggers that are selectable by a user of the display device 300. For example, a connector pin within the connector view 1136 may include an action-trigger. The display card 1108 may be displayed on a displayable page such as the DIAGNOSE displayable page shown in the displayable page or section 700 or on another displayable page or section.

In FIG. 11F, the display card title 738 of the display card 1110 is "Related OEM Diagrams." As shown in FIG. 11F, the information display area 742 of the display card 1110 may include a graph showing multiple signals, such as three signal pertaining to a crankshaft position sensor. A graph in the display card 1110 may show one signal instead of multiple signals. The information display area 742 may include text to identify each signal in the graph. This text is shown as stars to the left of the graphs in FIG. 11F. The information display area 742 of the display card 1110 may include a textual note 1130, such as a note about one or more of the signals in the graph or about the graph itself or some other aspect of that information display area 742. The display card 1110 may be displayed on a displayable page such as the DIAGNOSE displayable page shown in the displayable page or section 700 or on another displayable page or section.

In FIG. 11G, the display card title 738 of the display card 1112 is "Related Test Specifications." The information display area 742 of the display card 1112 may include a textual note 1132 based on specifications (e.g., a voltage or resistance specification) for a test stored in the database 120. Other examples of the textual note 1132 are also possible. The display card 1112 may be displayed on a displayable page such as the DIAGNOSE displayable page shown in the displayable page or section 700 or on another displayable page or section.

In FIG. 11H, the display card title 738 of the display card 1114 is "Library." The information display area 742 of the display card 1114 may include a library-item identifier 1134. A library-item identified by the library-item identifier 1134 may include a waveform captured by an oscilloscope. The library-item identifier 1134 includes a title of the library-item, a identifier of the type of library-item (e.g., a waveform), a condition of the library-item, and an RPM Range identifier associated with the library item. The display card 1114 may include one or more action-triggers (e.g., any one or more of the title, type, condition, and RPM range describing a library-item) that are selectable by a user of the display device 300. Selection of the displayed-selectable element of the display card 1114 may cause the processor 302 to retrieve, receive, and display at least a portion of the library-item within the display card 1114 or within another portion at the display device. The display card 1114 may be displayed on a displayable page such as the DIAGNOSE displayable page shown in the displayable page or section 700 or on another displayable page or section.

In FIG. 12A, the display card title 738 of the display card 1200 is "Component Location." The information display area 742 of the display card 1200 may include an image 1212 of a component selected as a search-trigger and displayed at the search-trigger identifier display-segment 732 or a component related to the search-trigger. The information display area 742 of the display card 1200 may include a textual note 1202 based on the component shown in the image 1212. As an example, the textual note 1202 may include text defining a best test location associated with the component shown in the image 1212 and text defining a location of the component shown in the image 1212. The component may include a crankshaft position sensor. The display card 1200 may include one or more action-triggers (e.g., a component within the image 1212) that are selectable by a user of the display device 300. The display card 1200 may be displayed on a displayable page such as the JOB PREVIEW displayable page shown in the displayable page 800 or selection or on another displayable page or selection.

In FIG. 12B, the display card title 738 of the display card 1204 is "Diagnosis." The information display area 742 of the display card 1204 may include a textual note 1214. As an example, the textual note 1214 may include text defining a customer complaint and a cause of the customer complaint. The display card 1204 may include one or more action-triggers (e.g., the complaint or the cause within the note 1214) that are selectable by a user of the display device 300. The display card 1204 may be displayed on a displayable page such as the JOB PREVIEW displayable page shown in the displayable page 800 or selection or on another displayable page or selection.

Figures 12C, 12D, 12E:
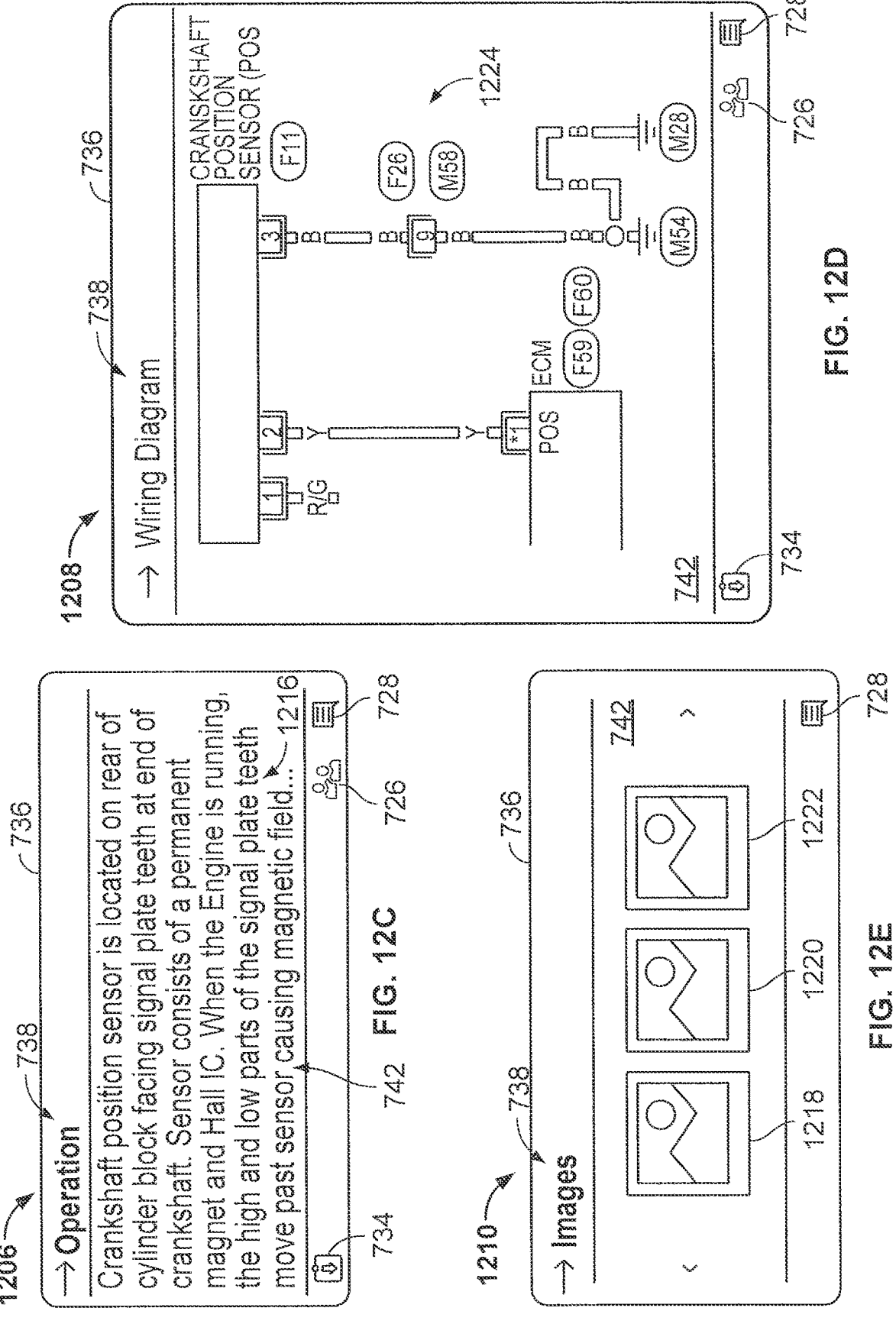

In FIG. 12C, the display card title 738 of the display card 1206 is "Operation." The information display area 742 of the display card 1206 may include a textual note 1216. As an example, the textual note 1216 may include text explaining how a vehicle or a component of the vehicle operates. The display card 1206 may include one or more action-triggers (e.g., a word or a group of words within the note 1216) that are selectable by a user of the display device 300. The display card 1206 may be displayed on a displayable page such as the JOB PREVIEW displayable page shown in the displayable page 800 or selection or on another displayable page or selection.

In FIG. 12D, the display card title 738 of the display card 1208 is "Wiring Diagram." The information display area 742 of the display card 1208 may include a wiring diagram 1224. As shown in FIG. 12D, the wiring diagram 1224 may show (i) vehicle components, such as a crankshaft position sensor and an ECM, (ii) connector pins and connector pin identifiers, such as connector pins 1, 2, and 3 of the crankshaft position sensor and connector pin 1, and (iii) conductors and conductor identifiers and colors. The display card 1208 may include one or more action-triggers (e.g., a connector pin or a conductor) that are selectable by a user of the display device 300. The display card 1208 may be displayed on a displayable page such as the JOB PREVIEW displayable page shown in the displayable page 800 or selection or on another displayable page or selection.

In FIG. 12E, the display card title 738 of the display card 1210 is "Images." The information display area 742 of the display card 1210 may include an image icon, such as an image icon 1218, image icon 1220, or image icon 1222. The display card 1210 may include one or more action-triggers (e.g., an image icon, a left arrow to the left of the image icon 1218, or a right arrow to the right of the image icon 1222) that are selectable by a user of the display device 300. Selecting the left arrow or the right arrow may result in one or more of the image icons 1218, 1220, and 1222 to be removed from the display card 1210 and one or more other image icons to appear in place of the removed image icon(s).

Selecting an image icon, such as the image icon 1220, may result in the display device displaying an image represented by the image icon or the search-trigger within the search-trigger identifier display-segment 732. The display card 1210 may be displayed on a displayable page such as the JOB PREVIEW displayable page shown in the displayable page 800 or selection or on another displayable page or selection.

Next, FIG. 13 shows the display card title 738 of the display card 1300 is "Parts and Labor." The information display area 742 of the display card 1300 may include a textual note 1302 and a textual note 1304. As an example, the textual note 1302 may include text identifying parts to be used in a particular vehicle repair. That text may include a part number and price or some other text. The text of the textual note 1302 may also or alternatively include text regarding a labor skill level, a labor time (e.g., 0.5 or 1.0 in hours or another amount of time) or a labor price (e.g., $100 per hour). The textual note 1304 may include a recommendation entered by a user of the display device 300 in regard to the vehicle identified at the selected-vehicle display-segment 506 shown in FIG. 5. The display card 1300 may be displayed on a displayable page such as the JOB PRE-VIEW displayable page shown in the displayable page 800 or selection, the FINAL REPORT displayable page shown in the displayable page or selection 1000, or on another displayable page or selection.

In FIG. 14A, the display card title 738 of the display card 1400 is "Repair Specifications." The information display area 742 of the display card 1400 may include a textual note 1404. As an example, the textual note 1404 may include text defining a procedural step, such as "Apply new engine oil to crankshaft position sensor o-ring," a component identifier, such as "mounting bolt," and a specification associated with the identified procedure or the identified component, such as a torque specification. The display card 1400 may be displayed on a displayable page such as the REPAIR displayable page shown in the displayable page or selection 900 or on another displayable page or selection.

In FIG. 14B, the display card title 738 of the display card 1402 is "After Repair." The information display area 742 of the display card 1402 may include a textual note 1406. As an example, the textual note 1406 may include text defining addition steps that may be performed after a repair with respect to a component related to the search-trigger displayed at the search-trigger identifier display-segment 732. The display card 1402 may be displayed on a displayable page such as the REPAIR displayable page shown in the displayable page or selection 900 or on another displayable page or selection.

In FIG. 15, the display card title 738 of the display card 1500 is "Final Report." The information display area 742 of the display card 1500 may include a textual note 1502 and a textual note 1504. As an example, the textual note 1502 may include text defining repairs performed on a vehicle. As another example, the textual note 1504 may include the recommendation entered by the user of the display device 300 in regard to the vehicle identified at the selected-vehicle display-segment 506 shown in FIG. 5. The display card 1500 may be displayed on a displayable page such as the JOB SUMMARY displayable page shown in the displayable page or selection 1000 or on another displayable page or selection.

Table 1 lists the names of example display cards in the left-most column and names of example display pages or sections in the top row of the four right-most columns. The letter "X" is used to designate, in accordance with an example embodiment, the display cards that may be shown on the associated named display page or section. A person skilled in the art will understand that other display cards could be shown on the named display pages or sections and that the designated display cards are not required to be shown on the named display pages or sections.

may be carried out in accordance with one or more example embodiments described herein. The set 1600 includes the functions shown in blocks labeled with even numbers 1602 through 1614 inclusive. The following description of the set 1600 includes references to elements shown in other figures described in this description, but the functions of the set

TABLE 1

| Display Cards/Content | Diagnose | Job Preview | Repair | Job Summary |
|---|---|---|---|---|
| Real Fix | X | X | | X |
| Corrective Action Graph | X | X | | X |
| Related Real Fixes | X | | | |
| CTM Operation | X | X | | X |
| CTM Location | X | X | | X |
| CTM Tech Notes | X | | | |
| OE Exploded View | X | X | X | X |
| Test Strategies | X | | | X |
| CTM Test Procedures | X | | | |
| CTM Connector | X | | | |
| OEM Wiring Diagram | X | | X | |
| OE Specifications | X | | | |
| Library | X | | | |
| Other Replaced Components | | X | | X |
| OE Parts and Labor | | X | | X |
| Recommendations | | X | | |
| Additional other parts replaced bubble graph | | | X | |
| OE R&R Procedure | | | X | |
| OE Specification and Capacities | | | X | |
| After Repair | | | X | |
| Relearn Procedures | | | X | |
| Clearing Codes | | | X | |

Table 2 lists the names of another set of example display cards and identifies a displayable section in which each display card may be displayed. Table 2 also identifies a source for the information that may be displayed within the display cards. The listed sources include the OEM of vehicles, and two aftermarket providers of vehicle service information. The displayable sections in Table 2 correspond to the displayable sections 379, 381, and 383 shown in FIGS. 23, 24, and 25. Other examples of display cards displayable in one or more of those displayable sections are also possible.

1600 are not limited to by being carried out by the referenced elements. A variety of methods may be performed using all of the functions shown in the set 1600 or any proper subset of the functions shown in the set 1600. Any of those methods may be performed with other functions such as one or more of the other functions described herein.

Block 1602 includes receiving, at the server 118, data indicating a vehicle symptom. The data indicating the vehicle symptom may be imbedded within a message transmitted over the network 114 from the display device 106, 108, 110, 300. The data indicating the vehicle symptom may

TABLE 2

| Displayable Section | Display Card | OEM | Aftermarket #1 | Aftermarket #2 |
|---|---|---|---|---|
| Diagnose | Troubleshooter Tip | | X | |
| Diagnose | Repair Actions (CRP) | | X | |
| Diagnose | Real-Fix | | X | |
| Diagnose | Possible Causes | | X | |
| Diagnose | OEM Procedures - Diagnose | X | | |
| Diagnose | Testing Route | | X | |
| Diagnose | Test | | X | |
| Diagnose | Connector | | X | |
| Diagnose | Wiring Diagram | X | | |
| Repair | OEM Procedures - R&R | X | | |
| Repair | Parts and Labor | | | X |
| Repair | Specification | X | | |
| Repair | After Repair | X | X | |
| Reference | Operation | | X | |
| Reference | Additional replaced parts | | X | |
| Reference | Location | | X | |
| Reference | Location View | X | | |

V. Example Operation Regarding Displayable Pages

Figure 17:
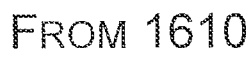

Next, FIG. 16 and FIG. 17 show a flowchart depicting a set of functions 1600 (or more simply "the set 1600") that include a vehicle symptom entered using the user input device 310. As an example, the vehicle symptom may include a DTC identifier, such as P0335. For purposes of this description and as an example, the DTC P0355 may identify a fault detected with a crankshaft position sensor or a fault detected in an ignition coil 5 control circuit. The vehicle symptom including the DTC identifier may indicate that an ECU in the vehicle has set the DTC active or history. As another example, the vehicle symptom may include a non-DTC symptom identifier, such as "vehicle does not start," "vehicle dies promptly after starting," "misfire," "engine hesitates," or some other text-based customer complaint. As another example, the vehicle symptom may include a DTC identifier and a non-DTC symptom identifier. The data indicating the vehicle symptom may include data identifying characteristics of the vehicle.

Next, block 1604 includes determining, at the server 118 by searching the database 120 based on the vehicle symptom, a most-likely cause of the vehicle symptom. The most-likely cause of the vehicle symptom may be based on the vehicle symptom and the identified characteristics of the vehicle. The server 118 may determine the most-likely cause of the vehicle symptom based on, at least in part, the year, make, and model of the instance of a vehicle exhibiting the vehicle symptom.

Next, block 1606 includes determining, at the server 118 by searching the database 120, a most probable component associated with the most-likely cause of the vehicle symptom. The server 118 may determine the most probable component based on the vehicle symptom and the identified characteristics of the vehicle. For instance, the server 118 may determine the most-probable component based on, at least in part, the year, make, and model of the instance of a vehicle exhibiting the vehicle symptom.

Next, block 1608 includes determining, at the server 118 by searching the database 120, a component-type identifier (CTI) associated with the most-probable component. The CTI may be one of a plurality of CTI 420. In one respect, the server 118 may search for the CTI based on the most probable component. In another respect, the server 118 may search for the CTI based on the most probable component and one or more of the identified characteristics of the vehicle, the vehicle symptom, and the most-likely cause of the vehicle symptom.

As an example, the CTI determined by the server may include a mechanical component-type CTI (or, more simply, a "mechanical component-type"). As another example, the CTI determined by the server may include an electrical component-type CTI (or, more simply, an "electrical component-type"). As another example, the CTI determined by the server 118 may include one of an electrical component-type, a mechanical component-type, an electro-mechanical component-type, an electro-pneumatic component-type, and an electro-hydraulic component-type. Other examples of a CTI are also possible.

The server 118 may also determine a sub-class CTI associated with the most-probable component. The sub-class CTI may be used along with the determined CTI to more perform a more precise or quicker search of the database 120. As an example, the sub-class CTI associated with the electrical component-type CTI may be a solenoid sub-class CTI, a sensor sub-class CTI, or a module sub-class CTI. Other examples of a sub-class CTI are also possible.

Next, block 1610 includes determining, at the server 118 by searching the database 120, a subset of information categories from among a set of information categories 416. The set of information categories may include multiple categories associated with at least one component type identifier of the plurality of component type identifiers. The database 120 may include a separate database to store the set of information categories and data to determine the subset of information categories from among the set of information categories.

As an example, the set of information categories may include a parts and labor category. A display card of the displayable page pertaining to the parts and labor category may be defined to display data pertaining to the most-probable component and data pertaining to labor operations associated with the most-probable component.

In accordance with the embodiment in which the determined CTI is the mechanical component-type CTI, the set of information categories may include a wiring diagram category and an exploded view category, and the subset of information categories may include the exploded view category, but not the wiring diagram category.

In accordance with the embodiment in which the determined CTI is the electrical component-type CTI, the set of information categories may include a wiring diagram category and a second category, the subset of information categories may include the wiring diagram, but not the second category. The second category may include a mechanical view diagram, an exploded mechanical view diagram, or an exploded mechanical view diagram with an electrical wiring diagram.

Next, block 1612 includes determining, at the server 118 by searching the database 120, data to populate in multiple display cards of a first displayable page. Each respective display card of the first displayable page may pertain to a respective information category of the subset of information categories and to the vehicle symptom. As an example, the data to populate in one or more of the respective display cards of the first displayable page may pertain to the most-probable component and the most-likely cause of the vehicle symptom.

Next, block 1614 includes generating, at the server 118, the first displayable page including the multiple display cards of the first displayable page and the data to populate in the respective display cards of the first displayable page. As an example, generating the first displayable page may include generating a markup language page including the respective display cards of the first displayable page and the data to populate in the respective display cards of the first displayable page. As another example, generating the first displayable page may include the server reading one or more rules encoded into the displayable page, a displayable section or display card and performing a database query within the one or more rules to request data to be displayed as part of the displayable page or a display card within the displayable page or section.

A method that includes performing all of the functions of the set 1600 or a proper subset of the functions of the set 1600 may further include performing one or more of the following functions: (i) displaying, within the first display card, an action-trigger corresponding to the at least one possible cause of the vehicle symptom other than the most-likely cause of the vehicle symptom, (ii) receiving, at the server 118, a selection of the action-trigger, and (iii) generating, at the server, a second displayable page in response to the selection of the action-trigger. The second displayable page may include, within a first display card of the second displayable page, data pertaining to the at least one possible cause of the vehicle symptom other than the most-likely cause of the vehicle symptom. At least a portion of the data pertaining to the at least one possible cause of the vehicle symptom other than the most-likely cause of the vehicle symptom may be different than the data to populate in the respective display cards of the first displayable page.

A method that includes performing all of the functions of the set 1600 or a proper subset of the functions of the set 1600 may further include performing one or more of the following functions: (i) displaying, within the first display card, an action-trigger corresponding to a test procedure identified on the analyzed repair orders, (ii) receiving, at the server 118, a selection of the action-trigger, and (iii) generating, at the server 118, a second displayable page in response to the selection of the action-trigger. The second displayable page may include, within a first display card of the second displayable page, data pertaining to the test procedure corresponding to the action-trigger. At least a portion of the data pertaining to the test procedure corresponding to the action-trigger may be different than the data to populate in the respective display cards of the first displayable page.

A method that includes performing all of the functions of the set 1600 or a proper subset of the functions of the set 1600 may further include serving, by the server 118 to the display device 106, 108, 110, or 300, one or more of the multiple display cards of the first displayable page as a web service, or the data for including within a display card to modify a display card on a displayable page that is being displayed. A server that performs any function of the set 1600 or any other described function may include one or more processors. Any function described herein as being performed by a server may alternatively be described as being performed by one or more processors (e.g., the one or more processors of the server).

The database 120 may include a first database storing metadata determined at the server 118 by analyzing repair orders pertaining to prior instances of vehicle repairs made to vehicles exhibiting the vehicle symptom. The set of information categories 416 may include a possible-causes category associated with data pertaining to at least one possible cause of the vehicle symptom other than the most-likely cause of the vehicle symptom. A first display card of the first displayable page may pertain to the possible-causes category. The data to be displayed in the first display card may be based on the metadata determined at the server 118 by analyzing repair orders pertaining to prior instances of vehicle repairs made to vehicles exhibiting the vehicle symptom.

The database 120 may include a first database storing metadata determined by the server 118 by analyzing repair orders pertaining to prior instances of vehicle repairs made to vehicles exhibiting the vehicle symptom. The set of information categories 416 may include a commonly-serviced-component category. A first display card of the first displayable page may pertain to the commonly-serviced-component category. The data to be displayed in the first display card may be based on the metadata determined at the server 118 by analyzing repair orders pertaining to prior instances of vehicle repairs made to vehicles exhibiting the vehicle symptom. A commonly-replaced-part (CRP) display-segment may include an action-trigger displayable on the display 308. The action trigger may, for example, include a "report" action trigger selectable to include information corresponding to a part within a report.

The database 120 may include a first database storing metadata determined at the server by analyzing repair orders pertaining to prior instances of vehicle repairs made to vehicles exhibiting the vehicle symptom. The set of information categories may include a testing graph category. A display card of the displayable page pertaining to the testing graph category may be defined to display a graphical representation based on the metadata determined by the server

118 analyzing repair orders pertaining to prior instances of vehicle repairs made to vehicles exhibiting the vehicle symptom.

Next, FIG. 18 shows a flowchart depicting a set of functions 1800 (or more simply "the set 1800") that may be carried out in accordance with one or more example embodiments described herein. The set 1800 includes the functions shown in blocks labeled with even numbers 1802 through 1806 inclusive. The following description of the set 1800 includes references to elements shown in other figures described in this description, but the functions of the set 1800 are not limited to being carried out by the referenced elements. A variety of methods may be performed using all of the functions shown in the set 1800 or any proper subset of the functions shown in the set 1800. Any of those methods may be performed with other functions such as one or more of the other functions described herein.

Block 1802 includes transmitting, from a display device (e.g., display device 106, 108, 110, or 300) to a server (e.g., the server 118), request data indicating at least one of a vehicle symptom indicator and a vehicle component indicator. As an example, the request data indicating the vehicle symptom indicator or the vehicle component indicator may be entered into the display device by selecting the vehicle symptom from the DTC symptoms 610 or the non-DTC symptoms 612 displayed at the display device 300, as shown on the displayable page 600 in FIG. 6. As another example, the display device 300 may display a search box into which the vehicle symptom may be entered by way of the user input device 310. As yet another example, the display device 300 may display a pick list (e.g., the vehicle symptom pick list or the vehicle component pick list) on the display 308. The user input device 310 may be used to select the vehicle symptom indicator from the vehicle symptom pick list and used to select the vehicle component indicator from the vehicle component pick list. Transmitting the request data may include transmitting a message including the request data including the data indicating the vehicle symptom indicator or the vehicle component indicator. The message may include data identifying an attribute of the vehicle exhibiting the vehicle symptom. The vehicle attribute(s) may be entered into the display device 300 using the user input device 310 while the display 308 is displaying an aspect shown in the displayable page 500 for entering vehicle attributes.

Next, block 1804 includes receiving, at a processor of the display device 106, 108, 110, or 300, first display data transmitted from the server 118. The first display data is associated with the at least one of the vehicle symptom indicator and the vehicle component indicator. The first display data is for populating a first display card of a first displayable page. The data transmitted from the server 118 may be determined by the server 118 from the database 120 as described with respect to the set 1600.

Next, block 1806 includes displaying, at a display 308 of the display device 106, 108, 110, or 300, the first displayable page including the first display card populated with the first display data associated with at least one of the vehicle symptom and the vehicle component.

A method that includes performing all of the functions of the set 1800 or a proper subset of the functions of the set 1800 may further include performing one or more of the following functions: (i) displaying a selectable first action-trigger within the first display card displayed at the display 308, (ii) receiving, at a processor 302 of the display device 106, 108, 110, or 300, data that indicates an instance of selecting the first action-trigger occurred, and (iii) performing, at the display device 106, 108, 110, or 300 at least a portion of an action associated with the first action-trigger.

The action performed may include any of a variety of actions. As an example, the action associated with the first action-trigger may include at least one of (i) generating a new display card (e.g., a pop-up window) overlaying at least a portion of the multiple display cards, (ii) displaying a new displayable page replacing a page on which the multiple display cards are displayed, (iii) adding data from the first display card to a service report, (iv) displaying different data in at least one display card of the multiple display cards, (v) displaying a different display card in place of one of the display cards of the multiple display cards, and (vi) changing a size of at least one display card of the multiple display cards. Displaying different data in at least one display card may occur in response to selection of an action-trigger within the display card. Changing the size of a display card may include changing a display card that takes up a portion, but not all portions, of a displayable page to a display card that takes up all portions of the displayable page. Changing the size of a display card may include decreasing the size of a display card to allow for increasing the size of another display card.

The display cards displayed at the display 308 may include any of the display cards shown in any of the figures or any the aspects shown in any of the display cards shown in any of the figures. For example, the display cards may include an action-trigger, such as added-to-report icon 724, the ask-a-community icon 726, the comment icon 728, or the add-to-report icon 734.

VI. Example Operation and Displayable Page for Repair Order

Figure 19:
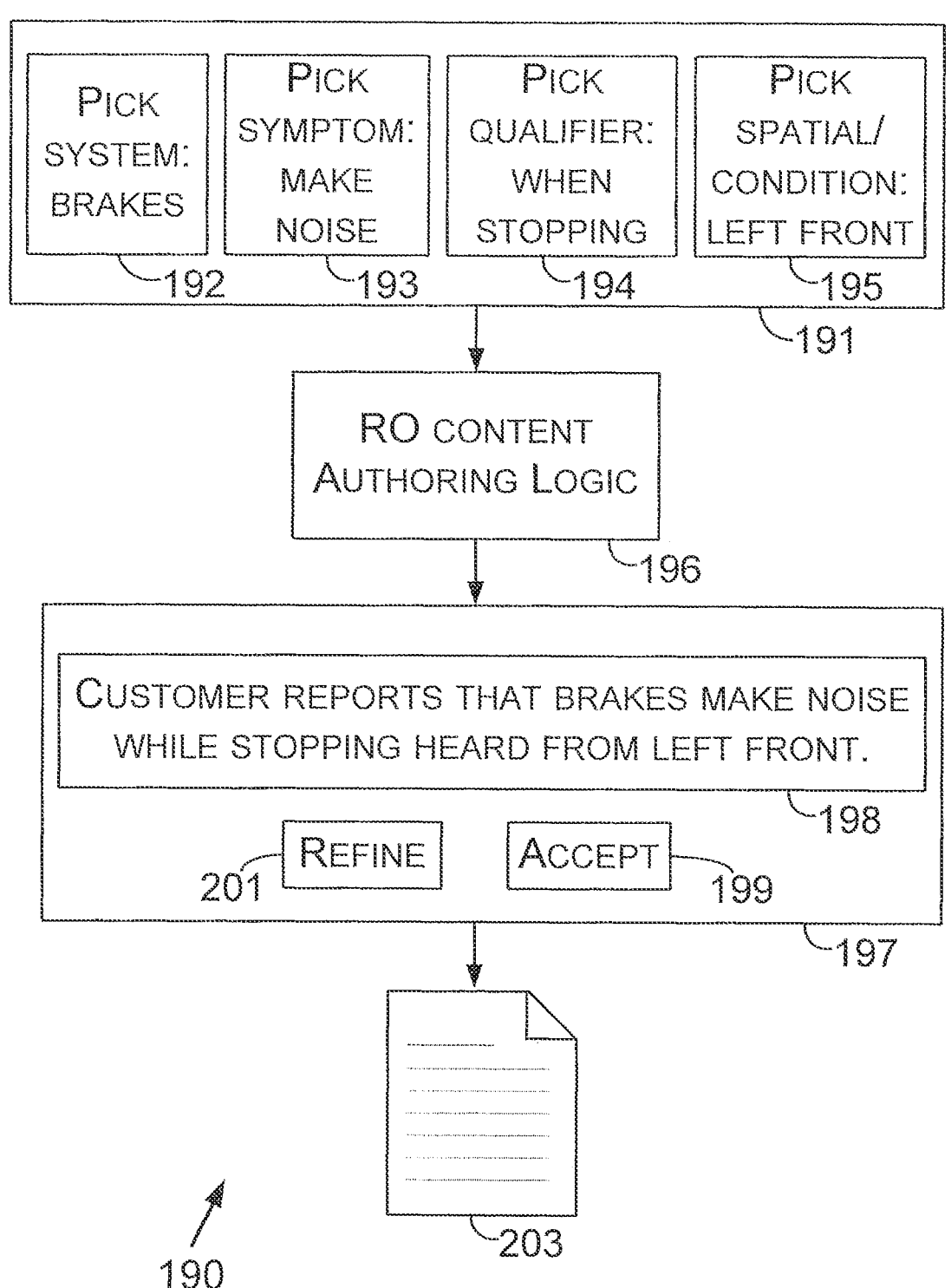
FIG. 19 is a flowchart depicting aspects pertaining to generating repair order content.

Next, FIG. 19 shows a flowchart depicting a set of functions 190 (or more simply "the set 190") that may be carried out in accordance with one or more example embodiments described herein. The set 190 includes the functions shown in blocks labeled with numbers 191, 196, and 197. The following description of the set 190 includes references to elements shown in other figures described in this description, but the functions of the set 190 are not limited to being carried out by the referenced elements. A variety of methods may be performed using all of the functions of the set 190 or any proper subset of the functions of the set 190. Any of those methods may be performed with other functions such as one or more of the other functions described herein.

Block 191 may include displaying pick lists 192, 193, 194 and 195 and receiving one or more selections from each of those pick lists. The displayed pick lists may be contained within the pick lists 322. The pick list 192 may include the vehicle system pick list. The pick list 193 may include the vehicle symptom pick list. The pick list 194 may include the temporal qualifier pick list. The pick lists 195 may include the spatial qualifier pick list. The pick lists 192, 193, 194, and 195 may be displayed by the display 308 and the user input device 310 may be used to select the one or more selections from each pick list. The processor 302 may receive or otherwise detect which selections are made from the displayed pick lists. As shown in FIG. 19, the selections may include "brakes" to indicate a vehicle system, "make noise" to indicate a vehicle symptom, "when stopping" to indicate a temporal qualifier, and "left front" to indicate a spatial qualifier. Other examples of the picks lists displayed during performance of the function of block 191 are also possible. Other examples of the selection(s) made from the displayed pick lists during performance of the function of block 191 are also possible.

Next, block 196 includes providing the pick list selections to (or receiving the pick list selections at) RO content authoring logic (e.g., RO CAL 326 or RO CAL 434) or the processor configured to execute the RO CAL. Providing the pick list selections may include the processor 302 accessing the pick list selections from the pick lists 322 or causing the network interface 306 to transmit the pick lists selections to the network interface 404. The RO content authoring logic may generate the RO content based on the pick lists selections. The RO content authoring logic may refer to a database with a taxonomy and ontology database to determine a logical arrangement for placing the pick lists selections within the RO content being generated. As an example, the taxonomy and ontology database may include pre-authored text strings having a number of gaps for placement of terms associated with or represented by the pick list selections.

Next, block 197 includes displaying RO content 198 generated by the processor 302 by executing the RO content authoring logic. The display 308 may display the RO content 198 along with an accept button 199 that is selectable to approve the RO content 198 for placement onto an RO 203. The display 308 may also display a refine button 201 that is selectable to trigger entry into a mode in which the processor 302 allows the RO content 198 to be revised before placement onto the RO 203. Displaying the RO content 198 may include displaying the RO content within the RO 203 or on a part of the display 308 not displaying the RO 203. The RO 203 may be used for any of a variety of purposes, such as, providing to a technician, providing to a customer, providing to a manufacturer for warranty repair reimbursement, and shop records.

Next, FIG. 20 shows a flowchart depicting a set of functions 250 (or more simply "the set 250") that may be carried out in accordance with one or more example embodiments described herein. The set 250 includes the functions shown in blocks labeled with whole numbers 251 through 258 inclusive. The following description of the set 250 includes references to elements shown in other figures described in this description, but the functions of the set 250 are not limited to being carried out by the referenced elements. A variety of methods may be performed using all of the functions shown in the set 250 or any proper subset of the functions shown in the set 250. Any of those methods may be performed with other functions such as one or more of the other functions described herein.

Block 251 includes receiving at least one pick list selection from at least one pick list for generating a displayable page. Each pick list may be displayed on the display 308 and each pick list selection may be made by use of the user input device 310. The processor 302 may receive or otherwise determine the selections from the pick lists or by use of the user input device 310. Each of the displayed pick lists may be contained within one or more of the pick lists 322 or 432. As an example, the pick lists may include the vehicle symptom pick list, the vehicle component pick list, the test and results pick list. Other examples of the pick list(s) from which the selections of block 251 are received are also possible. The server 118 may provide the pick lists from the database 120 to the display device 300 in response to a request the display device 300 transmits to the server 118. A displayed pick list may indicate a portion of a displayable page to which the pick list pertains, such a complaint or cause section of a displayable page that includes an RO.

Next, block 252 includes receiving a text string based on at least one pick list selection to generate a first text portion of the displayable page. One or more of the processors 302 and 402 may determine the text string from a database including text strings that are associated with one or more terms selectable from a pick list. The processor 402 may receive the text string from the database 120. The processor 402 may cause the network interface 404 to transmit the text string to the display device 300. The processor 302 may receive the text string from the network interface 306.

Next, block 253 includes generating the first text portion. The processor 302 or 402 may generate the first text portion may include generating a text portion for at least one of a complaint section and a cause section of the displayable page. Generating the text portion may include populating a text string for the complaint section with the pick list section(s) selected for the complaint section. Generating the text portion may include populating a text string for the cause section with the pick list section(s) selected for the cause section. Generating the text portion may include populating a text string for another section of the displayable page with the pick list section(s) selected for the other section. An example complaint section 274 is shown in FIG. 21.

In accordance with the example embodiment in which the pick lists selections 192, 193, 194, and 195 (shown in FIG. 19) are received, the processor 302 or 402 may select or receive a text string having one or more gaps for placement of terms from the pick lists selections 192, 193, 194, and 195. For instance, the text string may be configured as "Customer reports that [insert system term] [insert symptom term] [insert temporal qualifier term] heard from [insert spatial qualifier term]." The gaps are represented by the square brackets within the example text strings described herein. The first example text string including the word "heard" may be selected based on the symptom term indicating "make noise." As another example, a selected text string may be configured as "Customer states the [insert symptom term]" for case in which the pick lists selection(s) include only the term "check engine light is on" from the vehicle symptom pick list.

In accordance with an embodiment in which a selection from the DTC pick list is "P0401," the processor 302 or 402 can select a text string associated with a DTC, such as the text string "Connected a scan tool and found code [insert DTC identifier] — [insert DTC descriptor]" as shown in the first sentence of an example cause section 275 shown in FIG. 21. As shown in FIG. 21, the cause section may include more than a single sentence. The second sentence in the cause section 275 may be based on selections from a test and results pick list.

Next, block 254 includes determining content for a display card of the displayable page. The processor 402 can determine this content by searching the database 120. The search of the database 120 for this content may be based on information describing the subject vehicle, the selection(s) from the pick list(s) received at block 251, the RO complaint, or the RO cause, or some portion of that information.

As a first example, the display card may comprise a commonly replaced part graph display card. As shown in FIG. 21, the EGR valve for the subject vehicle was replaced. The database 120 may contain data (e.g., RO data) that indicates quantities of occurrences of an EGR value being replaced on other vehicles having similar attributes to the subject vehicle and vehicle mileage ranges when those replacements occurred. The processor 402 can cause the network interface 404 to transmit the content determined at block 254 to the display device 300. The processor 302 can determine the content after the network interface 306 receives the content transmitted over the network 114.

As a second example, the display card may comprise a related components display card. The database 120 may contain data that indicates when an EGR value is replaced on vehicles having similar attributes to the subject vehicle, a camshaft position sensor, an o-ring, a crankshaft position sensor bolt, or a crankshaft position sensor connector have also been replaced during the same service session or at another service session relatively soon before or after the same service session. That data within the database 120 may have been acquired from repair orders for instances of servicing an EGR value on the vehicles having the similar attributes. The processor 402 can cause the network interface 404 to transmit the content determined at block 255 to the display device 300. The processor 302 can determine the content after the network interface 306 receives the content transmitted over the network 114.

Next, block 255 includes determining parts and labor information and vehicle information. FIG. 21 shows an example of vehicle information 271 and an example of parts and labor information 272. Some or all of the vehicle information 271 may be determined as a result of vehicle information being input to the processor 302 by use of the user input device 310. Additionally or alternatively, some or all of the vehicle information 271 may be determined as a result of vehicle information being received at the vehicle interface 304 from the subject vehicle or at the network interface 306. Some or all of the labor information 272 may be determined as a result of parts and labor information being input to the processor 302 by use of the user input device 310.

Next, block 256 includes outputting content of the displayable page. In one respect, outputting the content of the displayable page may include the processor 402 causing the network interface 404 to transmit the content of the displayable page over the network 114 to the network interface 306 of the display device 300 for storage within the CRM 312, and the network interface 404 transmitting the content. In another respect, outputting the content of the displayable page may include the processor 302 causing the content of the displayable page to be displayed on the display 308. Some of the output content may be populated within a display card, such as the display cards 276 and 277 shown in FIG. 21.

A processor may populate the display card for corrective action graph or the display card for additional related replaced components. In one respect, processor 402 may populate the display card 277 with the content determined by performing the function(s) of block 254 shown in FIG. 20. In another respect, the processor 402 may cause the network interface 404 to transmit the content determined for the display card 277 over the network 114 to the network interface 306 of the display device 300 for storage within the CRM 312, and the processor 302 may populate the display card 277 stored in the display cards 320 with the content for the display card 277.

Next, block 257 includes displaying the displayable page. The processor 302 may cause the displayable page to be transmitted to the display 308. The display 308 may display the displayable page, such as the displayable page 270 shown in FIG. 21 or another displayable page in accordance with the example embodiments. As with other displayable pages described herein, a display card, such as the display card 276 or 277, may include an action-trigger that causes the processor 302 to change the displayable page being displayed by the display 308.

Next, FIG. 21 shows the displayable page 270 in accordance with an example embodiment. The displayable page 270 may include content of an RO and may be displayed as part of displaying a displayable page as discussed with respect to block 259 shown in FIG. 20.

The displayable page 270 includes vehicle information 271, which may include some or all of the vehicle information received as discussed with respect to block 256 in FIG. 20. More specifically, the vehicle information 271 includes information indicating a year, make, model engine, sub-model, and mileage associated with a subject vehicle for the displayed RO. Other examples of the types of information displayed as part of the vehicle information 271 are also possible.

The displayable page 270 includes parts and labor information 272, which may include some or all of the parts and labor information received as discussed with respect to block 256 in FIG. 20. More specifically, the parts and labor information 272 includes a component name (e.g., EGR valve), a part number, a part price (e.g., $236.28), one or more labor times and identifiers (e.g., labor identifier "diagnosis" and labor time "0.5 hours"). The labor identifier may include a labor operation code (e.g., "D45") that indicates a particular labor operation (e.g., diagnosis). The parts and labor information 272 includes a total labor time (e.g., 1.1 hours), a labor rate (e.g., $105 per hour), and a total labor cost (e.g., $115.50). The parts and labor information 272 may be generated based on inputs entered by use of the user input device 310. For instance, at least some of the parts information may be obtained by processor 302 requesting parts information in response to receiving a part number scanned by the user input device 310 from packaging holding a vehicle part before installation on the subject vehicle.

The displayable page 270 includes service information 273. The service information 273 may include information indicating a complaint 274 (e.g., a customer complaint or explanation why the subject vehicle was brought to a repair shop) and a cause 275 (e.g., an explanation of the work performed on the subject vehicle while at the repair shop). The cause may explain a diagnosis made by a repair technician that worked on the subject vehicle. The service information 273 may be generated based on inputs entered by use of the user input device 310. The complaint 274 may be based on the text string selected by performing the function(s) of block 252 shown in FIG. 20 and the pick list selection(s) upon which selection of the text string was based. The cause 275 may be based on the text string selected by performing the function(s) of block 253 shown in FIG. 20 and the pick list selection(s) upon which selection of the text string was based.

The displayable page 270 includes display cards 276 and 277. One or more of the display cards 276 and 277 may include a recommendation, such as a recommendation of additional service that may be warranted for the subject vehicle. The recommendation may be determined by the server 118 based on repair orders or other information stored in the database 120. The recommendation may be displayed textually or graphically or in some other manner.

The display card 276 is shown displaying additional related replacements, similar to the display card 1006 shown in FIG. 10. The content of the display card 276 may include the content determined by performing the function(s) of block 255 shown in FIG. 20. The display card 277 is shown displaying a corrective action graph, similar to the display card 716 shown in FIG. 7. The content of the display card 277 may include the content determined by performing the function(s) of block 254 shown in FIG. 20.

The processor 302 or 402 may determine the mileage for the subject vehicle (e.g., 71,333 miles) and display an indicator 278 within the display card 277 and an indicator 279 within the display card 276. The indicators 278 and 279 indicate the mileage of the subject vehicle within the mileage ranges represented within the display cards 276 and 277. Other display cards that display data with respect to vehicle use ranges (e.g. distance or time usage) may similarly include indicators of the current usage of the subject vehicle.

VII. Displayable Pages for Real-Fix Tips

Figure 26:
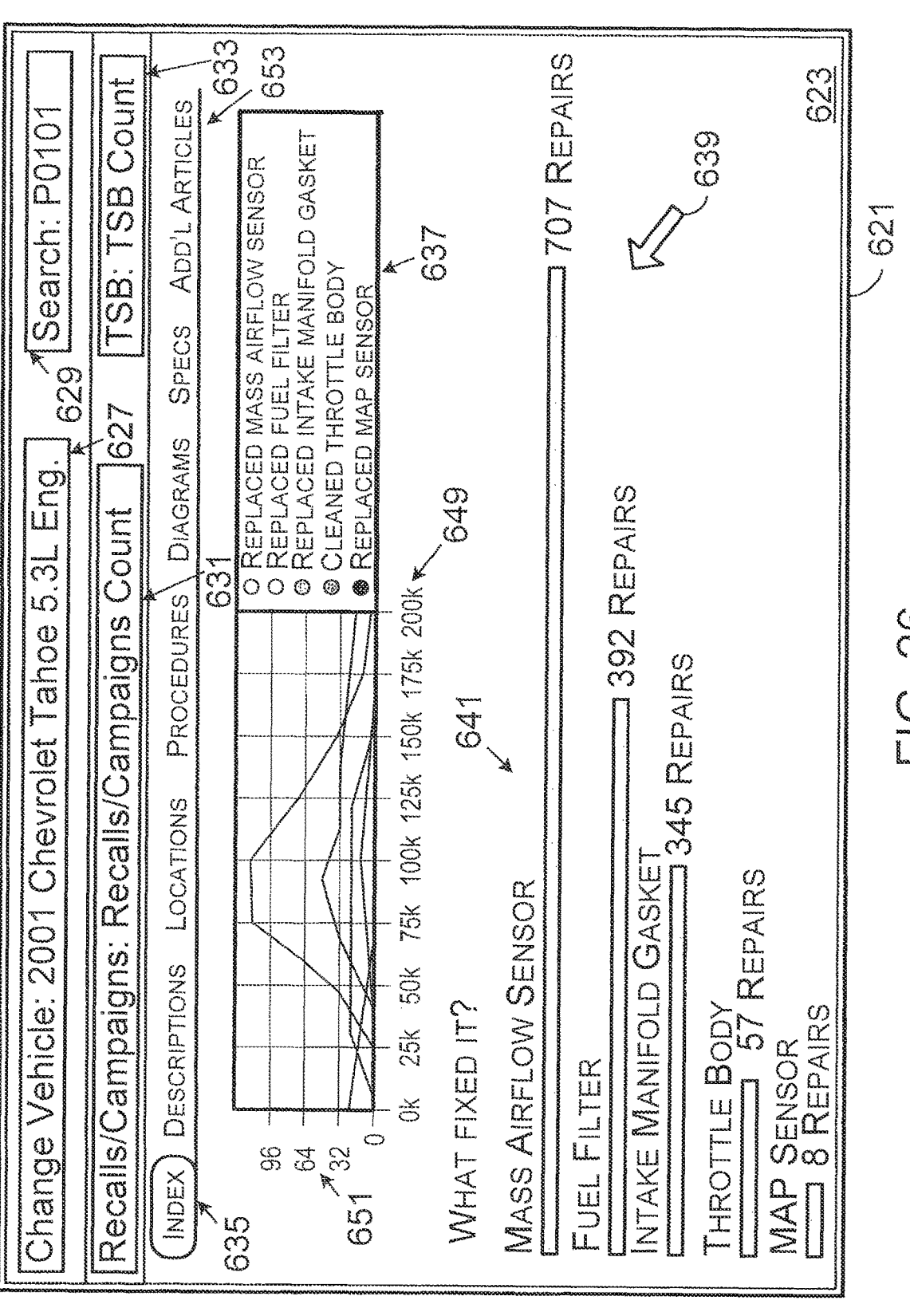
FIGS. 26 and 27 show displayable pages pertaining to real-fix tips.
Figure 27:
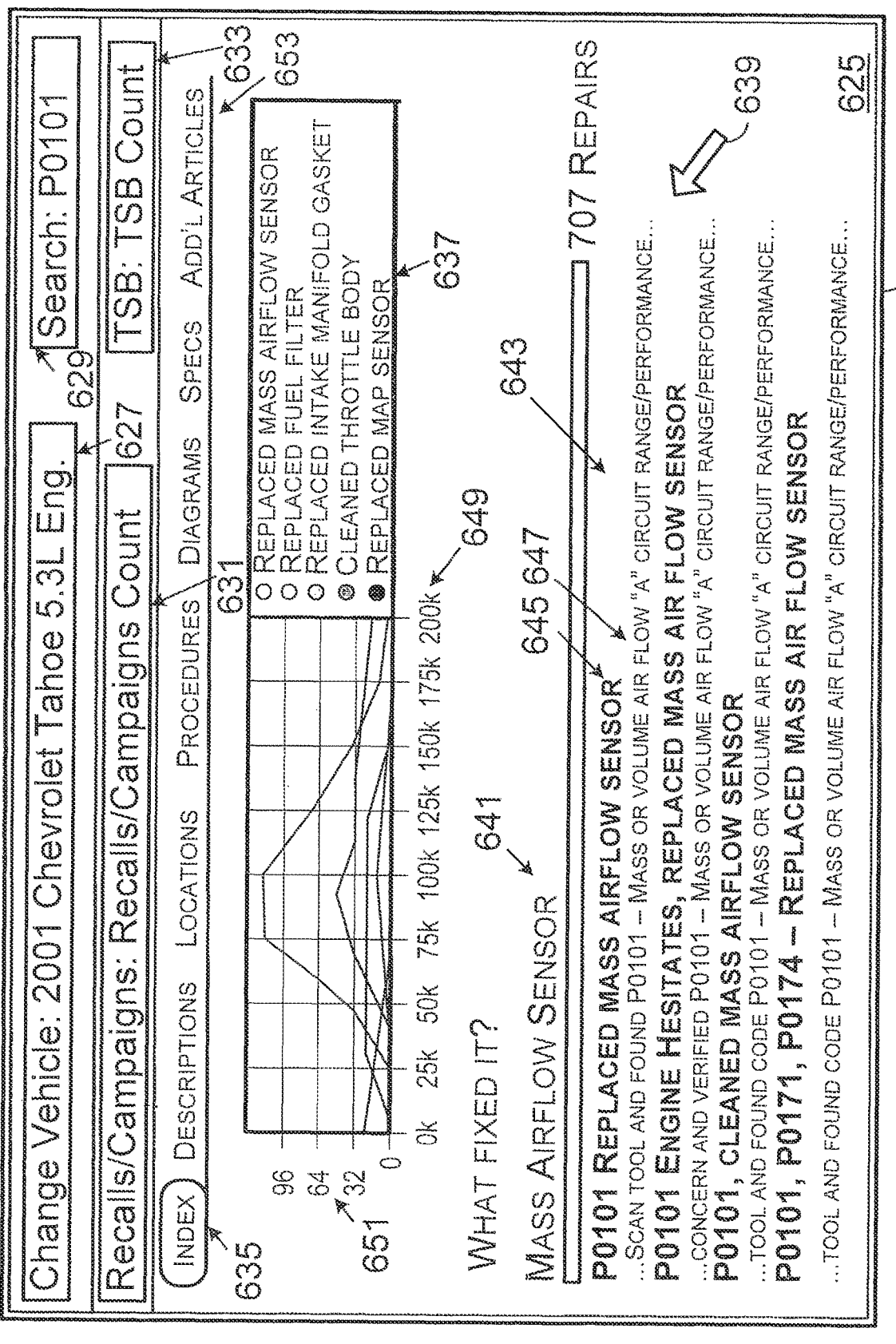

Next, FIGS. 26 and 27 show displayable pages pertaining to real-fix tips (RFT). FIGS. 26 and 27 show a display 621 (e.g., the display 308 in FIG. 3) displaying displayable pages 623 and 625, respectively. The displayable pages 623 and 625 include a vehicle search box 627 in which a vehicle identifier in the form of a YMM, YMME, YMMES vehicle identifier or in another form may be entered for searching for an RFT. The displayable pages 623 and 625 include a search box 629 in which a vehicle symptom (e.g., a DTC or a term describing a vehicle symptom such as engine hesitates) and a component (e.g., mass airflow sensor) may be entered for searching for the RFT. The displayable pages 623 and 625 include the selector 639 to select or point to the items displayed on the displayable pages 623 and 625.

The displayable pages 623 and 625 include a recall display 631 and a bulletin display 633. After entering a vehicle and symptom as search criterion in the vehicle search box 627 and the search box 629, the display device 300 may transmit a search request based on the search criterion and in response receive a list of components that were previously serviced to resolve the symptom on the vehicle, a list or quantity of recall or campaign notices from an OEM of the vehicle and pertaining to the vehicle and symptom, and a list or quantify of technical service bulletin (TSB) from an OEM of the vehicle and pertaining to the vehicle and symptom. The quantity of recall or campaign notices may be displayed in the recall display 631. The quantity of TSB may be displayed in the bulletin display 633. The selector 639 may be used to select the recall display 631 and the processor 302 may update the displayable page 623 or 625 to display the list of recall or campaign notices. The selector 639 may be used to select the bulletin display 633 and the processor 302 may update the displayable page 623 or 625 to display the list of TSB.

The displayable pages 623 and 625 include the set of tabs 653 and the current tab 635 indicating which tab is currently selected or being displayed. In FIGS. 26 and 27, the "INDEX" tab is currently selected and displayed. In one respect, the displayable pages 623 and 625 may be displayed only under the INDEX tab. In another respect, the displayable pages 623 and 625 may be displayed under the INDEX tab or at least one other tab of the set of tabs 653.

The displayable pages 623 and 625 may include one or more graphical representations pertaining to the search criteria. For example, the displayable pages 623 and 625 include a graph 637 showing quantities of various components 651 with respect to distances 649 vehicle have been driven when a service-operation was performed on those components. As an example, the distances may be miles or kilometers. As another example, the displayable page 623 includes a bar chart 641 showing various component names of components previously serviced on vehicles matching the searched vehicle. The bar chart 641 is shown unexpanded in FIG. 26 such that more component names may be displayed on the displayable page 623. The component names may be listed in sequence from greatest to lowest quantity of service-operations or in another manner. The selector 639 may be used to select a component name within the bar chart 641. FIG. 27 shows that the mass airflow sensor component name has been selected such that the bar chart 641 is expanded to show a list of RFT 643 corresponding to the selected component. The list of RFT 643 may include a title 645 of each RFT and text 647 from at least one of the complaint, cause or correction fields of each RFT. The ranking of RFT based on quantities of service-operations may be displayed without using a bar chart. For example, the ranking of RFT may be textual or a different type of graph such as a pie chart or histogram. Turning to FIG. 31, a textual ranking may include text 470, where the underlined text 471 is a pointer selectable by the selector 639 (shown in FIG. 26 and FIG. 27) to expand the list of RFT to display details of the RFT as shown in the example text 472 that may be displayed on the display 308.

The selector 639 may select an RFT from the RFT list 643 to cause the display device 300 to display a displayable page or sections including displayable cards, such as those shown in FIGS. 7 to 10 and 21 to 25. One of the display cards within the displayable page or selection displayed after selection of the RFT from the RFT list 643 may be configured like the display card 722 shown in FIG. 7 along with a correction pertaining to the RFT described in the display card 722.

VIII. MODAL PICKER

Figure 28:
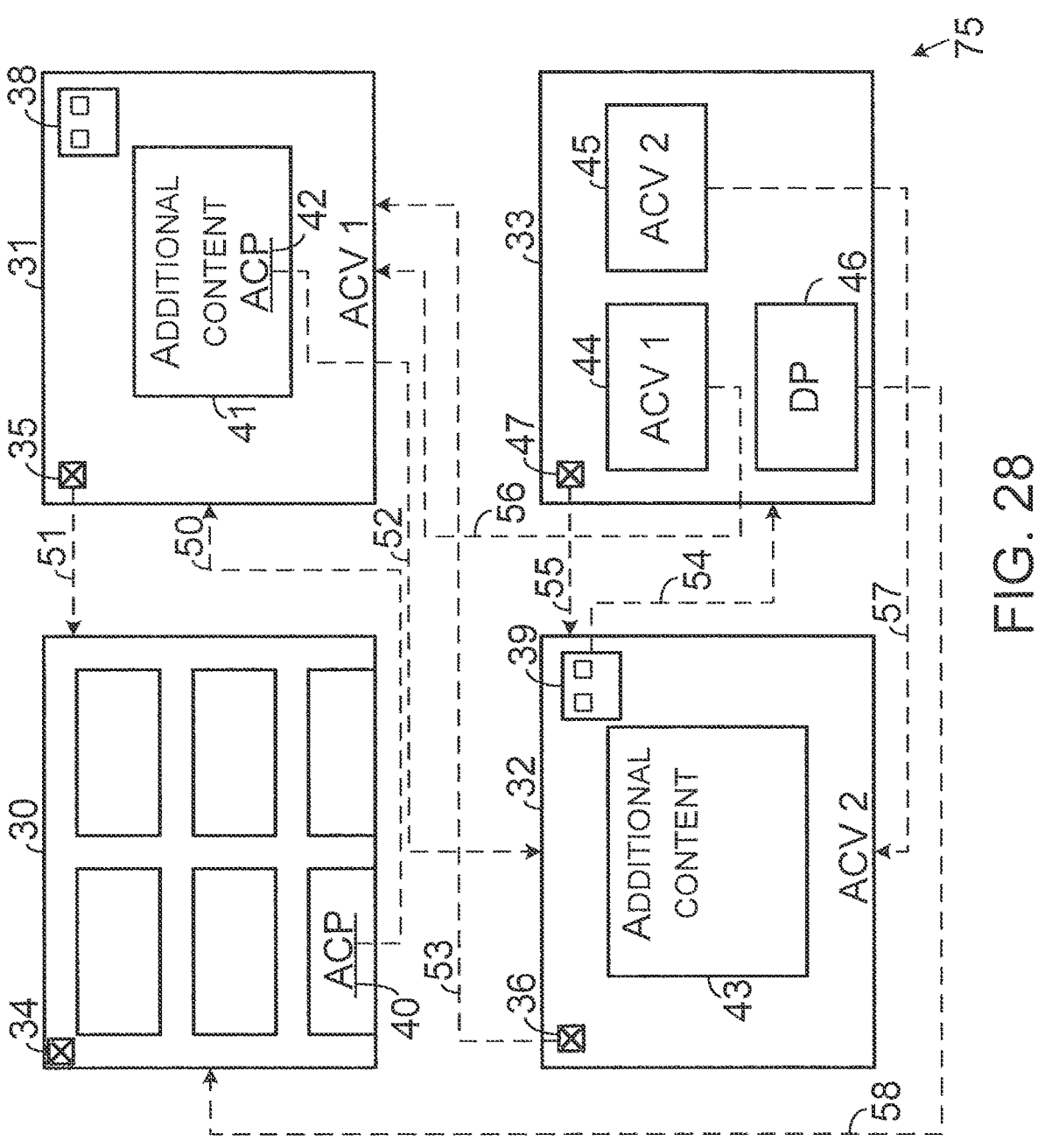
FIG. 28 is a flow diagram using a modal picker.

FIG. 28 shows a flow diagram 75 for using a modal picker in conjunction with displayable pages and sections with display cards. The flow diagram 75 shows flow lines 50 through 58. The flow lines represent what the display 308 may display in response to various selections from among a displayable page, additional content viewer, or modal viewer displayed on the display 308. The CRPI 316 may include program instructions to generate and display a display card with a pointer to additional content, an additional content viewer in response to selection of the pointer and retrieval of the additional content from the database 120, and a modal viewer based on previously-viewed or currently opened displayable pages and additional content viewers.

The flow diagram 75 shows a displayable page 30 including multiple display cards. The displayable page 30 may be configured like any of the example displayable pages and may include one or more displayable sections. The displayable page 30 includes a display card with a pointer 40 to additional content 41, which may be stored in the database 120. A pointer, such as the pointer 40, may be configured like a hypertext link. The displayable page 30 includes a close selection 34 which may be selected by the selector 639 to close the displayable page 30. The display device 300 may responsively display another displayable page, such as displayable page 623 or 625 if the displayable page 30 was selected for display from one of those displayable pages.

Selection of the pointer 40 results in the display device 300 displaying an additional content viewer (ACV) 31 (shown as ACV 1 in FIG. 28). Flow line 50 represents this transition by the display device 300. In one respect, the ACV 31 may be overlaid upon a portion of the displayable page 30. In another respect, the ACV 31 may be overlaid over the entire displayable page 30 or in place of the displayable page 30. The ACV 31 may include the additional content 41. The additional content displayed within any ACV may include one or more pointers. Each of those pointers may point to other additional content, which may also include pointers to still further additional content. For example, the additional content 41 may include a pointer 42 to additional content 43, which may be stored in the database 120. The additional content 41 may include one or more other pointers to additional content within the same ACV as additional content 43 or within a different ACV. The additional content 43 may also include one or more pointers to additional content within the database 120. Additional content displayed within an ACV is not required to have a pointer to other additional content.

The ACV 31 includes a close selection 35 which may be selected by the selector 639 to close the ACV 31. The display device 300 may responsively display a displayable page or ACV from which the ACV 31 was selected for display. As shown in FIG. 28, flowline 51 represents that the display 308 displays the displayable page 30 after selection of the close selection 35. The ACV 31 also includes a modal selector 38 to display currently open displayable pages or ACV that may be selected to be displayed again instead of the ACV 31. The modal selector 38 or any other modal selector may include selectors for ACV but may not include a selector for a displayable page as shown in FIG. 28. Based on the flow diagram 75, the modal selector 38 may include selectors from any ACV that have been accessed (e.g., displayed) beginning with the selection of pointer 40. As more ACV are accessed by selecting pointers within a currently displayed ACV, the processor 302 tracks which ACV have been accessed since selection of the pointer 40 such that selection of a modal selector within a currently displayed ACV results in a modal viewer showing selectors for each of the accessed ACV.

Selection of the pointer 42 results in the display device 300 displaying an additional content viewer (ACV) 32 (shown as ACV 2 in FIG. 28). Flow line 52 represents this transition by the display device 300. In one respect, the ACV 32 may be overlaid upon a portion of the displayable page 30 or the ACV 31. In another respect, the ACV 32 may be overlaid over the entire displayable page 30 or the ACV 31 or in place of the displayable page 30 and the ACV 31. The ACV 32 may include the additional content 43. The ACV 32 includes a close selection 36 which may be selected by the selector 639 to close the ACV 32. The display device 300 may responsively display a displayable page or ACV from which the ACV 32 was selected for display. As shown in FIG. 28, flowline 53 represents that the display 308 displays the ACV 31 after selection of the close selection 36.

The ACV 32 also includes a modal selector 39 to display currently open displayable pages or ACV that may be selected to be displayed again instead of the ACV 32 or the modal viewer 33. Flowline 54 represents the modal selector 39 was selected and the modal viewer 33 is responsively displayed. The modal viewer 33 shows that an ACV selector 44, an ACV selector 45, and DP selector 46 that may be selected by the selector 639 to cause the display 308 to display the ACV 31, the ACV 32, or the displayable page 30, respectively. Flowline 56 represents the ACV selector 44 was selected to cause the display 308 to once again display the ACV 31. Flowline 57 represents the ACV selector 45 was selected to cause the display 308 to once again display the ACV 32. Flowline 58 represents the DP selector 46 was selected to cause the display 308 to once again display the displayable page 30. The modal viewer 33 includes a close selection 47 which may be selected by the selector 639 to close the modal viewer 33. The display device 300 may responsively display a displayable page or ACV from which the modal viewer 39 was selected for display.

The additional content 41 and 43 or additional content in any ACV may include a variety of additional content. For instance, the additional content may include an image, a video, text, a pointer to other additional content, or an automated function selector to execute program instructions within the CRPI 316 to perform a function automatically after selection of the selector.

As an example the additional content may include a wiring diagram, a text description of a resistance test or another test, a specification, and an automated function selector. The display device 300 may include functionality to measure resistance of a circuit, and the text description may describe where two test leads should be connected. In response to selection of the automated function selector, the display device 300 may measure the resistance of the circuit and cause a value of resistance determined by the measurement to be displayed on the display (e.g., within the ACV 31).

As another example, the additional content may include a text description of a drive cycle test and one or more automated function selectors. Selection of a first of those automated function selectors may cause the display device 300 to read data values of vehicle parameters from a vehicle. Selection of a second of those automated function selectors may cause the display device 300 to read DTC from a vehicle. Selection of a third of those automated function selectors may cause the display device 300 to clear DTC from the vehicle. In response to selection of the first or second automated function selector, the display device 300 may read the PID values or DTC, respectively, and cause the PID values or DTC to be displayed on the display 308. In response to selection of the third automated function, the display device 300 may transmit a clear DTC message to the vehicle. Additionally, the display device 300 may transmit a read DTC message to the vehicle to confirm that the DTC have been cleared. The messages sent by the display device 300 to the vehicle may be directed to a particular ECU within the vehicle.

Other automated function selectors may be included within an ACV. In general, the automated functions selectors may include selectors for functions performed by a typical vehicle scan tool, such as an OBD scan tool. The selector 639 may be used to select an automated function selector to cause the display device 300 to reprogram an ECU within the vehicle with more current software. This may include re-flashing a EEPROM within the ECU. An automated function selector may allow for initially programming a new ECU installed within a vehicle and relearning data values, such as data values to calibrate the ECU (e.g., a block learn fuel system calibration). The selector 639 may be used to select an automated function selector to request data from an ECU within a vehicle and to display a waveform based on signals received in response to the request. The selector 639 may be used to select an automated function selector to cause the display device 300 to perform a function test on a vehicle. The display device 300 may include program instructions within the CRPI 316 to send requests, such as an OBD II mode $08 request to control a component within the vehicle. For example, the EVAP solenoid within the vehicle may be controlled in response to selecting the automated function selector.

IX. Example Computing Devices

As described above, the computing devices described herein can be any type of computing device. FIG. 29 is a functional block diagram illustrating an example computing device 401 used in a computing system that is arranged in accordance with at least some embodiments described herein. The computing device 401 can be implemented to determine estimate information or perform any of the functions described above with reference to FIGS. 1-28. In a basic configuration 403, computing device 401 can typically include one or more processors 405 and system memory 409. A memory bus 441 can be used for communicating between the processor 405 and the system memory 409. Depending on the desired configuration, processor 405 can be any type of processor including but not limited to a microprocessor ($0^3$), a microcontroller ($\mu$C), a digital signal processor (DSP), or any combination thereof. A memory controller 407 can also be used with the processor 405, or in some implementations, the memory controller 407 can be an internal part of the processor 405.

Depending on the desired configuration, the system memory 409 can be any type of computer-readable memory including but not limited to volatile memory (such as RAM), non-volatile memory (such as ROM, flash memory, etc.) or any combination thereof. System memory 409 can include one or more applications 411, and program data 415. Application 411 can include an algorithm 413 that is arranged to receive vehicle information and provide the vehicle information to a communication network or receive vehicle information and determine estimate information, in accordance with the present disclosure. Program data 415 can include repair order data 417 that could be directed to any number of types of data. In some example embodiments, application 411 can be arranged to operate with program data 415 on an operating system.

Computing device 401 can have additional features or functionality, and additional interfaces to facilitate communications between the basic configuration 403 and any devices and interfaces. For example, data storage devices 419 can be provided including removable storage devices 421, non-removable storage devices 423, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable instructions, data structures, program modules, or other data.

System memory 409 and storage devices 419 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 401. Any such computer storage media can be part of device 401.

Computing device 401 can also include output interfaces 431 that can include a graphics processing unit 433, which can be configured to communicate to various external devices such as display screens 437 or speakers via one or more A/V ports 435 or a communication interface 425. The communication interface 425 can include a network controller 427, which can be arranged to facilitate communications with one or more other computing devices 439 over a network (such as the network 114) via one or more communication ports 429. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 401 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 401 can also be implemented as a personal computer, including both laptop computer and non-laptop computer configurations, or a server.

Figure 30:
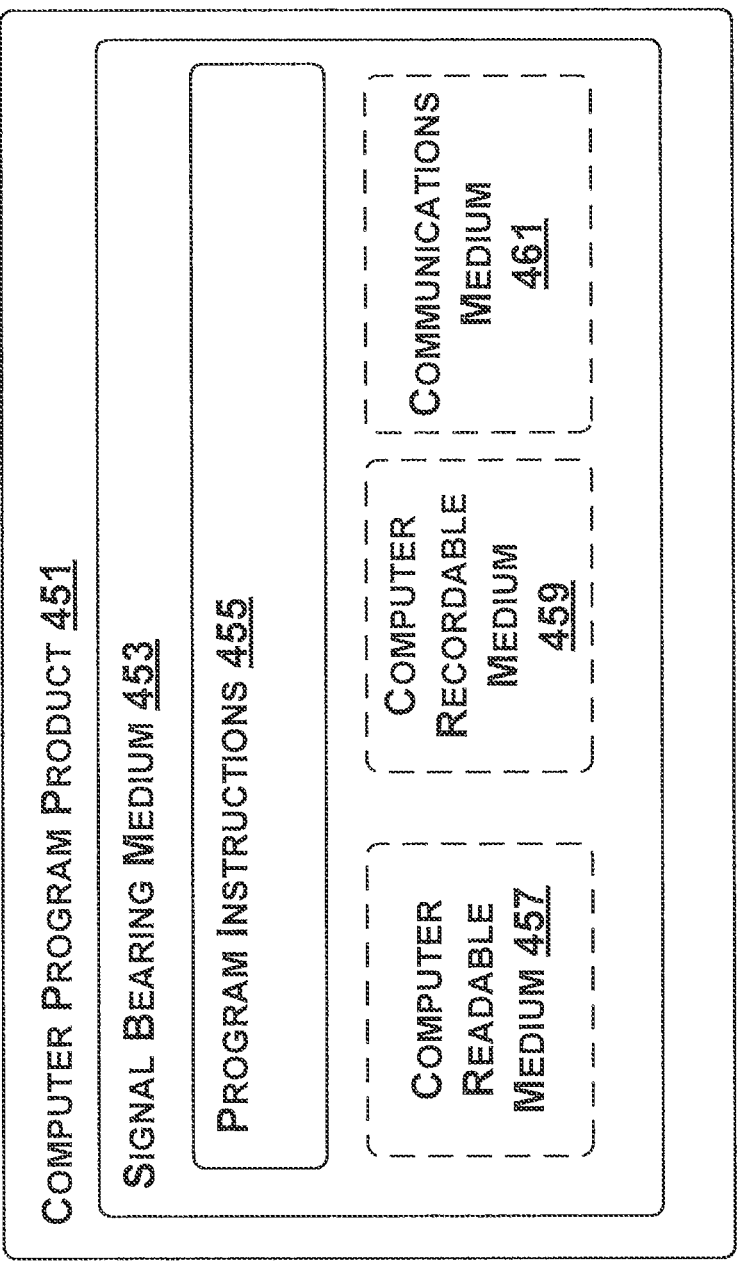
FIG. 30 is a schematic illustrating a conceptual partial view of an example computer program product that includes a computer program for executing a computer process on a computing device, arranged according to at least some example embodiment(s).

In some embodiments, the disclosed methods can be implemented as computer program instructions encoded on a non-transitory computer-readable storage media in a machine-readable format, or on other non-transitory media or articles of manufacture. FIG. 30 is a schematic illustrating a conceptual partial view of an example computer program product 451 that includes a computer program for executing a computer process on a computing device, arranged according to at least some embodiments presented herein.

In one embodiment, the example computer program product 451 is provided using a signal bearing medium 453. The signal bearing medium 453 can include one or more programming instructions 455 that, when executed by one or more processors can provide functionality or portions of the functionality described above with respect to FIGS. 1-7. In some examples, the signal bearing medium 453 can encompass a computer-readable medium 457, such as, but not limited to, a hard disk drive, a Compact Disc (CD), a Digital Video Disk (DVD), a digital tape, memory, etc. In some implementations, the signal bearing medium 453 can encompass a computer recordable medium 459, such as, but not limited to, memory, read/write (R/W) CDs, R/W DVDs, etc. In some implementations, the signal bearing medium 453 can encompass a communications medium 461, such as, but not limited to, a digital and/or an analog communication medium (e.g., a fiber optic cable, a waveguide, a wired communications link, a wireless communication link, etc.). Thus, for example, the signal bearing medium 453 can be conveyed by a wireless form of the communications medium 461 (e.g., a wireless communications medium conforming to the IEEE 802.11 standard or other transmission protocol).

The one or more programming instructions 455 can be, for example, computer executable and/or logic implemented instructions. In some examples, a computing device such as the computing device 401 of FIG. 29 can be configured to provide various operations, functions, or actions in response to the programming instructions 455 conveyed to the computing device 401 by one or more of the computer-readable medium 457, the computer recordable medium 459, and/or the communications medium 461.

X. Conclusion

Example embodiments have been described above. Those skilled in the art will understand that changes and modifications may be made to the described embodiments without departing from the true scope and spirit of the present invention, which is defined by the claims.

What is claims is:

1. A method for diagnosing a vehicle using a computing system including a server and a scan tool, the scan tool including a user interface, a vehicle interface to the vehicle, a processor, a memory, and a display, the vehicle including a vehicle component connected to an electronic control unit (ECU), the method comprising:

determining, at the scan tool, a vehicle identifier of the vehicle;

determining, at the scan tool, an indicator of a vehicle symptom entered via use of the user interface or received at the vehicle interface via a vehicle data message from the vehicle, wherein the vehicle symptom includes a diagnostic trouble code (DTC) identifier or a non-DTC symptom identifier;

determining, at the server via a request from the scan tool, the vehicle identifier and the indicator of the vehicle symptom;

determining, at the server by searching a database based on the vehicle identifier and the indicator of the vehicle symptom, a most-likely cause of the vehicle symptom and a most-probable component corresponding to the most-likely cause of the vehicle symptom, wherein the most-probable component is the vehicle component connected to the ECU;

determining, at the server by searching the database, a particular component-type identifier corresponding to the most-probable component;

determining, at the server by searching the database, a subset of information categories from among a set of information categories stored in the database, wherein:

each information category of the set of information categories is associated with one or more component-type identifiers, the set of information categories includes at least one information category not associated with the particular component-type identifier, and the subset of information categories includes multiple information categories associated with the particular component-type identifier;

generating, at the server, a first displayable page including multiple display cards, wherein:

each display card of the multiple display cards is populated with information that pertains to both a respective information category of the multiple information categories and the vehicle symptom, and the first displayable page includes a first display card populated with an automated function selector corresponding to particular program instructions stored in the memory;

receiving, at the scan tool from the server, the first displayable page;

displaying the first displayable page on the display of the scan tool; and executing, by the processor in response to a selection of the automated function selector, the particular program instructions to cause the vehicle interface to transmit to the vehicle a vehicle data message to request the ECU to control the vehicle component connected to the ECU during diagnosis of the vehicle.

2. The method according to claim 1, wherein the multiple display cards include a second display card populated with information provided from the server executing a web service corresponding to the second display card.

3. The method according to claim 1, wherein the most-likely cause of the vehicle symptom and the most-probable component corresponding to the most-likely cause of the vehicle symptom correspond to the vehicle identifier.

4. The method according to claim 1, wherein:

the memory includes additional program instructions executable by the processor to transmit a second vehicle data message to the vehicle.

5. The method according to claim 4, wherein the second vehicle data message comprises:

a request for a parameter identifier (PID) value from the vehicle, a request for a diagnostic trouble code from the vehicle, a request to clear a diagnostic trouble code from the vehicle, data to calibrate an electronic control unit in the vehicle, or data to reprogram an electronic control unit in the vehicle.

6. The method according to claim 1, wherein the particular component-type identifier is electrical component-type, mechanical component-type, electro-mechanical component-type, electro-pneumatic component-type, or electro-hydraulic component-type.

7. The method according to claim 1, further comprising:

displaying an action-trigger within a second display card displayed on the display, receiving, at the processor, selection data that indicates an instance of selecting the action-trigger has occurred; and performing, at the scan tool, an action associated with the action-trigger.

8. The method according to claim 7, wherein the action associated with the action-trigger includes one or more from among:

generating a different display card overlaying at least a portion of the second display card, displaying the different display card in place of the second display card, displaying a new displayable page replacing the first displayable page, adding data from the second display card to a service report, displaying different data in the second display card, or changing a size of the second display card.

9. The method according to claim 8, further comprising:

receiving, by the processor, input data entered into the different display card using the user interface; and transmitting, by the processor, the input data to the server, whereby the server provides the input data for populating into a display card on a display of a different computing system.

10. The method according to claim 7, further comprising:

generating a final report including content based on a selection made by performing the action associated with the action-trigger; and displaying the final report on the display.

11. The method of claim 1, wherein:

displaying the first displayable page includes displaying a second selector for selecting a displayable page other than the first displayable page, and the method further includes:

receiving, at the processor, a selection of the second selector;

transmitting, from the processor to the server, an indicator of the selection of the second selector;

receiving, at the processor from the server, second display data corresponding to the indicator of the vehicle symptom; and displaying, on the display, a second displayable page including a display card populated with the second display data.

12. The method of claim 1, wherein the multiple display cards include a specific display card including one or more from among:

a corrective action graph, a description of a real fix pertaining to the vehicle symptom or to a vehicle component, a description of a related real fix, a description of troubleshooting information, repair order information, parts and labor information additional related replacement part information, removal and replacement instruction information, component location information, technician note information, common test strategy information, an original equipment manufacturer (OEM) test procedure, a guided test procedure, a guided connector, a test specification, a waveform library display, an OEM waveform diagram, a component operation description, a wiring diagram, an image selection display, a repair specification, a post-repair procedure, or a final report display.

13. The method according to claim 1, further comprising:

transmitting, by the vehicle interface, a second vehicle data message to the vehicle; and receiving, by the processor from the vehicle interface, a third vehicle data message transmitted by the vehicle in response to the second vehicle data message, wherein determining the indicator of the vehicle symptom is based on content of the third vehicle data message.

14. The method according to claim 1, wherein:

the particular component-type identifier is a mechanical component-type, the set of information categories includes a wiring diagram category and an exploded view category, and the subset of information categories includes the exploded view category, but not the wiring diagram category, or the particular component-type identifier is an electrical component-type, the set of information categories includes a wiring diagram category and a second category, the second category includes a mechanical view diagram category or an exploded mechanical view diagram category, and the subset of information categories includes the wiring diagram category, but not the second category.

15. The method according to claim 1, further comprising:

displaying one or more pick lists on the display, wherein:

determining the indicator of the vehicle symptom is based on one or more selections from the one or more pick lists, and the one or more selections from the one or more pick lists corresponds to one or more from among:

a term identifying a vehicle system, a term identifying a vehicle component, a term identifying a vehicle symptom, a temporal qualifier, a spatial qualifier, or a term identifying a test and a test result.

16. The method of claim 1, wherein the database includes multiple databases.

17. The method of claim 1, wherein generating the first displayable page includes generating a markup language page including the multiple display cards and the information that pertains to both the respective information category of the multiple information categories and the vehicle symptom.

18. The method of claim 1, wherein:

the subset of information categories does not include the at least one information category not associated with the particular component-type identifier, and the first displayable page does not include a display card populated with information that pertains to the at least one information category not associated with the particular component-type identifier.

19. A computing system for diagnosing a vehicle including a vehicle component connected to an electronic control unit (ECU), the computing system comprising:

a server including a first processor;

a scan tool including a user interface, a vehicle interface to the vehicle, a second processor, and a display; and non-transitory computer-readable memory at the server and the scan tool containing computer-readable program instructions, that when executed by the first processor and the second processor, cause a set of functions to be performed, the set of functions comprising:

determining, at the scan tool, a vehicle identifier of the vehicle;

determining, at the scan tool, an indicator of a vehicle symptom entered via use of the user interface or received at the vehicle interface via a vehicle data message from the vehicle, wherein the vehicle symptom includes a diagnostic trouble code (DTC) identifier or a non-DTC symptom identifier;

determining, at the server via a request from the scan tool, the vehicle identifier and the indicator of the vehicle symptom;

determining, at the server by searching a database based on the vehicle identifier and the indicator of the vehicle symptom, a most-likely cause of the vehicle symptom and a most-probable component corresponding to the most-likely cause of the vehicle symptom, wherein the most-probable component is the vehicle component connected to the ECU;

determining, at the server by searching the database, a particular component-type identifier corresponding to the most-probable component;

determining, at the server by searching the database, a subset of information categories from among a set of information categories stored in the database, wherein:

each information category of the set of information categories is associated with one or more component-type identifiers, the set of information categories includes at least one information category not associated with the particular component-type identifier, and the subset of information categories includes multiple information categories associated with the particular component-type identifier;

generating, at the server, a first displayable page including multiple display cards, wherein:

each display card of the multiple display cards is populated with information that pertains to both a respective information category of the multiple information categories and the vehicle symptom, and the first displayable page includes a first display card populated with an automated function selector corresponding to particular program instructions stored in the memory;

receiving, at the scan tool from the server, the first displayable page;

displaying the first displayable page on the display of the scan tool; and executing, by the second processor in response to a selection of the automated function selector, the particular program instructions to cause the vehicle interface to transmit to the vehicle a vehicle data message to request the ECU to control the vehicle component connected to the ECU during diagnosis of the vehicle.

20. A non-transitory computer-readable memory distributed between a server and a scan tool, the server including a first processor, the scan tool including a second processor, a user interface, a display, and a vehicle interface to a vehicle including a vehicle component connected to an electronic control unit (ECU), the memory having stored therein instructions executable by the first processor and the second processor to perform functions for diagnosing the vehicle comprising:

determining, at the scan tool, a vehicle identifier of the vehicle;

determining, at the scan tool, an indicator of a vehicle symptom entered via use of the user interface or received at the vehicle interface via a vehicle data message from the vehicle, wherein the vehicle symptom includes a diagnostic trouble code (DTC) identifier or a non-DTC symptom identifier;

determining, at the server via a request from the scan tool, the vehicle identifier and the indicator of the vehicle symptom;

determining, at the server by searching a database based on the vehicle identifier and the indicator of the vehicle symptom, a most-likely cause of the vehicle symptom and a most-probable component corresponding to the most-likely cause of the vehicle symptom, wherein the most-probable component is the vehicle component connected to the ECU;

determining, at the server by searching the database, a particular component-type identifier corresponding to the most-probable component;

determining, at the server by searching the database, a subset of information categories from among a set of information categories stored in the database, wherein:

each information category of the set of information categories is associated with one or more component-type identifiers, the set of information categories includes at least one information category not associated with the particular component-type identifier, and the subset of information categories includes multiple information categories associated with the particular component-type identifier;

generating, at the server, a first displayable page including multiple display cards, wherein:

each display card of the multiple display cards is populated with information that pertains to both a respective information category of the multiple information categories and the vehicle symptom, and the first displayable page includes a first display card populated with an automated function selector corresponding to particular program instructions stored in the memory;

receiving, at the scan tool from the server, the first displayable page;

displaying the first displayable page on the display of the scan tool; and executing, by the second processor in response to a 5 selection of the automated function selector, the particular program instructions to cause the vehicle interface to transmit to the vehicle a vehicle data message to request the ECU to control the vehicle component connected to the ECU during diagnosis of the vehicle. 10

* * * * *